United States Patent [19]
Melchione et al.

[11] Patent Number: 5,930,764
[45] Date of Patent: *Jul. 27, 1999

[54] SALES AND MARKETING SUPPORT SYSTEM USING A CUSTOMER INFORMATION DATABASE

[75] Inventors: Anthony R. Melchione, Bridgewater, N.J.; Rafael Martinez, Fairfield, Conn.; Eric Seifert, East Northport, N.Y.; Martin Hirsch, Teaneck, N.J.

[73] Assignee: Citibank, N.A., New York, N.Y.

[*] Notice: This patent is subject to a terminal disclaimer.

[21] Appl. No.: 08/702,039

[22] Filed: Aug. 23, 1996

Related U.S. Application Data

[63] Continuation-in-part of application No. 08/544,102, Oct. 17, 1995.

[51] Int. Cl.[6] .................................................. G06F 17/60
[52] U.S. Cl. ................................................. 705/10; 705/35
[58] Field of Search .................................. 395/210, 235; 705/10, 35

[56] References Cited

U.S. PATENT DOCUMENTS

| | | | |
|---|---|---|---|
| 3,808,410 | 4/1974 | Schlesinger | 235/156 |
| 4,700,295 | 10/1987 | Katasof et al. | 364/401 |
| 5,421,008 | 5/1995 | Banning et al. | |

OTHER PUBLICATIONS

Jon Berry, "The Rich and the Worthy: America's Banks are Taking Direct Marketing One Step Further", Adweek's Marketing Week, v 33, n 19, pp. 14–17, May 17, 1992.

Robert B. Slater, "Marketing Magicians Turn Information into Profit", Bankers Monthly, v 108, n 7, pp. 5A–7A, Jul. 1991.

L.L. Persing, "Package Fine Tunes Marketing Programs", Computers in Banking, v 6, n 9, pp. 21–23, Sep. 1989.

(List continued on next page.)

*Primary Examiner*—Emanuel Todd Voeltz
*Assistant Examiner*—William N. Hughet
*Attorney, Agent, or Firm*—George T. Marcou; Kilpatrick Stockton LLP

[57] ABSTRACT

A sales process support system and method for identifying sales targets using a centralized database to improve marketing success. The system includes a central database that receives comprehensive information from a variety of internal and external feeds, and standardizes and households the information in a three-level hierarchy (households, customers, and accounts) for use by a financial institution. The comprehensive information stored on the central database is accessed through micromarketing workstations to generate lists of sales leads for marketing campaigns. A database engine is provided for generating logical access paths for accessing data on the central database to increase speed and efficiency of the central database. The system distributes sales leads electronically to branch networks, where the sales leads are used to target customers for marketing campaigns. The central database is accessed by workstations of a central customer information system for profiling customers, enhancing customer relationships with the financial institution, and electronically tracking sales and service performance during marketing campaigns. The system can also include a system for opening an account in a single session that is in communication with the central database, micromarketing centers, central customer information systems and branch systems of the present invention so that data can pass between these systems where legal and appropriate.

17 Claims, 68 Drawing Sheets

OTHER PUBLICATIONS

Alan Cane, "Countdown to User–Friendly Banking", Financial Times, pp. 30+, Nov. 1988.

Katherine Morrall, "Technology Updates Market Research Methods", Bank Marketing, v 26, n 4, pp. 15–20, Apr. 1994.

Ernest H. Schell, "How to Make Millions with Database Marketing", Datamation, v 38, n 16, pp. 77–79, Aug. 1, 1992.

James A. Craig, "A Network Architecture for Retail Bank Networks", Data Communications, v 17, n 11, pp. 173+, Oct. 1988.

Katherine Morrall, "Database Marketing Leaves Marketing to the Branches", Bank Marketing, v 26, n 11, pp. 22–30, Nov. 1994.

Brian Hellauer, "Banks Take Aim at Target Marketing", Bank Management, v 69, n 2, pp. A26–A31, Feb. 1993.

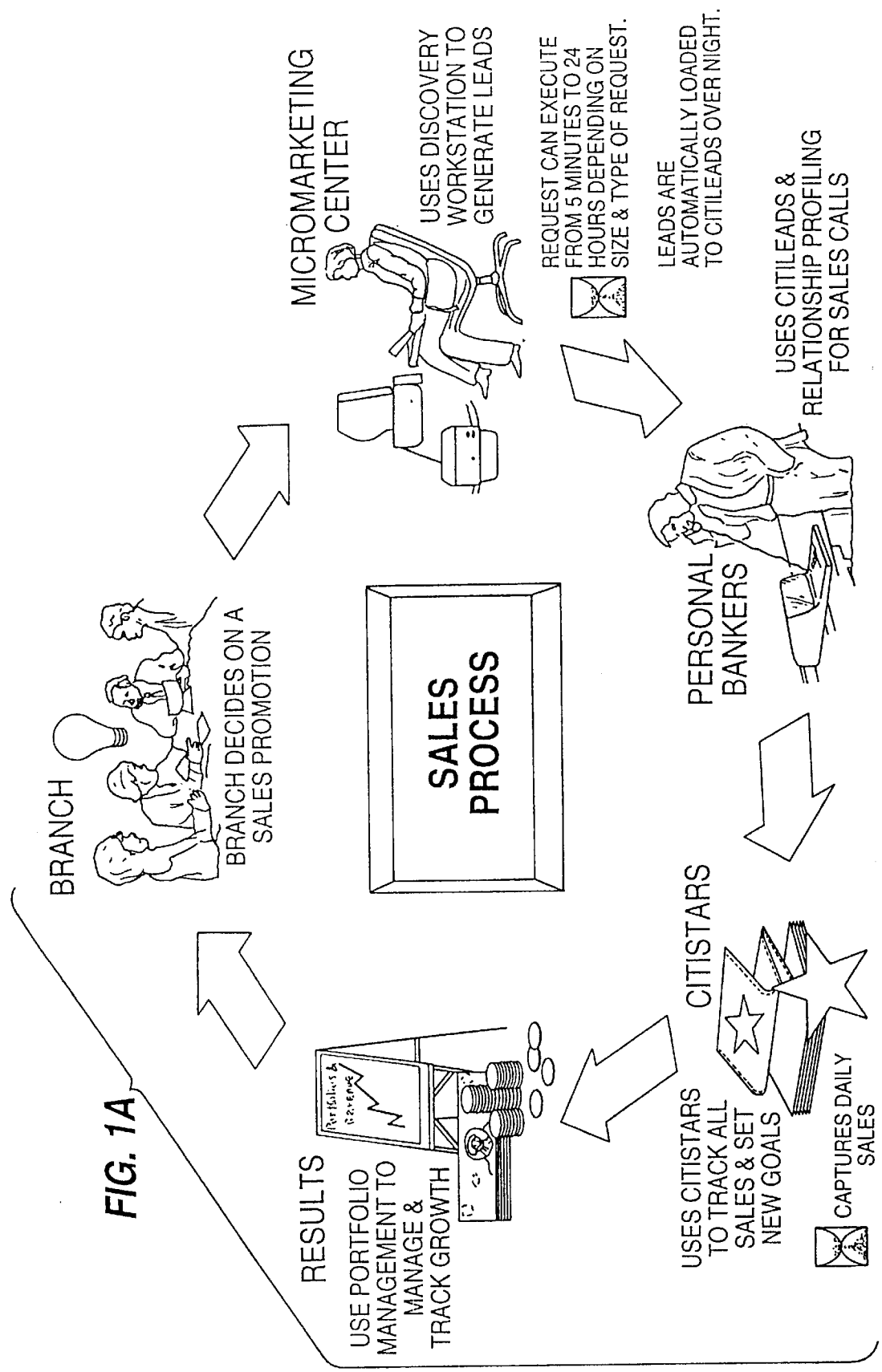

FIG. 5H

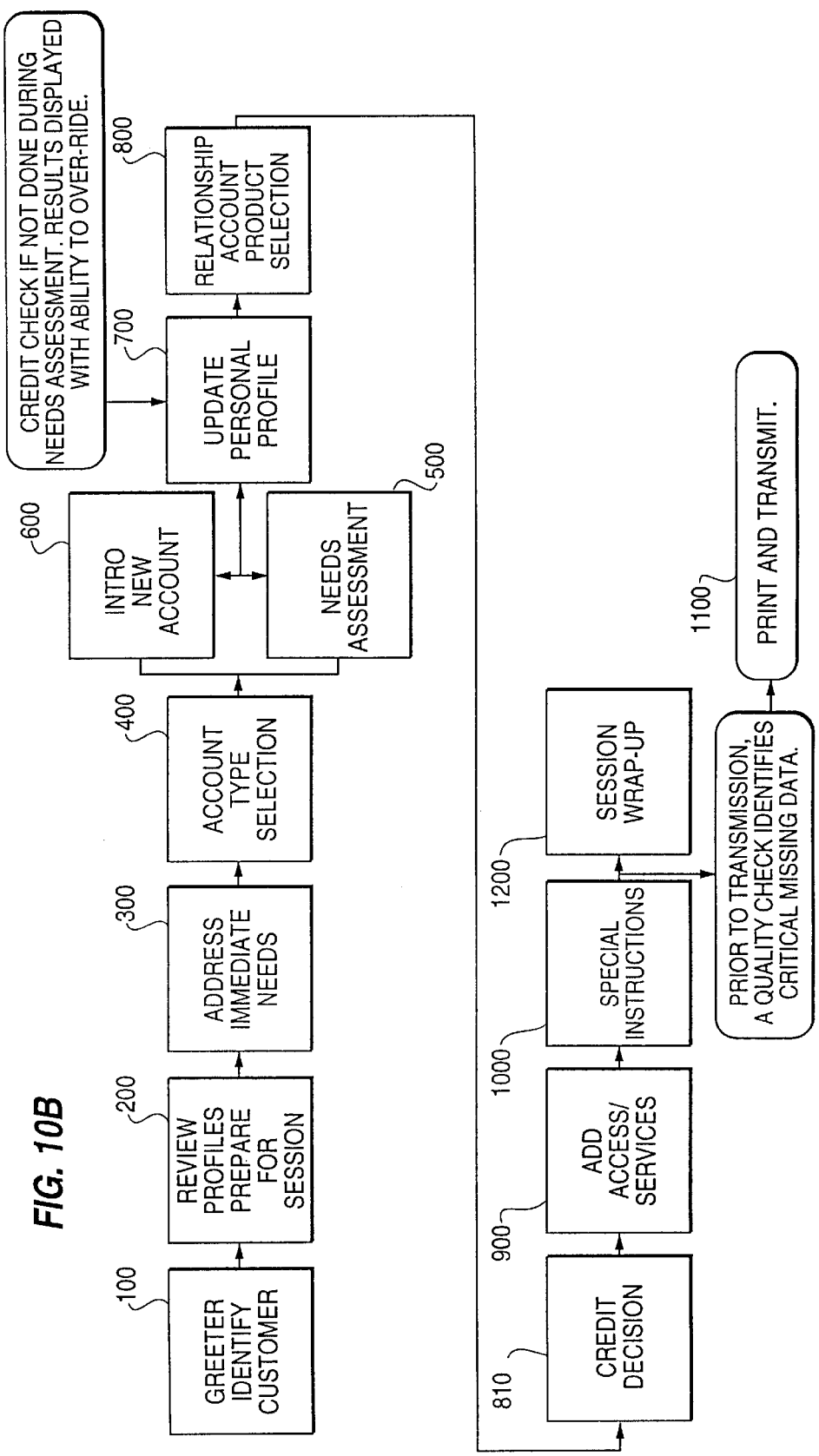

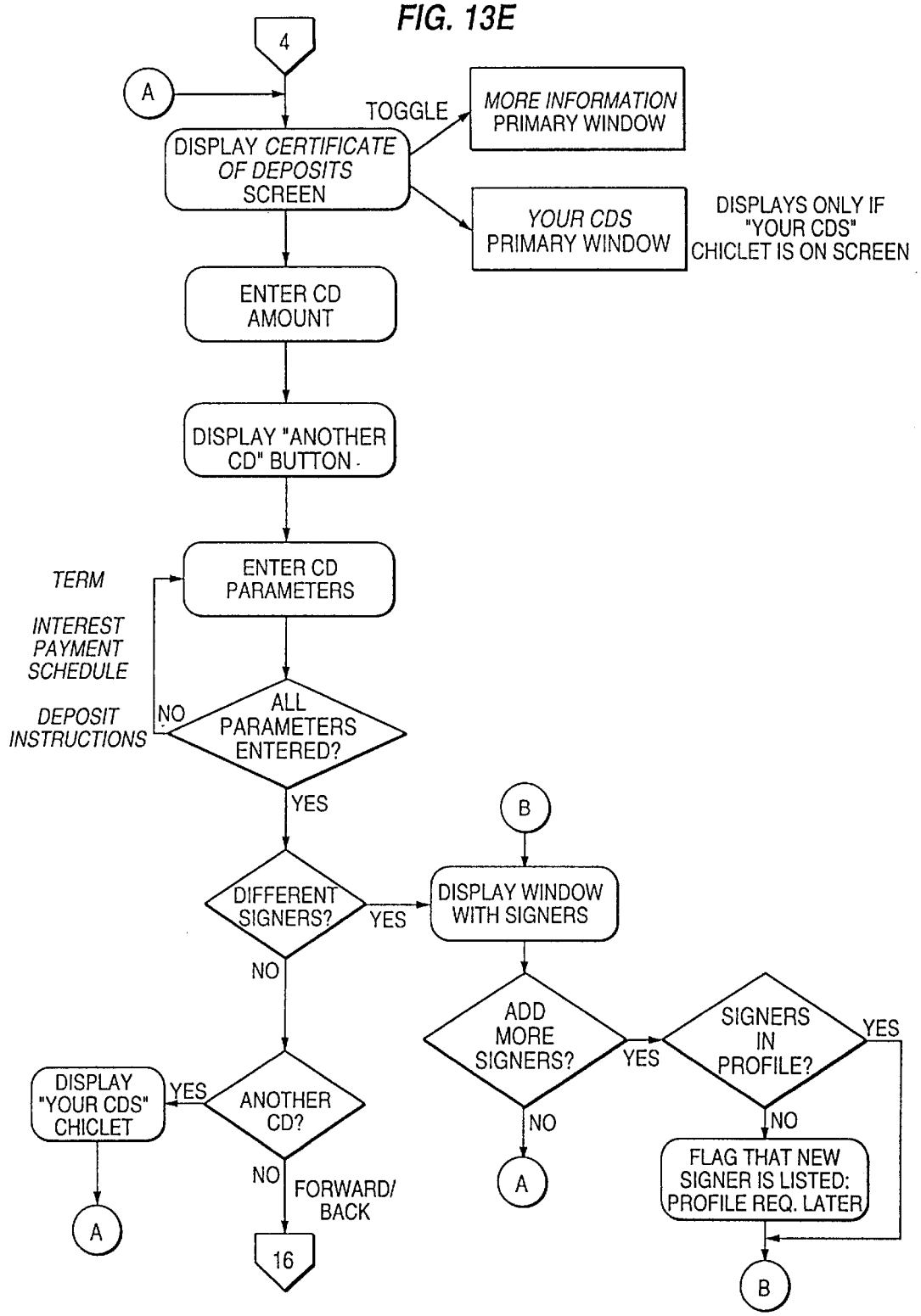

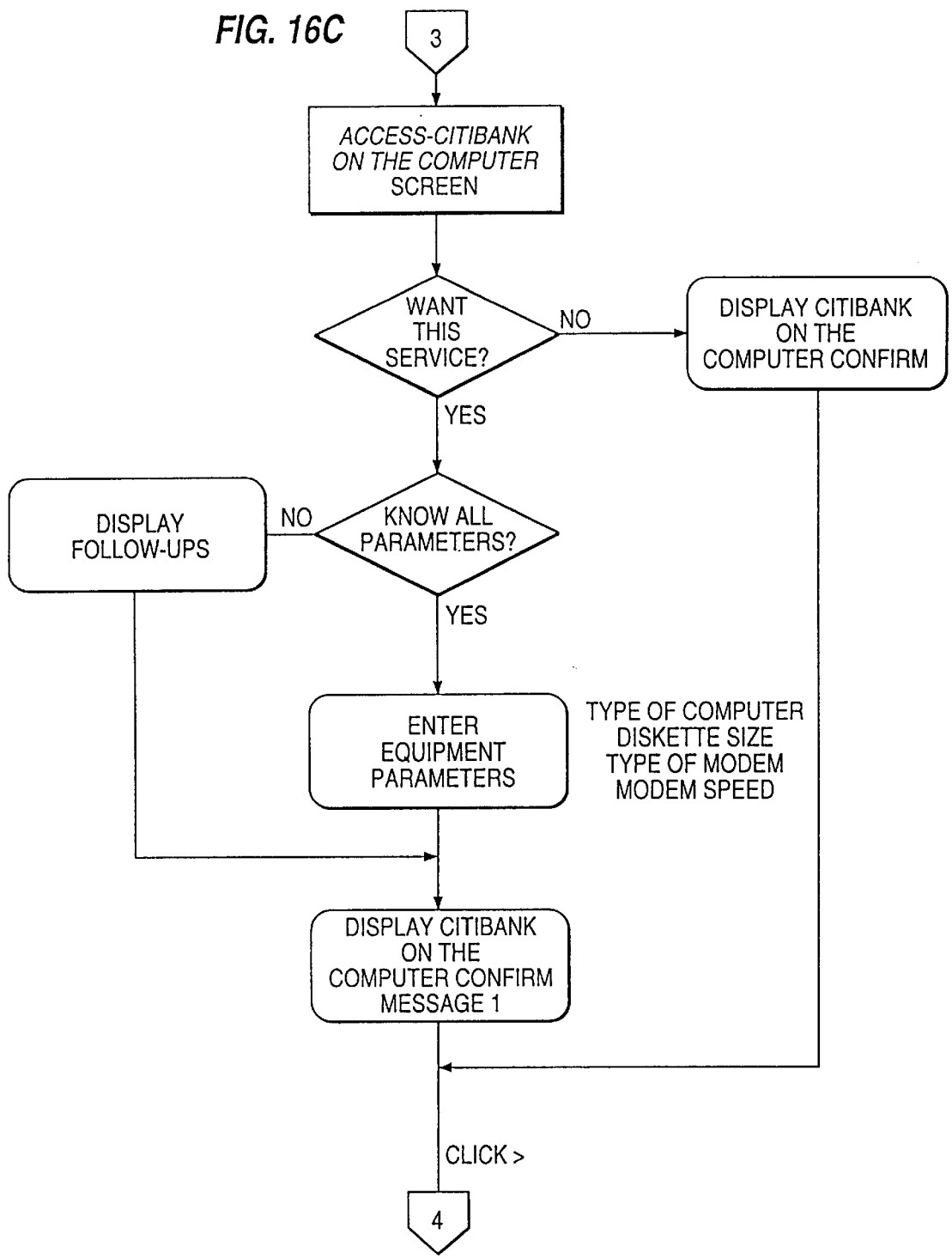

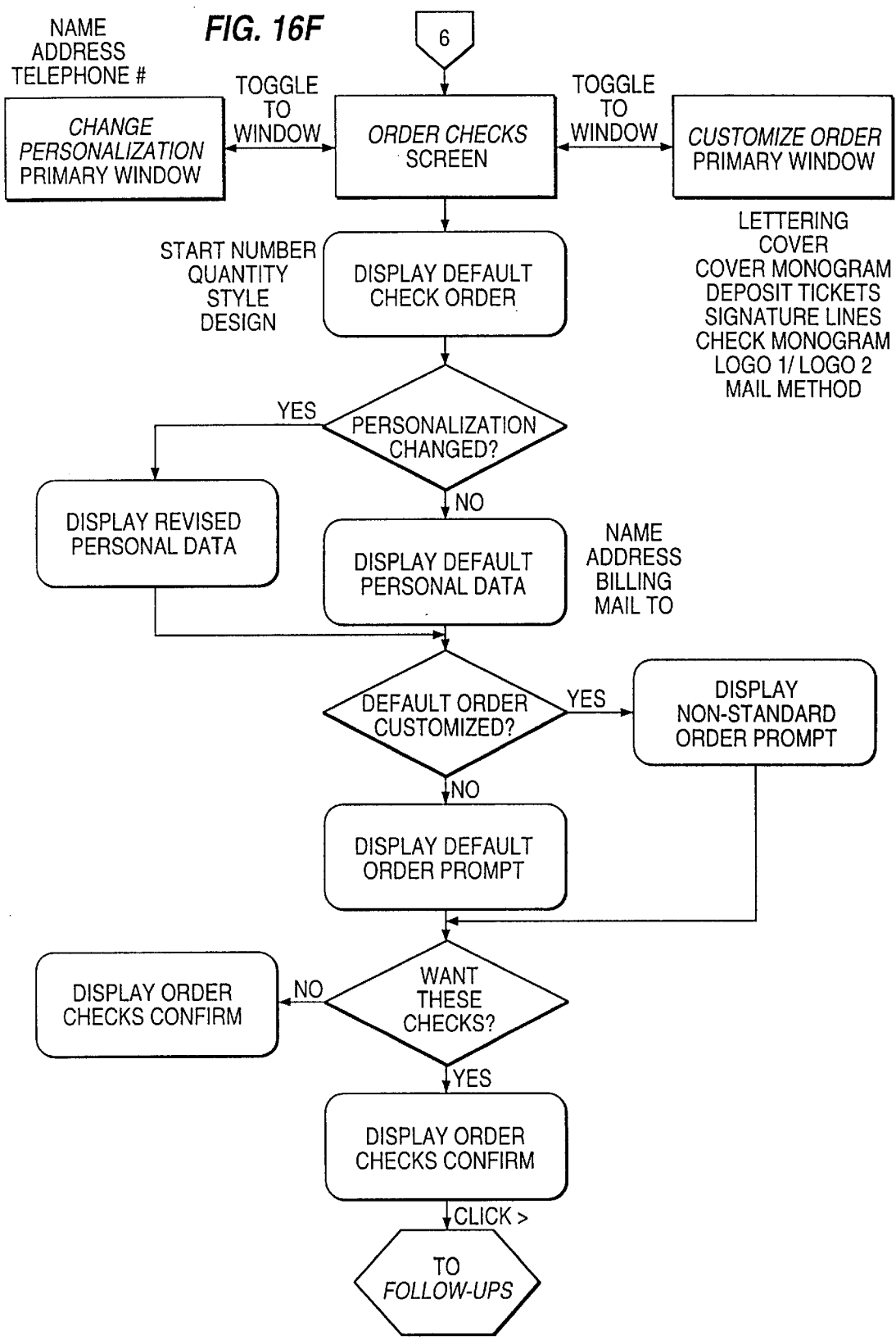

FIG. 18B

James Morrison

CITIBANK◇

▨▨CHECKING▨▨

AMOUNT $ _____ .00     NICKNAME _____

☒ CHECKING

☐ CHECKING WITH INTEREST                    INTEREST RATE      2.90%
   $6,000 MINIMUM BALANCE                   ANNUAL % YIELD     2.94%

☑ MORE INFORMATION
   - YOUR MONEY IS ALWAYS AVAILABLE
   - UNLIMITED DEPOSITS AND WITHDRAWALS

▨YOUR MONEY▨
▨IN THE BANK▨

SECURITIES
(NOT FDIC INSURED)

BORROWING
AND LOANS

CREDIT CARDS

FIG. 18C

James Morrison
123 Main St.
New York, NY 10001

CITIBANK

HERE IS YOUR CITIBANK ACCOUNT AS OF NOVEMBER 8, 1994

| | | BALANCE |
|---|---|---|
| YOUR MONEY IN THE BANK | CHECKING | $ 5,000.00 |
| | SAVINGS | .00 |
| | INSURED MONEY MARKET | .00 |
| | CDS | .00 |
| | RETIREMENT | .00 |
| | | $ 5,000.00 |
| | | MARKET VALUE |
| SECURITIES (NOT FDIC INSURED) | BROKERAGE | $ .00 |
| TOTAL | | $ 5,000.00 |

| | | YOUR BORROWING POWER | AMOUNT AVAILABLE | AMOUNT YOU OWE |
|---|---|---|---|---|
| BORROWING AND LOANS | PERSONAL LINE OF CREDIT | .00 | .00 | .00 |
| CREDIT CARDS | CITIBANK CREDIT CARD | | .00 | .00 |

ALT<- ALT-HOME

SALES AND MARKETING SUPPORT SYSTEM USING A CUSTOMER INFORMATION DATABASE

STATEMENT CONCERNING PARENT APPLICATION UNDER 35 U.S.C. 120

This application is a continuation-in-part of and claims the benefit of the earlier filing date, pursuant to 35 U.S.C. 120, of copending application Ser. No. 08/544,102 entitled ELECTRONIC SALES AND SERVICE SUPPORT SYSTEM AND METHOD filed Oct. 17, 1995, which application is currently pending.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates generally to a sales and service support system and method, and in particular, to an electronic sales and service support system and method for assisting customer service and identifying sales targets, distributing sales leads, enhancing sales tools, and tracking performance of sales and sales personnel.

BACKGROUND OF THE INVENTION

In response to increasing competition, financial institutions, like other service providers, have begun to adopt sales and service techniques that have been successful in other fields. Marketing financial services poses unique challenges, however. To begin with, most people do not shop for financial services. Instead, something in a customer's life occurs to cause a customer to make a change or be open to a change. There are moments in life when inertia is overcome; either by moving, death, formation of a family, or when a customer becomes angry enough to make a change. For these reasons large unfocused marketing of financial services is usually not effective. Instead, marketing of financial services must be targeted to those inclined to make a change or open other accounts. In the past, accurately identifying customers that are open to change and predicting when these events will occur has been difficult, if not impossible. Thus, there is a need for a better system and method for predicting when customers or potential customers will be open to change.

To anticipate a customer's needs and support targeted marketing, a service provider must know its customer. Knowing one's customers is also important for improved customer service, another proven way of getting and keeping new customers. Since knowing one's customers becomes more difficult when the number of customers increases and the frequency of each customer's contact with a particular employee decreases, the size of a large financial institution's customer base can present an obstacle to some marketing efforts. In the financial community today, a large financial institution may have several million households and customers each with a unique set of accounts. The data available for these households, customers, and accounts is so massive, that it has heretofore not been fully used for marketing campaigns.

In an effort to deal with a large customer database, businesses traditionally maintain customer records. In some cases these records are in the form of simple paper records, but recently electronic records have become common. Originally, separate data storage was used for each electronic record keeping application. Thus, each department in a financial institution, for example, would have a program that created and maintained records needed for its purpose. The problem with this approach is that information must be extensively duplicated. For example, a customer's name and address might appear in separate files in several separate departments.

There are other problems with application specific data storage. Since a customer's information is entered in more than one file, any change in status must be entered into each file, often by different people. Over time the accuracy and uniformity of the data deteriorates. In addition, the use of application specific data storage requires more data entry and more storage space.

The concept of a database, introduced more than twenty years ago, has come a long way toward eliminating these problems. In a database, data is stored in a central location so that there is no duplication of data. Database management programs are used to manage databases. Examples of currently available database management programs include DB2 (for larger databases) and dBase (for personal computers).

Typically, a database management system (DBMS) is used to manage the creation, storage, access, updating, deletion, and use of a database. A typical DBMS creates databases and their structures; provides the means for the control and administration of the data in the database; provides the means for users and application programs to access, enter, modify, and manipulate the data in a database; provides a report generator; provides "ad hoc" query facilities; provides reports to management on who accessed the database and what activity was performed; provides reports to operators on hardware utilization, status of current users, and other monitoring data; and provides automatic backup and recovery routines for the data in databases.

Multiple-user databases present several additional challenges. These include maintaining system performance as the number of users increases, controlling concurrent access of data, maintaining security, and administrating the database.

There are four basic database models: (1) hierarchical, (2) network, (3) relational, and (4) object-oriented. The hierarchical and network models use files for storing data. Data relationships in the hierarchical databases follow hierarchies, or trees, which reflect either a one-to-one or a one-to-many relationship among the record types. Data relationships in network databases follow a many-to-many relationship among the records. The data relationships must be defined at the time that a hierarchical or network database is created. Relational databases use tables for storing data. The data relationships can be dynamically determined by the users and do not have to be defined when the database is created. A relational database uses a database query language for users to access and manipulate data in the database. Query by example and structured query language are two database query languages. Object-oriented databases store data together with procedures in objects.

A relational database is composed of many tables in which data are stored. Tables in a relational database must have unique rows, and each cell or field must contain only one item of information, such as a name, address or identification number. A relational database management system (RDBMS) allows data to be readily created, maintained, manipulated, and retrieved from a relational database.

In most sophisticated databases, data is retrieved by querying the database. Query languages allow users to locate specific records based on the data that they contain. Known query languages include program-specific languages, structured query languages, natural languages, and query by example. When using query languages, the user typically specifies the rules the program follows to select records to be retrieved. These rules are referred to as criteria. Only those records matching the criteria specified are retrieved.

In a relational database, data relationships do not have to be predefined. Users query a relational database and establish data relationships spontaneously by joining common fields. A database query language acts as an interface between users and a relational database management system.

Two basic query styles are used in a relational database: (1) query by example, and (2) structured query language. In query by example, the database management system displays field information and users enter inquiry conditions in the desired fields.

Structured query language (SQL) is the standard database query language used with relational databases. SQL is part of a DBMS, not a separate stand-alone software program. SQL allows users to create and operate sets of related information that are stored in tables. The core of SQL is its flexibility in querying a database.

This flexibility is possible because of the manner in which data are stored in a relational database. Data are stored in tables that have specific properties. These properties include: (1) one or more named columns, (2) the data in each column are of the same type, (3) zero or more rows (zero rows occur when the table is defined but no data are entered yet), (4) every row is unique, (5) a single data value is contained in the intersection of any column and row, and (6) the order of the columns and rows does not matter.

There are two basic schemes for retrieving data from a database: set orientation and record orientation. Each method has advantages and disadvantages.

A set-oriented database allows the user to focus on the characteristics of the data rather than the physical structure of the data. The user works with data in groups, or sets, or tables, rather than as individual tables. DBMSs that use SQL, such as SQL Server, Oracle, and SQL Base, are set-oriented.

Record-oriented databases access data based on the physical structure of data and indexing. A record pointer permits the user to maneuver through a table one record at a time. It is easy to access successive rows or records in a table. However, the developer of the database management system must write the programming code such that it will loop through every record requested, which is a disadvantage. Examples of DBMSs that use a record-oriented approach are dBASE and Clipper.

In SQL, security is maintained by the granting authority. Authority may be granted to an entire database, certain tables, or certain commands. A database administrator must have access to the entire database so that it can be maintained properly, while a user generally needs access to specific tables or parts of tables. For example, a person might have access to a personnel table but not to the salary column in that table.

Attempts to build and use customer databases have a variety of limitations. In a general sense, these limitations fall into two distinct categories: limitations in the sources and quality of data input into the database and limitations on one's ability to search and retrieve data from the database. In some cases these limitations work in opposition to one another. For example, as one improves the size and quality of a databases, searching and retrieving data from the database becomes more difficult.

In recent years, financial institutions, such as banks, have used targeted marketing (especially direct mailing and telemarketing) to market a wide variety of financial products and services to existing and new customers. To assist these efforts, the banks have used traditional databases containing, for example, customer lists and mailing lists. These traditional targeted marketing sources do not, however, take full advantage of the information available to full service financial institutions.

Full service financial institutions typically offer consumers a wide variety of financial products, including traditional deposit, investment, loan, and mortgage accounts, as well as a variety of financial services, including credit cards, brokerage, direct access, business access, checks as cash, telephone bill payment, and safety check. In addition, financial institutions now typically offer access to financial services through a variety of means, including automatic teller machines (ATMs), customer activated terminals (CATs), screen phones, personal computers configured for banking, personal digital assistants, voice response systems, and smart cards, as well as traditional human bank tellers. Information from these diverse sources provides an unusually complete picture of a customer's financial habits and needs. Thus, the ability to store and retrieve this wealth of data in a meaningful way has enormous commercial potential. Despite this commercial potential, there remains a need for a system and method for assembling a comprehensive database from these diverse sources and retrieving information from the central database in a meaningful and practical way.

There are several deficiencies in currently available systems and methods for assembling customer financial data and retrieving information for use in marketing and customer service systems. To begin with, most users (e.g., bank employees) never learn how to use complex query languages. Mastery of the language requires significant training and skill. Instead, developers write custom applications that are used by users having only a limited understanding of the program. Thus, a user's ability to use a database is often limited by the custom applications written by someone else for their use. Consequently, available large scale database systems typically don't have the flexibility to allow the user, the person most familiar with marketing, to use their own knowledge and experience to select criteria retrieving data from the database for targeted marketing. Instead, users must rely on a set of predefined queries that may or may not provide the desired results. As a result, the sales campaigns typically only target easily ascertainable groups of new or existing customers, such as all new customers, or all existing customers with certain types of accounts, etc. Since there has been no effective way to quickly generate and distribute lists of sales leads for very specific groups of people that are most likely to subscribe to new financial services being offered, those customers who most likely need or want the additional products a financial institution has to offer are not always the ones targeted by the sales campaigns. This has resulted in less than satisfactory success rates for marketing campaigns.

In addition, those in charge of marketing are often not given access to a customers' entire relationship with the financial institution or complete demographic information about the customer (i.e., the customer's "profile"). Thus, it is difficult for direct mail and telemarketers to address the targeted customers intelligently, with full knowledge of the customer's background and financial situation. Basic information about existing customers is frequently not available, or the response time required to profile an existing customer is too long. These problems tend to create a poor experience for the customer and less than optimum sales performance.

In addition, the sales performance of bank branches, branch managers, and others in charge of the marketing campaigns has not been analyzed and tracked effectively. A complete indication of sales performance has typically only been available after the sales campaigns are complete and after the results of the campaigns are manually collected and analyzed. This typically required a series of paper-based forms and ad hoc systems that generated relatively slow feedback to sales personnel. Thus, there is also a need for a system to provide up-to-date on-line sales summary reports for each of the products and services marketed by the branches, as well as an indication of performance by the individual sales personnel.

In short, there remains a need for an improved integrated system for identifying sales targets, distributing sales leads, enhancing sales tools, and tracking the performance of large sales campaigns and individual salespersons to maximize customer satisfaction, as well as the profit of the financial institution.

SUMMARY OF THE INVENTION

It is thus an object of the present invention to provide an electronic sales and service support system that provides improved identification of sales targets using a centralized database and acts as a tool for improved customer service and relationship building. More specifically, the present invention is directed to a system that allows a bank to predict and take advantage of the rare times when inertia is overcome and a customer is open to changing banks or opening new accounts while at the same time allowing the bank to build or cement a relationship with existing and new customers.

The system of the present invention is also useful for improving customer service and reducing customer attrition by strengthening the banks relationship with the customer. Specifically, studies have shown that as a customer's relationship with a bank broadens, the customer's balances increase, and hence the customer's profitability to the financial institution also increases. Moreover, the more closely a customer is tied to a bank, the more difficult it is to change banks. The present invention provides a tool for establishing a long term and broad relationship with a customer by allowing those in charge of marketing financial services to access and discuss the full range of financial services presently used by the customer, as well as to only target optimum groups of customers for each marketing campaign conducted.

It is a further object of the present invention to provide a system and method for standardizing and householding information from internal and external sources into a centralized database of a financial institution to support marketing activities.

It is a further object of the present invention to provide a system for efficiently assembling and retrieving information from a centralized database containing a high volume of financial and demographic data to support marketing activities.

It is a further object of the present invention to provide a system that quickly generates and distributes lists of sales leads to marketing personnel.

It is a further object of the present invention to provide a system that provides marketing personnel with a dynamic view of a customer's financial and demographic profile during a marketing session.

It is a further object of the present invention to provide an on-line performance tracking system for tracking the performance of sales campaigns and individual salespersons.

Additional objects, advantages and novel features of the invention will be set forth in the following description and will become apparent to those skilled in the art upon reading this description or practicing the invention. The objects and advantages of the invention may be realized and attained by the appended claims.

The present invention meets these objectives by providing a system and method for assembling a comprehensive database from diverse sources and retrieving information from the central database in a meaningful and practical way. The system and method of the present invention are primarily, but not exclusively useful for supporting large-scale marketing activities, especially for large financial institutions.

The system of the present invention preferably includes a central database, one or more micromarketing centers having a plurality of user workstations, a central customer information system ("CCIS") having a plurality of branch workstations and an account opening system ("AOS"). These components are linked together through telecommunication or other means so that the micromarketing centers, the CCIS and the account opening system can communicate electronically with the central database. The central customer information system ("CCIS") preferably includes a relationship profile component, an account management component, a lead management system, or a sales tracking and reporting (management information system or "MIS") component.

In a broad sense, the system of the present invention links all of the components of a large commercial bank. Specifically, the massive central database is linked to user work stations to allow users to query the database. According to one aspect of the present invention, a graphical interface is provided to allow users that are not familiar with structured query language to nonetheless obtain information from the database. The database is also linked to a central customer information system (CCIS). The present invention ties all of these components together and provides a systematic way of targeting customers and tracking the success of customers solicitations.

Using the system of the present invention, a branch may decide on a campaign and coordinate the campaigning with a regional micromarketing center. The system of the present invention can be used to target customers and generate lists.

In accordance with an important aspect of the present invention, the system of the present invention is linked directly to on-line branch systems. In this way, leads, preferable loaded by the micromarketing center can be automatically sent to the branches. Regional micromarketing centers are particularly important to the system and process of the present invention. In particular, the present invention provides micromarketing centers with the ability to generate lists identifying various types of mailing addresses and providing a link to on-line CCIS branch systems. This gives the regional micromarketing center all the capabilities available in the analytical work station.

Moreover, the micromarketing center can suppress various types of addresses, for example, business or legal addresses. The leads generated using this approach can be automatically uploaded overnight to a system for providing the leads directly to the branches.

In connection with the regional micromarketing center, the system of the present invention includes a graphical user interface that allows the regional micromarketing center to generate lists identifying various types of mailing addresses and linking to the on-line CCIS branch systems. This allows the original marketing center to direct leads to a specific campaign. In general, the process flow may be described as follows. Initially, branch users (bank management) decides on a sales promotion. The sales promotion concept is communicated to the regional micromarketing center. The system allows the regional micromarketing center to use the user work station to generate leads. Typically, a request can execute from 5 minutes to 24 hours depending on size and type of request. Leads are automatically loaded to a system for providing leads to the branch users and personal bankers overnight. The personal bankers may then use the leads and relationship profiling for sales calls.

The central customer information system ("CCIS") preferably includes a relationship profile component, an account management component, a lead management system, or a sales tracking and reporting (management information system or "MIS") component. Each component can generate reports, which are provided to the branch to complete the sales process.

The electronic sales and service support system is preferably capable of interfacing with a system for opening a single account that includes a full range of financial components. Thus, the integrated system of the present invention also preferably includes a system for opening an account, preferably in a single session. The system is preferably in communication with the central database, micromarketing centers, central customer information systems and branch systems of the present invention so that data can pass between these systems where legal and appropriate.

The central database underlies all of the applications of the present invention, while the micromarketing centers, the CCIS and the account opening system are used to access the central database information (and in some cases supply information to the central database). The central database of the present invention is a comprehensive and enriched database that includes information about all customers and products in the financial institution, including branch products, bank cards, travel and entertainment cards, student loans, investments, insurance and mortgage products.

The central database is designed to insure the accuracy of the information and to make the information easier to use by non-technical staff. Thus, the system includes means for scrubbing and standardizing incoming information, householding, building history, calculating status codes, maintaining tables and calculating strategic flags. Most fields in the central database are preferably updated monthly with information captured at month end.

In the preferred embodiment, the central database stores, in one location, information from various businesses and markets within the financial institution. The central database may include information concerning existing customer financial information, information from outside sources, and demographic information about existing and potential customers. In the preferred embodiment, the central database is housed in a mainframe computer and includes a large repository of financial and demographic data. Information is fed into the database from a variety of sources, including business and credit card feeds from the financial institution for each product and service offered by the institution, and feeds from outside vendors. The outside vendor feeds preferably include all publicly available demographic information, phone numbers, addresses, tax and property records, and so forth.

The data from these sources is stored in a uniform format. For this purpose, a uniform storage or householding algorithm, a name and address standardization process, and a merge process may be used. In addition, the information is preferably maintained in the central database in a three-tier hierarchy so that it can be accessed selectively at household, customer, and account levels. A given household may have one or more customers, and each customer in a household may have a number of different accounts.

Thus, the central database serves as a single central repository for storing all customer related information throughout the business. As described hereinafter, the central database can be used for a wide variety of customer service, financial analysis and marketing purposes.

While a single central repository for storing all customer related information throughout a business offers significant potential, the database is necessarily so large that certain problems arise. For example, the present inventors recognize that a database of this size cannot practically be directly searched. Thus, in accordance with another aspect of the present invention, the system of the present invention includes means for allowing users to dynamically build programs for searching the central database.

The workstations of the micromarketing center of the present invention include means, preferably in the form of software designed to run on a general purpose computer, for generating a graphic user interface ("GUI") that runs on a Windows™ PC or Macintosh™ computer. The means, again preferably software for directing a general purpose computer, provides a local copy of all the tables and structures on the central database that are used by the workstation. This insures that all users have the latest definitions and fields.

In addition, the system includes means for walking users through each step of searching the central database, using pull-down windows, icons, drag-and-drop, and other features that are familiar to users. Moreover, the system includes means for building "proper" SQL queries for each request, and hiding the special codes and syntax required to insure that these queries will run. Finally, the system includes means for downloading reports and files to local printers or storage devices.

The workstations of the micromarketing center also have the capability to, among other things, search the information contained on the central database and generate lists of leads (i.e., sales targets) for marketing campaigns. The micromarketing workstations allow the user to build a query, define or design a report, run the process, i.e., run the query, run the results of the query into a report, and then download or export the report.

The micromarketing workstation also allows the user to generate marketing information or leads and feed the leads directly into the CCIS. A plurality of micromarketing workstations may be used within the micromarketing center to respond to requests from branch managers for lists of leads for selected sales programs (i.e., marketing campaigns for new or existing products or services offered by the financial institution). The micromarketing center works with the branch managers to determine the profile of households, customers, or accounts most likely to purchase the products or services. The micromarketing center then constructs a specific query, runs the query against the central database, and generates a report containing an optimum list of leads to pursue for the marketing campaign.

The workstations at the micromarketing center have the capability to search the central database and extract a list of all households, customers, or accounts that meet specific selection criteria. The list of leads are used to target a direct mailing to the customers or households that meet the specific selection criteria for the sales campaign, or the list of leads is sent directly to the CCIS for telemarketing.

The CCIS of the present invention is a marketing, management and sales tool. It includes several integrated components that are used to view customer information and manage customer contacts and relationships. Relationship management components support a comprehensive sales process. The system provides the following features: a relationship profile that allows appropriate staff members to view household and customer account and balance information both in detail and summary form; account management features that allow bankers to enroll customers in programs such as portfolio management and personal relationship management; a relationship building feature that delivers prioritized call lists on-line and tracks results; a promotional suppression facility that provides information on customers and noncustomers who do not wish to be contacted by telephone and/or by mail; and a contact history feature that displays recent promotional contacts to each customer.

The CCIS performs a number of functions related to the sales campaign. To better understand the CCIS, a brief description of the hierarchy of a financial institution for which the CCIS is used will first be provided. A large financial institution, such as Citibank N.A., is organized into a number of separate community banks in different geographic regions. Each community bank includes a number of separate bank branches. The bank branches, in turn, typically have a branch manager and a number of personal bankers. The CCIS preferably includes workstations located in the bank branches for each of the personal bankers and branch managers, and also in the main office of the community bank for the officers or sales managers of the bank. Each of the various workstations has a different function, depending upon the user's responsibilities and duties within the bank.

The branch managers receive the list of leads generated by the micromarketing center and electronically load the leads into the CCIS workstations for distribution among selected personal bankers within the branch. The branch managers assign the leads to the personal bankers most qualified to handle the leads, or based on the workload and availability of the personal bankers.

The personal bankers receive access to the list of leads on the CCIS workstation, after the list is generated by the micromarketing center and communicated to the CCIS. The personal bankers then conduct sales sessions (e.g., telephone calls) with each of the customers on the list of leads. Before and during the sales sessions, the personal bankers use the CCIS to view a complete profile (in detail or in summary form) of the customer's relationship with the bank and any other demographic information about the customer contained on the central database. This allows the personal banker to speak intelligently with the customer during the sales session and thereby increase the success rate of the marketing campaign.

The branch managers and bank officers, in turn, use the CCIS as a tracking and reporting management tool to automatically capture daily sales information. The branch managers and bank officers access the detailed sales transactions for each personal banker using the CCIS, and view the sales results for the various campaigns to track the performance and make adjustments in the campaigns as necessary. The branch managers and bank officers also use the CCIS to reassign leads among personal bankers and/or branches to optimize the use of marketing resources.

The present invention also preferably includes a system for opening an account, preferably in a single session, that includes means for collecting data concerning customer's financial and/or investment situation, means for performing a needs analysis based on the data collected, means for displaying account information, means for making recommendations based upon the needs assessment, means for inputting a customer's component selection, means for adding account components to a single account to build a single account that provides all the services desired by the customer and best satisfies the customer's needs, means for performing a credit check, means for determining a single fee based upon services provided, means for authorizing a customer's use of remote access products including means for issuing a bank card and personal identification code; means for identifying missing data and means for prompting the user to enter data that has not been provided. The system also includes means for linking data fields in each component such that once a piece of data is collected, the data is provided to all appropriate data fields. In addition, the system is constructed such that the user can bypass a data field and provide the data later in the session. The system is preferably in communication with the central database, micromarketing centers and branch systems of the present invention so that data can pass between these systems where legal and appropriate.

An important aspect of the system of the present invention is that it permits data to flow up and down through the process so that once a salient piece of data is collected, the data is transmitted to every location where it is needed. In other words, all similar data fields are linked. This provides several advantages. First, the user (bank employee) never has to ask the customer for data that has previously been provided—even if some other user collected the data. Secondly, the system users have flexibility to collect data at an appropriate time in their presentation to the customer. Thirdly, where legal and appropriate, information can be obtained from other sources, such as the central database of the present invention to simplify the process. Similarly, information obtained during the account opening process can be used by other portions of the integrated system of the present invention such as the lead management system or sales tracking and reporting (management information system or "MIS") component of the central customer information system ("CCIS").

The system of the present invention also preferably includes a pending file storage means for storing salient data that has been collected, but is not immediately needed. In this way, if the data is needed during a subsequent visit by the customer to the bank, the data can be retrieved without asking the customer to provide data that she or he has already provided. Again, information obtained during the account opening process and stored in a pending file can be used by other portions of the integrated system of the present invention such as the lead management system or sales tracking and reporting (management information system or "MIS") component of the central customer information system ("CCIS").

Thus, the present invention provides an integrated sales process support system, comprising: a central database, means for inputting data into the central database from a plurality of sources, means for standardizing input data in the central database in a plurality of organizational levels, a plurality of user workstations that are geographically remote from the central database, each of the user workstations including database and display means, the workstations including means for generating a graphic user interface for allowing a user to select search criteria blocks to graphically build a graphically constructed search query, said graphic user interface including pull-down windows, icons, and drag-and-drop operation, a plurality of branch workstations connected to each user workstation by telecommunication means, and means for transmitting data records from the user workstation to the plurality of branch workstations, a central customer information system, the central customer information system being geographically separated from, but linked for electronic communication to the branch workstations, means for converting the graphically constructed search query into a text query that includes necessary codes and syntax required to insure that the text query will run, means for allowing data communication between the user workstations and the central database, means for searching the database in response to structured queries received from one of the user workstations and identifying records that match said queries; and means for downloading data concerning the records that match said queries to the user workstation.

The central customer information system contains a plurality of customer profiles, each customer profile including demographic information and customer financial information including credit information and financial goals; means for performing a needs analysis based on information contained in the central customer information system, recommending an account based on the needs analysis and presenting information concerning the component of the selected account to the customer; and means for allowing data communication between the central customer information system and the central database.

The central customer information system is preferably geographically remote from the central database. As used throughout this application, the terms "geographically separated" and "geographically remote" are intended to refer to a significant spatial separation such as locations in different cities or states and is not intended to refer to adjacent rooms or floors of a building. In connection with the preferred embodiment, the "geographically separated" and "geographically remote" systems are maintained in different regions of the country such as, for example, New York, Washington, California, Texas and Florida.

The system can also include means for tracking customer arrivals at branch offices; and wherein the system further comprises means for tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

The present invention also provides a process of identifying sales targets, distributing sales leads, and enhancing sales tools for a marketing campaign, for use in connection with a system that includes a central database; means for inputting data into the central database from a plurality of sources; means for searching the database in response to structured queries and identifying records that match said queries; at least one micromarketing center having a plurality of user workstations in electronic communication with said central database; a plurality of geographically separated branch systems, each branch system including at least one branch workstation; and a central customer information system, the central customer information system being geographically separated from, but linked for electronic communication to, the workstations at the branch systems.

The process comprises the steps of: inputting data into the central database from a plurality of sources; standardizing and householding said input data into a plurality of organizational levels within said central database; communicating a sales campaign concept to the micromarketing center; generating leads based on the sales campaign concept by entering criteria into a user interface of said user workstation for defining a list of customers to target during the sales campaign; building structured queries in response to the selected criteria and searching the central database using said structured queries, identifying records in said central database that match said selected criteria, and generating said list of customers to target during the sales campaign and electronically distributing said list of customers to said branch workstations.

The process may also include the steps of: displaying a profile containing information about a customer from said list of customers on said branch workstation during a sales session with said customer during the sales campaign. In addition process may include the step of using a graphical user interface that allows the micromarketing center to generate a file containing mailing addresses and transferring the file to geographically separated branch systems.

The process may also include the steps of tracking customer arrivals at branch offices and tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

Again, as used in this application, the terms "geographically separated" and "geographically remote" are intended to refer to a significant spatial separation such as locations in different cities or states and is not intended to refer to adjacent rooms or floors of a building. In connection with the preferred embodiment, the "geographically separated" and "geographically remote" systems are maintained in different regions of the country such as, for example, New York, Washington, California, Texas and Florida.

BRIEF DESCRIPTION OF THE DRAWINGS

The present invention will become more clearly appreciated as the disclosure of the present invention is made with reference to the accompanying drawings wherein:

FIG. 1A is a diagram of the sales process flow using the system and process of the present invention.

FIGS. 5A–5H are various graphical user interface displays for the workstations in the micromarketing center illustrating the process of logging on, constructing a query, defining a process for running the query and generating a report, directing leads to a specific campaign and downloading a file to an on-line branch system.

FIG. 10B is a block diagram showing the steps in a preferred embodiment of a method of opening an account with an existing customer in the integrated financial system of the present invention.

FIGS. 13A–13M are a flow chart showing the preferred process for performing the step of building an account in the method of FIG. 10.

FIGS. 16A–16F are flow charts showing the preferred process of performing the step of setting access levels according to the method of FIG. 10.

FIGS. 18A–18C depict examples of statement facsimile screen displays generated by the system of the present invention.

DETAILED DESCRIPTION OF THE PREFERRED EMBODIMENT

Figure 1:
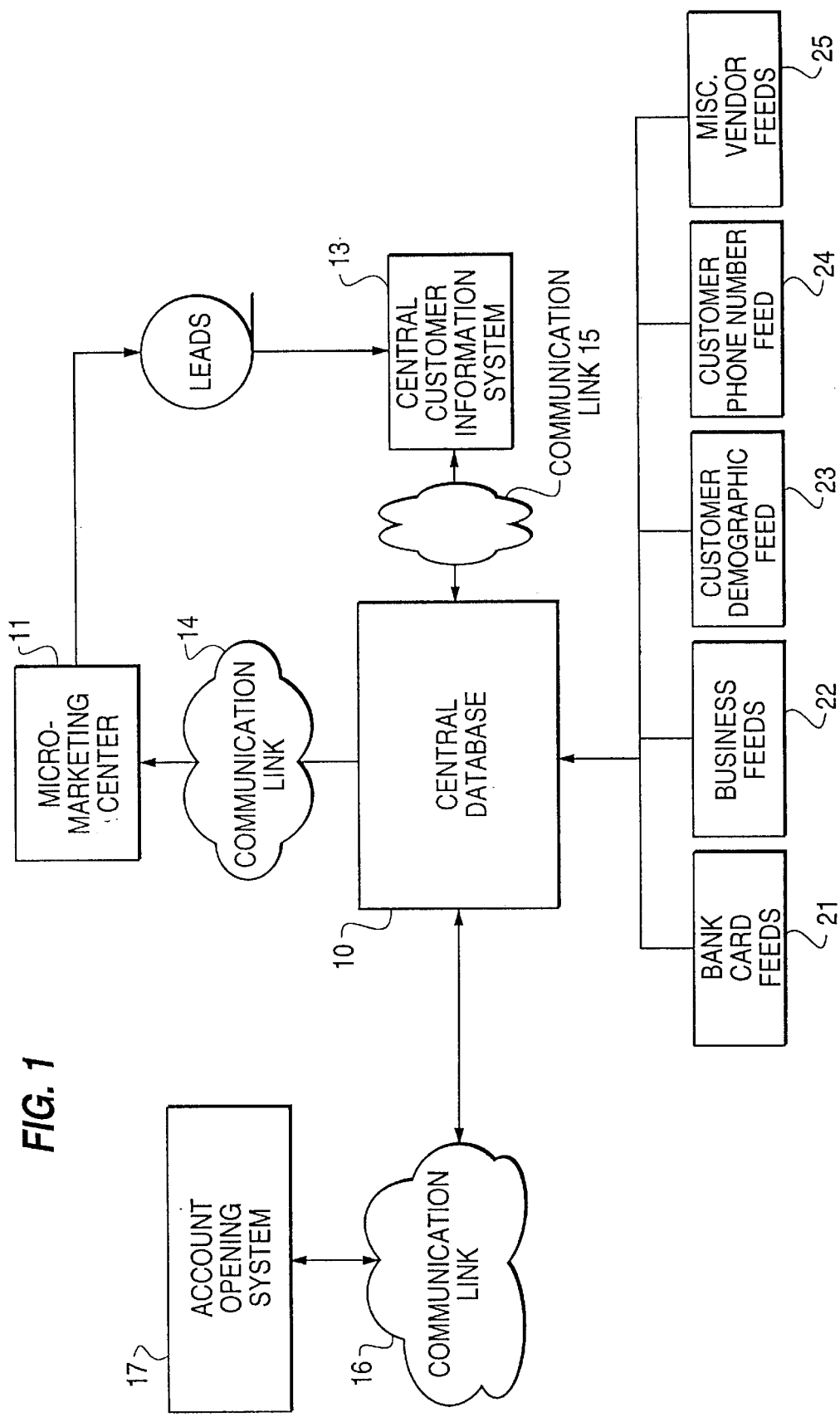
FIG. 1 is a high level view of the sales and service support system of the present invention.

The system of the present invention links all of the components of a large commercial bank to facilitate the sales process. Specifically, a massive database is linked to user work stations to allow users to query the database. According to one aspect of the present invention, a graphical interface is provided to allow users that are not familiar with structured query language to nonetheless obtain information from the database. The database is also linked to a central customer information system (CCIS). The present invention ties all of these components together and provides a systematic way of targeting customers and tracking the success of customers solicitations.

Using the system of the present invention, a branch may decide on a campaign and coordinate the campaign with a regional micromarketing center. The system of the present invention can be used to target customers and generate lists.

In accordance with an important aspect of the present invention, the system of the present invention is linked directly to on-line branch systems. In this way, leads, preferable loaded by the micromarketing center can be automatically sent to the branches. Regional micromarketing centers are particularly important to the system and process of the present invention. In particular, the present invention provides micromarketing centers with the ability to generate lists identifying various types of mailing addresses and providing a link to on-line CCIS branch systems. This gives the regional micromarketing center all the capabilities available in the analytical work station. Moreover, the micromarketing center can suppress various types of addresses, for example, business or legal addresses. The leads generated using this approach can be automatically uploaded overnight to a system for providing the leads directly to the branches.

In connection with the regional micromarketing center, the system of the present invention includes a graphical user interface that allows the regional micromarketing center to generate lists identifying various types of mailing addresses and linking to the on-line CCIS branch systems. This allows the original marketing center to direct leads to a specific campaign. In general, the sales process flow may be described as follows with reference to FIG. 1A.

Initially, branch users (bank management) decide on a sales promotion. The sales promotion concept is communicated to the regional micromarketing center. The system allows the regional micromarketing center to use the user work station to generate leads. Typically, a request can execute from 5 minutes to 24 hours depending on size and type of request. Leads are automatically loaded to a system (preferably a component of the CCIS) for providing leads to the branch users and personal bankers overnight. The personal bankers may then use the leads and relationship profiling (also a component of the CCIS) for sales calls.

The central customer information system ("CCIS") preferably includes a relationship profile component, an account management component, a lead management system, or a sales tracking and reporting (management information system or "MIS") component. Each component can generate reports, which are provided to the users (branch management) to complete the sales process.

The electronic sales and service support system is preferably capable of interfacing with a system for opening a single account that includes a full range of financial components. Thus, the integrated system of the present invention also preferably includes a system for opening an account, preferably in a single session. The system is preferably in communication with the central database, micromarketing centers, central customer information systems and branch systems of the present invention so that data can pass between these systems where legal and appropriate.

Reference will now be made in detail to a preferred embodiment of the invention, an example of which is illustrated in the accompanying drawings.

Figure 2:
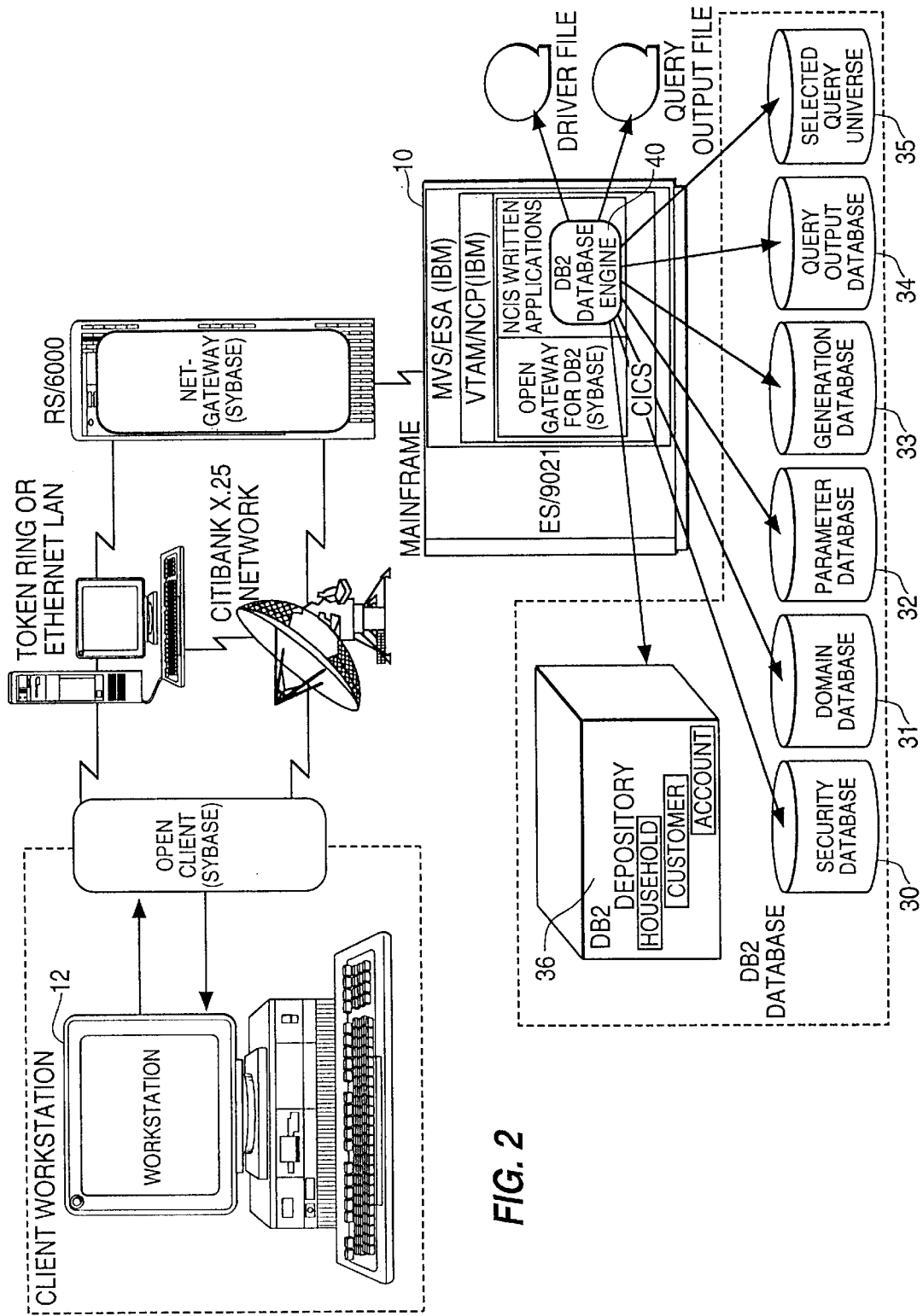
FIG. 2 is a schematic view showing the components of the central database.

FIGS. 1 and 2 provide an overview of the system of the present invention. The system includes a central database 10, a micromarketing center 11 with a plurality of workstations 12, a central customer information system ("CCIS") 13 and an account opening system (AOS) 17. These components may be "geographically separated" or "geographically remote" from one another and linked together through telecommunication links 14, 15 (e.g., an X.25 network) or other means so that both the micromarketing center 11 and the CCIS 13 communicate electronically with the central database 10. As used throughout this application, the terms "geographically separated" and "geographically remote" are intended to refer to a significant spatial separation such as locations in different cities or states and is not intended to refer to adjacent rooms or floors of a building. In connection with the preferred embodiment, the "geographically separated" and "geographically remote" systems are maintained in different regions of the country such as, for example, New York, Washington, California, Texas and Florida.

More particularly, the workstations 12 of the micromarketing center 11 include software, such as Omnis 7, that communicates through a SYBASE gateway and a token ring network with the mainframe computer of the central database 10. In this manner, the system has the capability to be accessed from any remote location, provided the user has authorization to pull the requested queries or reports.

As used in the following description, a "lead" is a customer or non-customer specifically targeted for a sales effort based upon a probable need. The lead can be self-identified, part of an ongoing effort, or part of a short term campaign. A "campaign" is a group of targeted sales leads (customer or non-customer) that are managed through the CCIS 13 to introduce or expand new or existing products and services offered by the financial institution.

A "session" as used herein is a meeting, typically by telephone, between a personal banker or other sales representative and a customer that results in the sale of products or results in services being delivered to the customer and/or other members of the customer's household. Sessions are used to meet with the customer, to discuss the customer's management needs, and to offer products and services to satisfy the customer's needs.

The term "product" typically refers to such items as deposits, investments, loans, or mortgage accounts of a financial institution. The term "service" typically refers to things offered by the institution other than deposits, investments, or credit accounts, such as, credit cards, brokerage, direct access, checks as cash, phone bill payment, safety checks, and so forth. The terms "product" and "service" will be used interchangeably throughout this application.

The various components of the present invention are described in detail below.

Central Database

The central database 10 underlies all of the applications of the present invention. The central database 10 is a comprehensive and enriched database that includes information about all customers and products in the financial institution, including branch products, bank cards, travel and entertainment cards, student loans, investments, insurance and mortgage products. The central database 10 captures daily and monthly feeds from processing systems across the institution and builds a very large "data warehouse" to make it easy to access this information. The central database 10 receives information from a plurality of internal files of the financial institution, as well as external demographic and other publicly available information used to enhance the database.

The central database 10 is designed to insure the accuracy of the information and to make the information easier to use by non-technical staff. Thus, the system includes means for scrubbing and standardizing incoming information, householding, building history, calculating status codes, maintaining tables and calculating strategic flags.

The purpose of the central database 10 is to store, in one location, information from various businesses and departments within the financial institution. In the case of a bank, for example, the fact that a particular customer owns a checking account, has a student loan and has been solicited by bank cards a couple of times or for various products can be stored in the central database 10.

The central database 10 may include information concerning existing customer financial information, information from outside sources and demographic information about existing and potential customers. In the preferred embodiment, the central database 10 is housed in a mainframe computer and includes a large repository of financial and demographic data. Information is fed into the database from a variety of source feeds 21–25, including business and credit card feeds 21 and 22 from within the financial institution for each product and service offered by the institution, customer demographic feeds 23, customer phone number feeds 24, and feeds 25 from a variety of other outside vendors.

The data from the various feeds 21–25 is stored in the central database 10 in a uniform format. For this purpose, a uniform storage or householding algorithm, a name and address standardization process, and a merge process is preferably used. In this way, the central database serves as a single central repository for storing all customer-related information available to the financial institution. The householding algorithm ties different accounts together into a single unit considered to be one household, based on information such as the same last name and same address, or same name or social security number on different accounts, and so forth that indicate the same person or persons living in the same household. The householding process provides a meaningful way of getting to the data on the central database 10 and extracting it logically.

Figure 3:
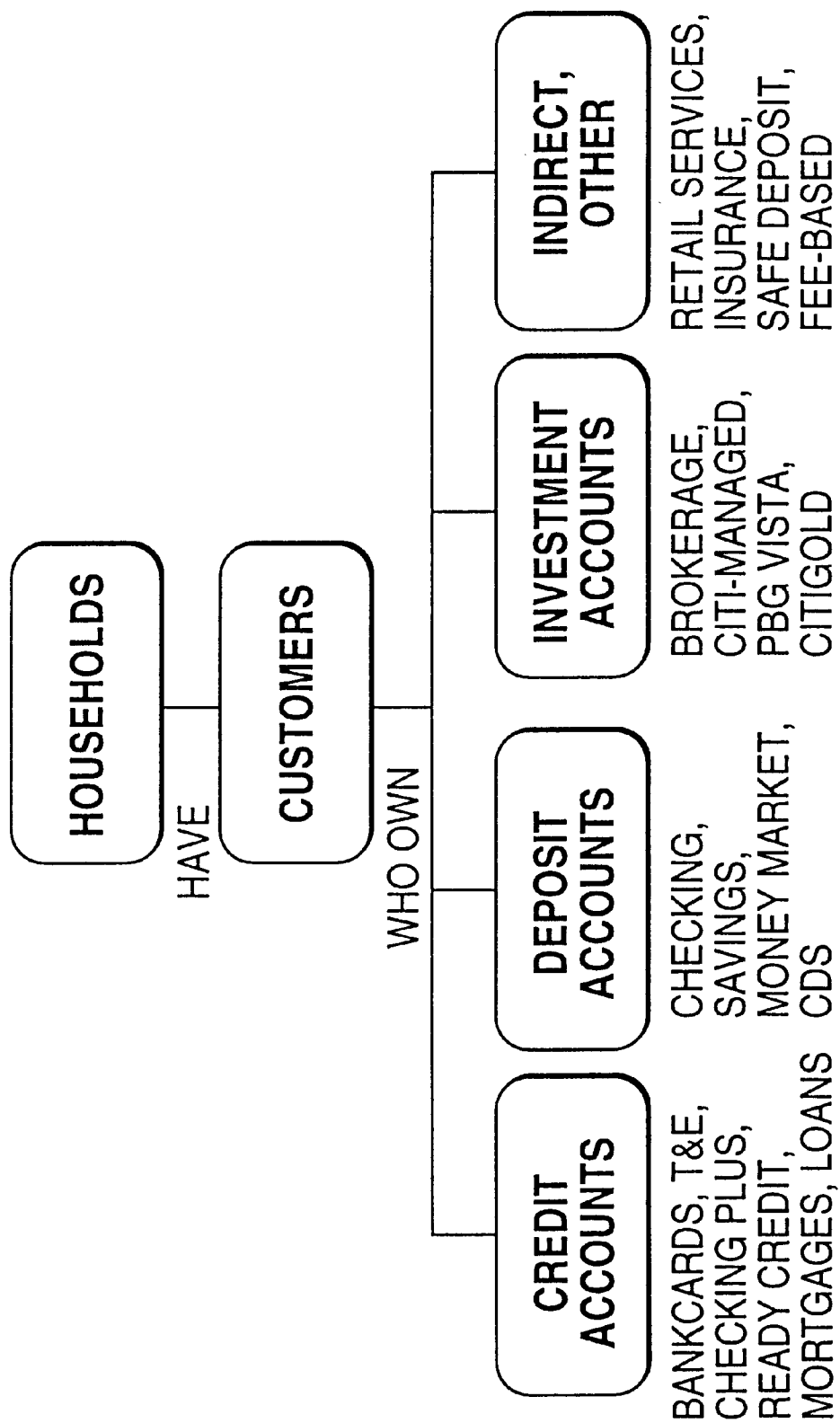
FIG. 3 is a block diagram illustrating the three basic levels that information is stored (householded) in the central database.

As indicated in FIG. 3, the information is preferably maintained in the central database in a three-tier hierarchy—households, customers, and accounts. A given household may have one or more customers, and each customer in a household may have a number of different accounts. As discussed in detail below in connection with the database engine, the three tier hierarchy provides "keys" at each of the household, customer, and account levels that satisfy user criteria for queries, views, and reports. The central database 10 can be used for a wide variety of customer service, financial analysis and marketing purposes.

The central database 10 includes several database components to support the operations of the present invention, including a security database 30, a domain database 31, a parameter database 32, a generation database 33, a query output database 34, a selected query universe 35, and a household-customer-account repository 36. These components of the central database 10 are interfaced with each other and with the outside communication feeds by a database engine 40.

The security database 30 stores a list of entitlements, as well as user IDs and passwords for each user of the system. Since financial institutions work with highly confidential and valuable information, it is necessary to restrict the access of each user to only those areas of the database necessary to perform his or her job. For example, when a user logs onto the system from one of the geographically remote workstations (as described below) the database will perform a security check to ensure that the user provides the proper user ID and password, and then restricts the user's access to the database according to the entitlements assigned to that user.

For each user's profile, the security database 30 maintains information about the user's workstation, such as the amount of RAM contained in the workstation and the size of the hard drive. The security database 30 also determines whether the user can access certain accounts, such as sold mortgage accounts and private bank accounts, and whether the user is given access to sensitive name and address information.

The domain database 31 stores the definitions and descriptions of all the data elements contained in the central database 10. In the preferred embodiment, as an initial step to searching the database 10 from the micromarketing center, the system of the present invention downloads the elements and data descriptions contained in the domain database 31 to the user's workstation 12. This information is preferably in the form of a data glossary or index for the central database 10. This data glossary or index includes a description of all elements contained in the central database 10, as well as all of the values for the elements. Thus, for example, if the user wants to look at account status, the workstation 12 of the present invention can access from the domain data base 31 the available values for the account status. In this example, the system of the present invention might show the user that a particular value is an indication of whether an account is "opened" or "closed."

The system of the present invention is dynamic enough so that, upon receiving a request from a user for a particular element, the system will check what descriptions exist for that element. If no descriptions exist, the user will have to data enter this element. The data glossary or index is preferably maintained locally on the user's workstation after the initial downloading from the domain database 31 to enhance system performance.

The Query output database 35 contains the actual results of the searches performed against the central database 10. Every report and key file created during a search goes to a DB2 output table in the output database 35. Once the report is in the DB2 output table in the output database 35, it can be dynamically formatted and accessed as desired.

Logical Database Engine Components

The database engine 40 has two logical components. The first one extracts the keys that satisfy the user criteria. These keys are preferably at the household, customer or account levels (HH_NO, HIH_NO+CS_CUST_NO, or HH_PO+ACCOUNT IDENTIFIER, respectively).

The second component (the data extractor component), picks up all the data items that the user wants. Both components can work together in a single job, or the user can save the keys for further processing at another time. Furthermore, certain types of queries need not extract keys at all, but can obtain the data directly without intermediate key extraction steps.

If the user requests and saves the keys, the user can then use the saved keys to pick up different set of fields (using the data extractor component of the database engine) at different times. Alternatively, the user can further reduce the set of keys (and save the new set, instead of, or in addition to the old set of keys) by applying additional criteria to the old set.

The two components are associated with two different parts of the query specification conversation: 1) in one the user specifies the criteria that identifies the universe sought; and 2) in the other the user specifies the attributes the user wants from the universe selected. Both parts can be performed in one sitting, or separately. When performing part 2 the user can refer to a key universe previously created. Alternatively, new key sets may be derived from previously created key sets by applying additional criteria.

The keys are saved using DB2 tables, with the user ID as AUTHID. This means that a key table can only be accessed by the user for which it was created. A job control/scheduler subsystem preferably keeps track of which set of keys belongs to which user/query/execution. The job control system will delete on a periodic basis saved keys that have not been used in a period of time and are not to be reused on a periodic basis (for example, for the purpose of producing periodic program tracking reports).

Even if the user does not want the keys saved, the database engine may temporarily save an intermediate set of keys (on the way to getting the final result) if doing so enhances performance. Some possible scenarios for this performance situation are described below.

The data extractor component of the database engine 40, which can execute alone or with the first key extract component, has the function of pulling the desired data from the database once the keys have been extracted. If it executes with the first component, the keys may not even have to be saved on a table but passed through host program variables from previous SQL statements.

Normally the user wants the full household (or customer) set of account relationships. Account data is stored separately in the central database in tables that will be referred to hereinafter as Asset/Liability (ALA) and Bankcard (BC) tables.

Normally users looking for relationship information would like to see accounts for the same household follow each other. In order to avoid having to sort to obtain the order desired (a UNION ALL will access the ALA table followed by the BC table) the program will open a cursor on each of the account tables and utilize merge logic to provide the output in household (key) order. This arrangement has the advantage that I/O on the ALA and BC tables is done in parallel, while the keys coming from the key table are only read once because they are kept in memory by DB2. Also, since data is read in clustering key order, dynamic sequential pre-fetch is likely to be turned on in all the tables. The result is much faster execution.

A typical SQL SELECT statement used by the present invention will look like:

SELECT output columns
FROM ALA table, KEYS table
WHERE
HH_NO in ALA=HH_NO in KEYS table
for the ALA set of accounts, and
SELECT output columns
FROM BC table, KEYS table
WHERE
HH_NO in BCO=HH_NO in KEYS table
for the bankcard set of accounts.

If a user wants data from a household and/or customer table, a join to these other tables will be done in each SELECT statement. These joins will be very fast because DB2 will be dynamically doing sequential prefetch on each table if the household keys are in household number order. Also, since both SELECTS are being executed in parallel, performance will benefit because DB2 will often find the household (and/or customer) row in memory. With these facilities, data access is remarkably fast with a very large DB2 database.

If the keys are not in a saved table, but are coming from another SELECT statement within the program, the above SELECT statements need only be modified by eliminating the key table join and substituting a key value stored in a host variable in the WHERE clause statement. DB2 will still do dynamic sequential prefetch on all tables to get the data.

The generated program will include simple merge logic to write the output in key sequence. To obtain the desired access path, an ORDER BY command may be needed in the SELECT statements, assuming the Key table is accessed first and a Nested Loop join method is used. Otherwise, the Key table is fetched separately and a host variable is used instead of the join condition.

The SELECT statement above assumes that a full relationship set of accounts for each household will be extracted each time. However, the user may request data from only one of the three tables, and/or add additional criteria limiting the output more. Applying the additional criteria can be thought of as a role of the other component of the database engine.

Extracting keys first may not be necessary in certain situations. For example, relationship queries having criteria solely at the household or customer level, possibly using pre-summarized columns, can be performed without first extracting keys. These queries, however, may require a post extract sort, since accounts for the same household are not together in the output (due to the use of UNION ALL). Nonrelationship queries, single table queries and regular joins, also do not require saving keys.

The word "path" is used to describe a particular set of criteria against a particular set of data. In the present invention, there is an account path, a household path, an enrollment path and, implicitly, a program tracking path and a special superhousehold path.

The advantages of the path concept are two: first it organizes query specification in a manner that is both intuitive and relationally consistent. In using an account path, for example, the user is specifying that households must (or must not) contain accounts that have certain characteristics. The second advantage is that the path specification has a fairly direct correspondence with SQL, making it easier to transform into SQL statements.

While the path concept is used to describe certain details about the database engine 40, the path concept need not be explicit in the user conversation. The workstations 12 of the micromarketing center 11 and the CCIS 13 prompt the user by asking the right questions to generate parameters that can then be used to analyze the query in terms of paths.

An account path allows the user to select households (or other keys) that fit a single account level criteria. That is, an account path provides all households that contain accounts of a given product where, optionally, the product possesses certain other attributes. The SELECT statement for an account path may look like:

SELECT DISTINCT HH_NO
FROM ALA
WHERE
(PRODUCT_CODE=?) AND (. . . other account specific conditions)

Product codes can be Ptype, Stype or Source Product Code. Specifying these values (the conversation) may be somewhat complex, since unique values or codes may depend on a composite of columns. If the user wants to specify the product code at the service type level, the query can be answered in one step by using the flags and summary variables at the household level.

However, even in this case the user may want to specify other characteristics that the product must have (open date, individual account balance, etc.) that are only available at the account level. This query will pick all households that have accounts with the appropriate product and related characteristics. The criteria within brackets applies to one product. The DISTINCT clause can be used in a query to eliminate duplicate households that will occur if a household has more than one account of the requested type.

The user may want households that have EITHER one product with certain characteristics OR another product with certain other characteristics. Or the user may want households that at the same time (AND) contain another type of product, or do not (NOT) contain accounts of another type.

In general, this is a problem in set theory. It can be thought of as each individual account path resulting in a SELECT statement that gets executed and obtains a set of keys at the household level (set HH1, set HH2 . . . set HHn) or customer level. Then the final desired set of households is the result of the following logical statement:

HH1 AND HH2 OR HH3 NOT HH4 . . .

where parenthesis may be used to clarify the order of the operations. All of the above have equivalent in SQL. For example, the following SQL statement:

SELECT DISTINCT HH_NO
FROM ALA
WHERE
(PRODUCT_CODE=?) AND
(. . . other account specific conditions
joined by and/or)
AND HH_NO IN
(SELECT HH_NO
FROM HH2_TABLE)

is similar to ANDing the first two sets, where the first SELECT statement represents the HH1 set, and the inner subselect uses the second set of keys (HH2) that was previously selected and saved. If both sets HH1 and HH2 are represented by keys stored in tables, then the AND is obtained by a simple join between the two.

The above solution to the problem may not be optimal because it usually requires multiple passes to the database. In many cases only one pass is required.

Different cases are discussed below.

If the user wants households that have one type of account or another, the above approach will require two separate account path specifications (conversations), producing two SELECT statements. Each select statement would be executed and two sets of households obtained. Then these two sets will be ORed.

However, the same purpose can easily be accomplished in one SELECT statement by adding another bracket within the parenthesis:

SELECT DISTINCT HH_NO
FROM ALA
WHERE
(PRODUCT_CODE=? (first product code)
AND (. . . other account specific conditions
joined by and/or)
OR
PRODUCT_CODE=? (second product code)
AND (. . . other account specific conditions
joined by and/or))

The statement inside the brackets specifies all the characteristics for a particular account that the household must have. The OR operator allows the user to specify all the characteristics of another type of account that the household may have. For example, this second type of account may have a different balance, etc. The household will be selected by the query if it has at least one account with either set of characteristics. OR logic can be implemented in one pass of the data, because the logic can be applied one row at a time.

Another way to specify OR logic is to use the IN predicate, as in the following example:

PRODUCT_CODE IN (list of products)

However, by using this statement, any other conditions specified in the WHERE clause will be applicable to each of the PRODUCT_CODES selected (for example, AND BALANCE>4000 will apply to each of the products individually). The workstation software ensures that the conversation will differentiate between the two OR logic cases to avoid mistakes.

If a user is looking for households that have two (or more) types of accounts simultaneously, then the query has two (or more) Account paths but the resulting select statement is more complex. There are alternative ways to construct the select statement for two or more Account paths. First is a correlated subquery as follows:

SELECT DISTINCT HH_NO
FROM ALA A
WHERE ({A.PRODUCT-CD =? AND (A. . . .})
AND HH_NO IN
(SELECT HH_NO
FROM ALA B
WHERE
A.HH_NO=B.HH_NO
AND
({B.PRODUCT-CD=? AND (B. . .)})

The list of households in the subselect can be saved and brought back as a key table. This key table can be joined to the higher level select (meaning the household must satisfy both criteria) or may be related to the outer SELECT in the same way (AND HH_NO IN . . .).

An alternative and more efficient way of doing the same is to do a join between the two original tables as follows:

SELECT DISTINCT HH_NO
FROM ALA A, ALA B
WHERE
A.HH_NO=B.HH_NO
AND
({A.PRODUCT_CD=? AND (A . . .)}
AND
{B.PRODUCT_CD=? AND (B. . . .)})

The use of a correlated subquery avoids two passes to the data. However, the same is true of the join approach, since the data for other rows within the same household will likely be in memory. In either case, benchmarks with the database manager should be included to validate performance. Alternatively, a query can be broken down, and intermediate results of household numbers stored. Indexes for product codes are preferably used to increase the speed of searches. The extracted distinct HH_NO can be saved and reused later, or passed directly to the second data extractor component.

The NOT path always requires two passes to the data. If the user wants households that do not have a certain type of account, the database engine 40 first looks for the households that have that type. Then the system finds the complement of these households. The following select statement provides an example of a NOT path:

SELECT DISTINCT HH_NO
FROM ALA A
WHERE
HH_NO NOT IN
(SELECT HH-NO
FROM ALA B
WHERE
({B.PRODUCT_CD=? AND (B. . .)})

The use of the NOT path is not as simple as it seems for two reasons. First, the unconstrained complement may not be what the user is looking for. Second, if submitted this way the query may perform very badly.

In general, when on an account path the user will specify not only product related conditions using variables that are totally dependent on the account/product, such as financial (account balance, amount of transfers, etc.) and descriptive (open date, marketing status) variables, but also other conditions using variables that are indirectly related to the account, such as organization level, geographic location, and so forth. Relationally, these other variables are part of foreign keys, and their presence in the account row establishes the relationship between the Account entity and the ORG or Geographic entities.

Most probably the logical intention of the user will be that the search of the households be limited to this organization level, geographic location, etc. In that case, the above SELECT statement will not accomplish the user's intent. The following expanded SELECT statement will make this point clear:

SELECT DISTINCT HH_NO
FROM ALA A
WHERE
HH_NO NOT IN
(SELECT HH_NO FROM ALA B
WHERE
((B.ORG AND B.GEOGRAPHIC, etc. conditions)
AND
({B.PRODUCT_CD=? AND (B.other_product_ conditions . . .)})

In this formulation, the subselect has the ORG/ GEOGRAPHIC conditions, so the product condition searches within this subset of accounts (households). However, when the complement is executed, there is no such limitation and the database will search among all the households including ones that do not belong to the organization and geography. The resulting set of households will in general be much larger and not be what the user expects.

To correct this problem, the ORG and GEOGRAPHIC conditions must be repeated in the outer select. A more proper formulation of the SELECT statement for the NOT path is presented below:

SELECT DISTINCT HH_NO
FROM ALA A
WHERE
(A.ORG AND A.GEOGRAPHIC, etc. conditions)
AND
HH_NO NOT IN
(SELECT HH_NO
FROM ALA B
WHERE
((B.ORG AND B.GEOGRAPHIC, etc. conditions)
AND
({B.PRODUCT_CD=? AND (B.other_product_ conditions . . .)})

However, since many households will have accounts with different ORG and GEOGRAPHIC values, a question arises as to whether the system should allow a household to be chosen that has a minor account that fits the ORG/ GEOGRAPHIC conditions and at the same time has no account of the type NOT desired. This is referred to as the Prime vs. Actual problem; should the system use the ORG/ GEOGRAPHIC of the primary account (stored at the household and customer tables), or of any account. If the answer is the primary, then the outer Select looks at the household table.

This query must be benchmarked in the database manager. To reduce the time for the query when the households in the NOT IN list are too many, there are two options. First, the IN list can be stored and re-read in order, by a process that then not-matches them with the rest of the HH_NO in the database using an index. Second, the household keys can be stored in a table with a household index. With either of these options, the database will perform the NOT IN logic very efficiently.

The NOT ACCOUNT PATH can easily be added to the previous ACCOUNT PATH using the following SELECT statement:

```
SELECT DISTINCT HH_NO
FROM ALA A
WHERE
(A. ORG AND A.GEOGRAPHIC, etc. conditions)
AND
({A.PRODUCT_CD=? AND (A.other_product_conditions . . .)}
AND
HH_NO NOT IN
(SELECT HH_NO
FROM ALA B
WHERE
(B.ORG AND B.GEOGRAPHIC, etc. conditions)
AND
({B.PRODUCT_CD=? AND (B.other_product-conditions . . .)})
```

The household path, the enrollment path, and the program tracking and superhousehold paths and their combination with the account path will now be discussed.

The household path is used to specify conditions that apply to the full household. These conditions can be specified directly or indirectly. Direct specification is done by using columns of the household table, like in the following Select example:

```
SELECT HH_NO
FROM HHD A
WHERE
(A.ORG AND A.GEOGRAPHIC conditions)
AND
A.HH_CHK_TOT_BAL>10000
```

The last condition is an example of the use of a pre-summarized variable.

Whenever the household path consists of conditions using existing household variables, the household path conditions can be combined with any account path conditions by means of a join, and executed in one pass of the data. The following SELECT statement provides an example of this:

```
SELECT HH_NO
FROM HHD A, ALA B
WHERE
A.HH_NO=B.HH_NO
AND
(A.ORG AND A.GEOGRAPHIC conditions)
AND
A.HH_CHK_TOT_BAL>10000
AND
({B.PRODUCT_CD=? AND (B.other-product-conditions . . .})
```

However, sometimes household level conditions can not be specified using a stored household variable. This is true of summary variables (totals, averages, etc.) requested at a lower level of product detail than the Service Type level that is summarized in the household table. This type of household path must be executed in a separate SELECT statement using GROUP BY and HAVING clauses. A typical example is:

```
SELECT HH_NO
FROM ALA A
WHERE
(A.ORG AND A.GEOGRAPHIC conditions)
AND ({A.PRODUCT_CD=? AND (A.other_product_conditions. . .})
GROUP BY HH_NO
HAVING
(SUM(ACCT_BALANCE)>5000
AND
(SUM(ACCT_CR_LIM)>10000
AND
COUNT(*)>3)
```

The resulting set of households can then be saved (permanently or temporarily) and then combined (AND/OR/NOT IN) with other sets of households in the same or other queries.

Performance of these queries will be particularly fast if indexes are used for balance, credit limit, ORG, Geographic variables, etc., and include the household number in them. Since the summaries are built out of account data, the conversation may combine the specification of this request, with the specification of account path. The database engine can be selectively set so that the ORG and Geographic variables refer to actual and/or prime.

The customer path is very similar to the household path. The main difference lies in that with this path the combination of household and customer values is saved as a key.

Definition Tables

Figure 4A:
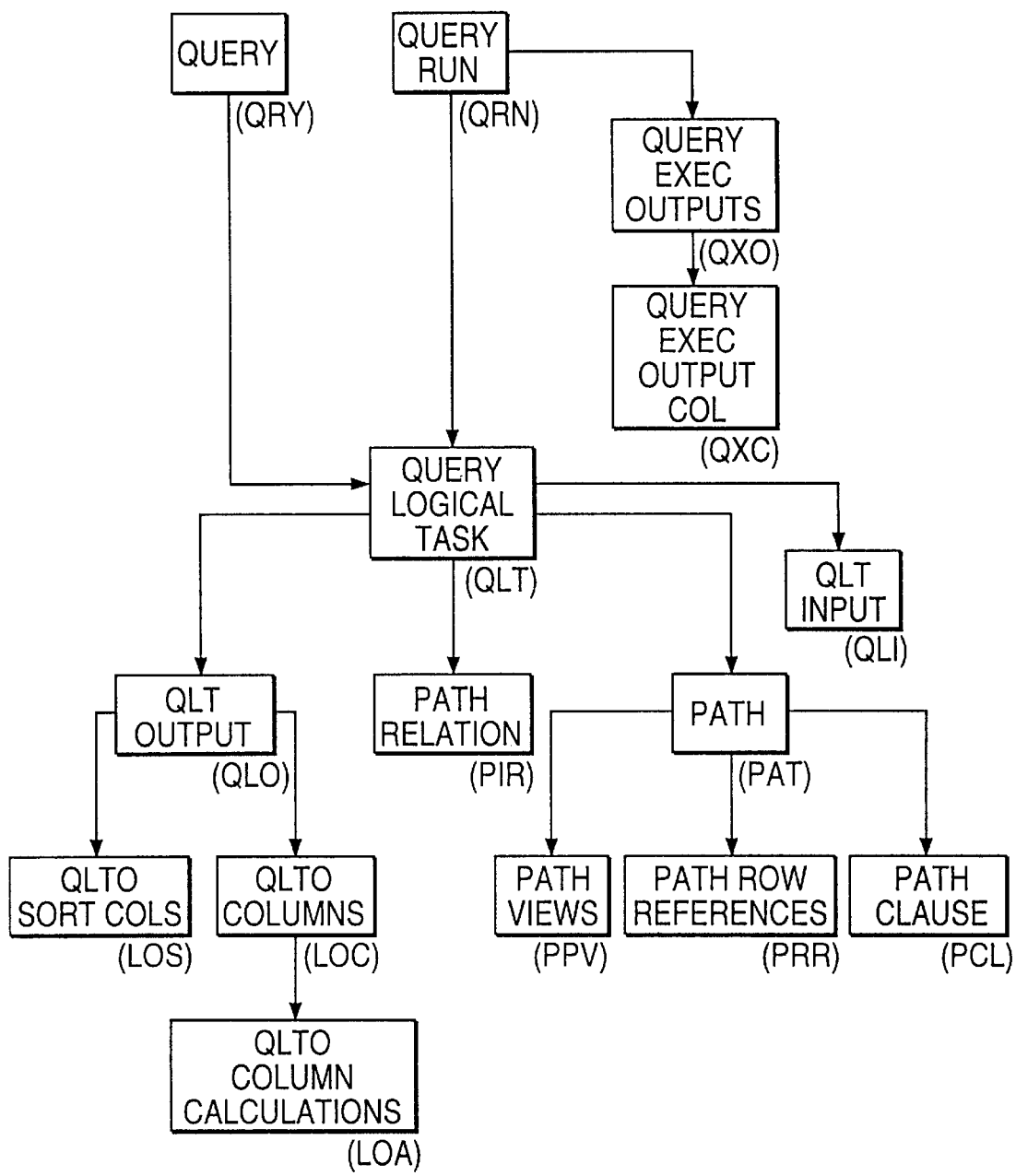
FIGS. 4A–4D are block diagrams illustrating the various tables that make up the database engine for accessing the central database.
Figure 4B:
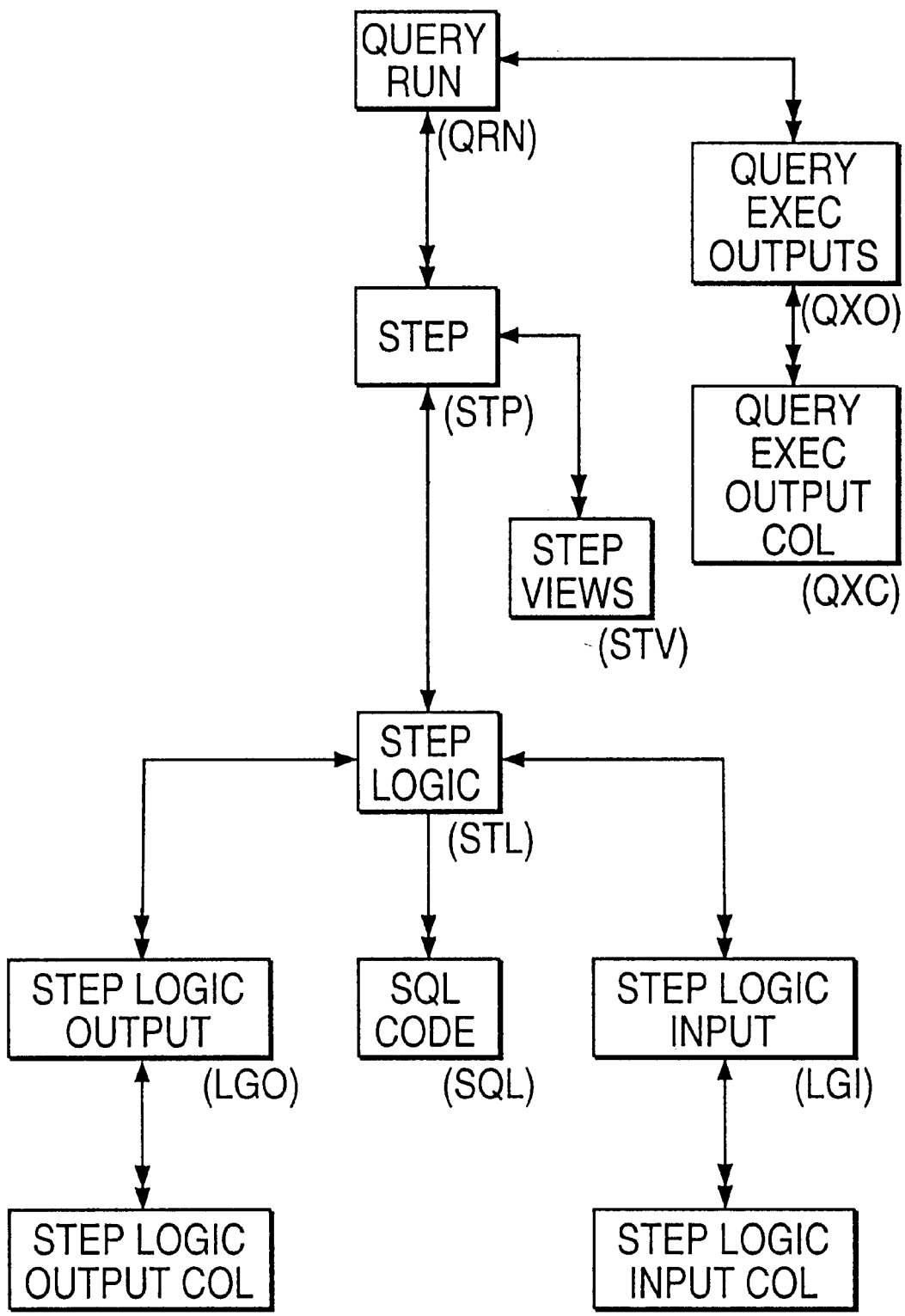
Figure 4C:
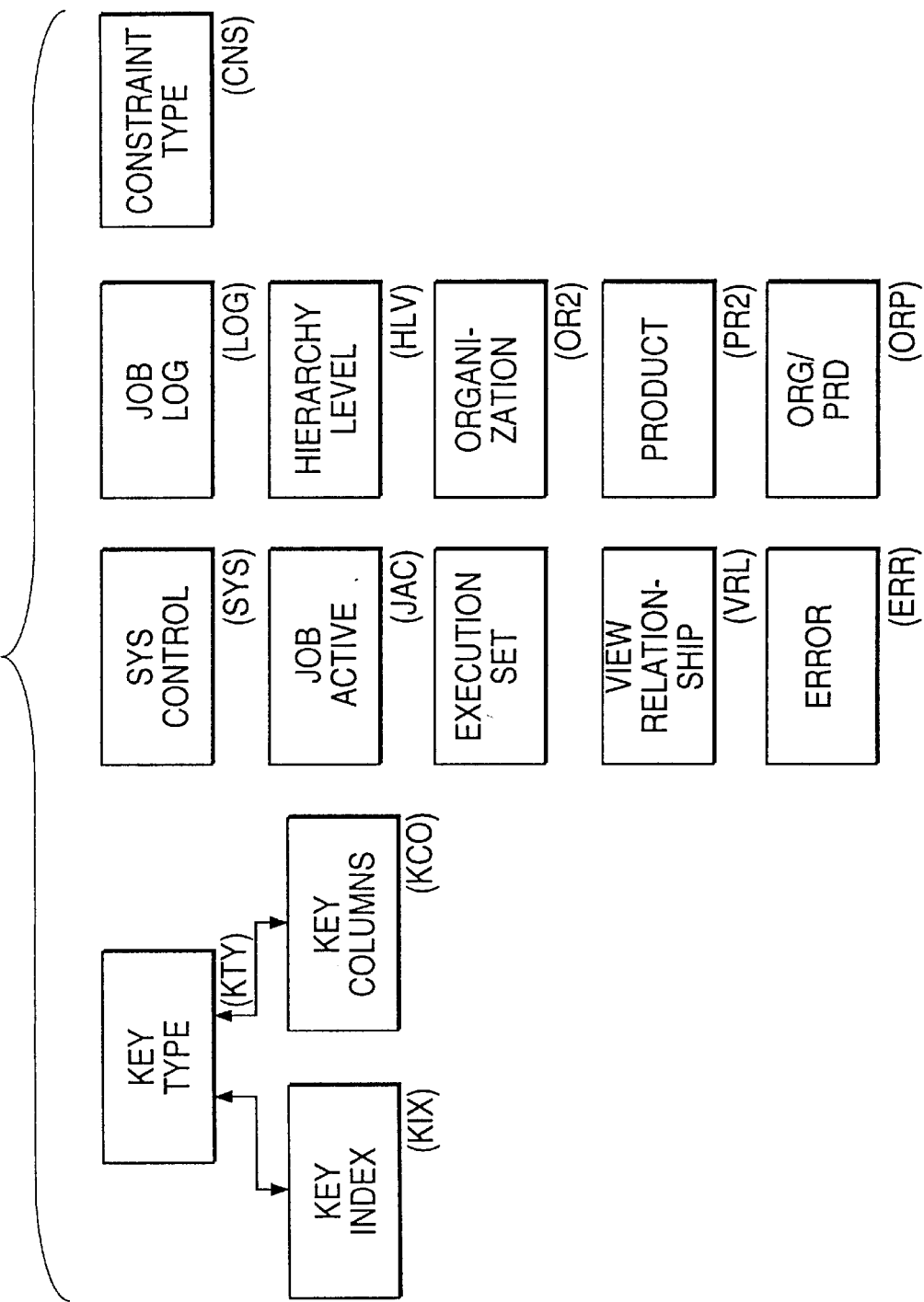
Figure 4D:
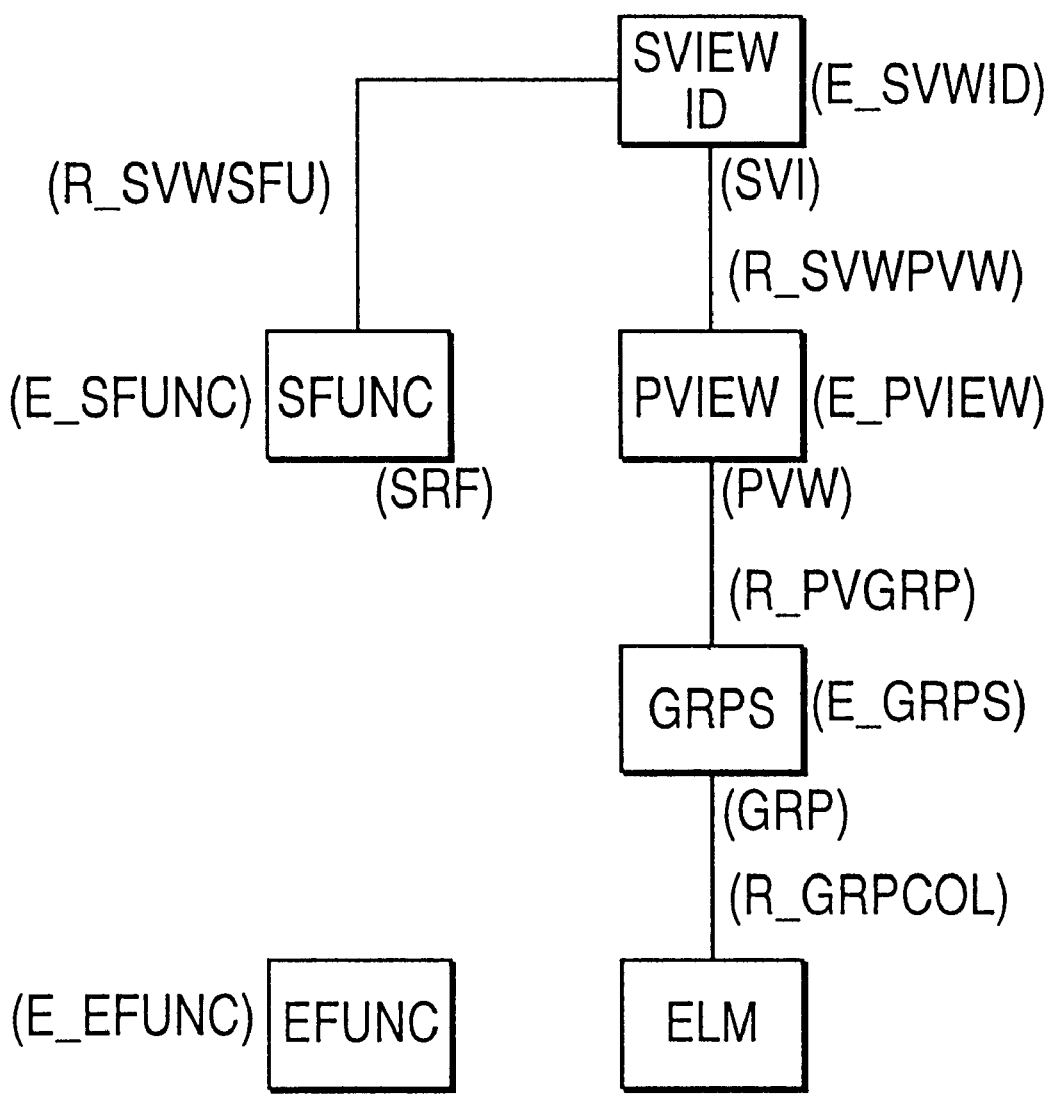

The block diagrams shown in FIGS. 4A–4D illustrate the various tables that hold the definitions for the database engine 40 for accessing the central database 10. FIG. 4A shows the definition tables for the parameter database 32; FIG. 4B shows the definition tables for the generation database 33; FIG. 4C shows the reference tables for the database engine 40; and FIG. 4D shows the definition tables for the domain database 31.

Referring to FIG. 4A, the definition tables for the parameter database include, for example, a "Query Run" table that has the abbreviation "QRN" as an acronym for the table. The Query Run table is populated with information from the initial query entered into the workstation 12. The database engine 40 continually reads the Query Run table to see if any new queries have been requested.

The Query Run table tells the system whether or not a new query is to be processed. If a new query is to be processed, the Query Run table reads the other parameter tables and extracts all the information provided by the workstation 12. The Query Run table then generates the SQL and the Cobal program for the query. The database engine 40 then accesses and extracts data from the central database 10 by generating a query that will run against the household, customer, or account tables.

Another table shown in FIG. 4A is the Query Logical Task table. This table contains information relating to how many tasks have to be performed logically to generate a particular query.

Shown below the Query Logical Task table in FIG. 4A is a Path Relation table. This table is used to target a universe for a particular query. That is, the Path Relation table determines whether the database engine 40 generates household level keys, customer level keys, or account level keys for each query, or whether it generates an output specification for extracting the actual data. The Path table is related to the Path Relation table and informs the database engine whether to use a household or an account path.

The QLT Input table tells the database engine 40 whether the query is an output specification or whether it is extracting a report or a key. This table also provides information as to what type of program is being used to extract a report.

A Path View table is used to explain to the database engine 40 what central database table the user needs to access. A Path Row References table contains information that tells the system the type of path (path id) to be used. For example, the Path Row References table is used to tell the system whether or not to generate a "contain." A contain is a command used to extract all households, customers, or accounts that have (or offer) certain financial products (e.g., checking, saving, CDs. etc.). A contain can also be used to retrieve households only in a particular bank or branch.

The Path Clause table provides additional constraint information that the user can type in. For example, in addition to a person having a checking and a saving, a query can be limited to such persons that also have a saving balance greater than $10,000. That information would be stored in the Path Clause table.

The generation database tables shown in FIG. 4B contain some of the same tables as the parameter database of FIG. 4A. The area of the query run is read again by the database engine 40. The generation database contains all the information that is generated based on the information in the parameter database. That information is read and logically manipulated to build SQL that will then be embedded into a Cobal program to extract the data. The SQL Code table contains the actual SQL code generated by the database. After the SQL code information is stored on the SQL table, the other parts of the database engine 40 read the information from this table.

Another part of the database engine 40 extracts the SQL code from the generation database and embeds the SQL into a Cobal program. The system then uses that Cobal program to build the JCL. The system generates all the JCL it needs using standard JCLs and then submits this job to an internal reader where the job gets compiled. This job in turn generates another job that submits the actual execution job. The execution job then extracts the requested data from the central database 10.

The reference tables shown in FIG. 4C include a variety of tables used to provide reference information for formulating a query. A Key Type table contains the types of keys to be extracted and information about the columns for each of the keys. A System Control table is a parameter table that gives a feed for dynamically changing the parameters that the system uses. A Job Log table keeps a log of any errors that occur. A Constraint Type table contains information about the organization to be accessed (e.g., the number of accounts in a particular bank or branch). This information is used for statistical purposes to determine the optimal way of generating the SQL. As described above, there are certain ways to construct SQL statements that make the SQL more efficient for retrieving large numbers of accounts or other information.

For example, when a query is entered the system will determine how many accounts are contained in each of the different types of accounts to be searched (e.g., checking, savings, CDs). The account type that has the least number of accounts (fewest number of rows in the account table) will be put in the SQL first to maximize the speed and efficiency of the search. The same process is used for organizations.

That is, if more than one organization (bank, branch, etc.) is to be searched, the system will search the organization with the least number of accounts first.

A Job Active table contains the status of the job as it is being executed. An Organization table contains a description of each bank and branch. A Product table contains a description of each of the products. A View Relationship table contains information about what views are related to what other views and what tables are related to what other tables. An Error table logs all errors that occur during operation of the system.

Referring to FIG. 4D, the Domain Database tables include SView, PView, Groups, Elements, SFunc, and EFunc tables. These tables are maintained in the Brownstone Data Dictionary and are maintained by the database engine 40. The information from these tables is extracted out and placed into another set of DB2 tables containing a super view id. The super view is used to define the logical path for a query and to join certain related tables together.

The database engine 40 allows a user to click and point to information on a user friendly graphic interface at the workstations 12 so that users can easily and quickly access the large and comprehensive central database 10. The workstations 12 pass acronyms and pseudo-code to the database engine 40, which then converts the code into a logical access path to retrieve data from the central database 10. The user has no need to know how to write a program or a line of code for accessing the central database 10 because the database engine 40 generates appropriate SQL for each query. The logical access path generated by the database engine 40 greatly increases the performance of the system thereby making searching a very large database practical.

Micromarketing Center

The present invention includes one or more micromarketing centers 11 each including workstations 12 that are preferably used by bank branches to identify lists of customers based on demographics, account balances, products, ownership, and so forth, for marketing new financial products and services. Preferably a plurality of geographically dispersed regional micromarketing centers are provided. The micromarketing center 11 generates files containing sales leads that can be downloaded directly into the CCIS 13. The downloaded leads are then transmitted through the CCIS 13 to branch managers who coordinate efforts to work the leads using the CCIS 13 to market the new products or services being offered.

While the single central repository for storing all customer related information throughout the financial institution offers significant potential, the database is necessarily so large that it cannot practically be directly searched. Thus, the present invention includes means for allowing users to dynamically build programs for searching the central database 10.

The system of the present invention includes at least one, and preferably many, workstations 12 in the micromarketing center 11 that allow users to search the information contained on the central database 10 and generate lists of sales leads (i.e., sales targets) for marketing campaigns. The preferred embodiment includes two different versions of workstations—analytic workstations and micromarketing workstations. The analytic workstations allow the user to build a query, define or design a report, and then run the process; i.e., run the query, then run the results of the query into a report. The report can then be downloaded or exported. The micromarketing workstations allow the user to perform the same functions as the analytic workstations, and also to generate marketing information or sales leads and feed the leads directly into the CCIS 13.

The workstations 12 within the micromarketing center 11 include means, preferably in the form of software designed to run on a general purpose computer, for generating a graphic user interface ("GUI") to dynamically build programs for searching the central database 10. The workstation 12 downloads a local copy of all the tables and structures from the central database 10 that can be searched using the workstation 12. This insures that all users of the system are provided with the latest definitions and fields each time they access the system.

In addition, the system includes means for walking users through each step of building a search request, including using pull-down windows, icons, drag-and-drop, and other features that are familiar to modern computer users. Moreover, the system includes means for building "proper" SQL queries for each request, and hiding the special codes and syntax required to insure that these queries will run. The system also includes means for downloading reports and files to the local workstations 12.

The micromarketing centers have the ability to generate lists identifying various types of mailing address' and linking on-line CCIS branch systems. In this way, the file itself can be loaded to the on-line branch system. Preferably, the micromarketing centers have the ability to supress various types of address' for business or legal reasons.

A plurality of micromarketing workstations 12 preferably make up the micromarketing center 11 for responding to requests from branch managers for lists of leads for selected sales programs. The sales programs typically involve a marketing campaign for new or existing products or services offered by the financial institution. The micromarketing center 11 works with the branch managers to determine the profile of households, customers, and/or accounts most likely to purchase the products or services of the sales campaign. The micromarketing center then constructs a specific query, runs the query against the central database, and generates a report containing an optimum list of leads for each marketing campaign.

The workstation at the micromarketing center provides means for searching the central database 10 and extracting a list of all households, customers, or accounts that meet a specific selection criteria. The list of leads are then used to target a direct mailing to the customers or households that meet the specific selection criteria for the sales campaign, or the list of leads is sent directly to the CCIS 13.

Figure 5:
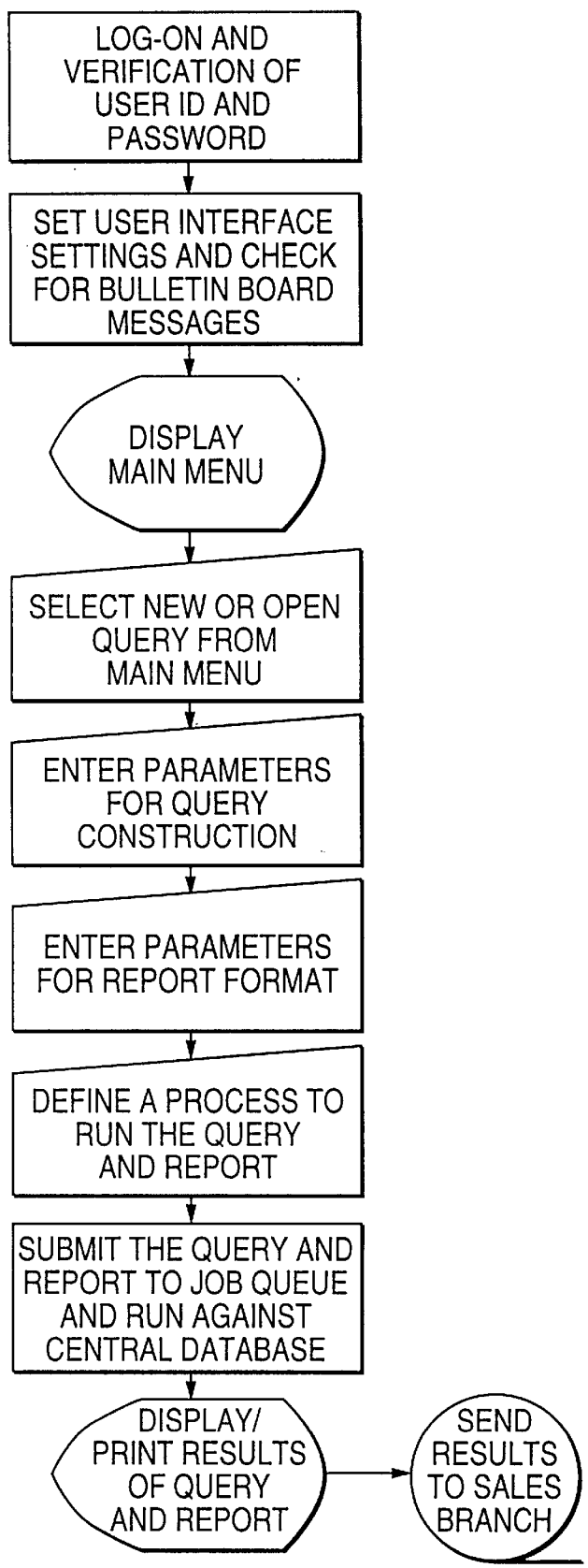
FIG. 5 is a flow chart showing the process steps for generating a list of leads from the central database based on selection criteria entered into a workstation at the micromarketing center.

Referring to FIG. 5, the micromarketing workstations 12 first display a logon screen after power on. The logon screen provides security control of access to the functions of the workstation 12 and the central database 10. After entry of a user ID and password, the workstation 12 activates remote procedure calls to verify the user ID and password against the central database 10. If the user ID and password are valid, the logon window disappears and access to the rest of the system, including further menus on the micromarketing workstation, is provided. If the user is granted access, the user profile, preferences and appropriate remote procedure calls will be read in for initializing and customizing the operating interface.

Figure 5A:
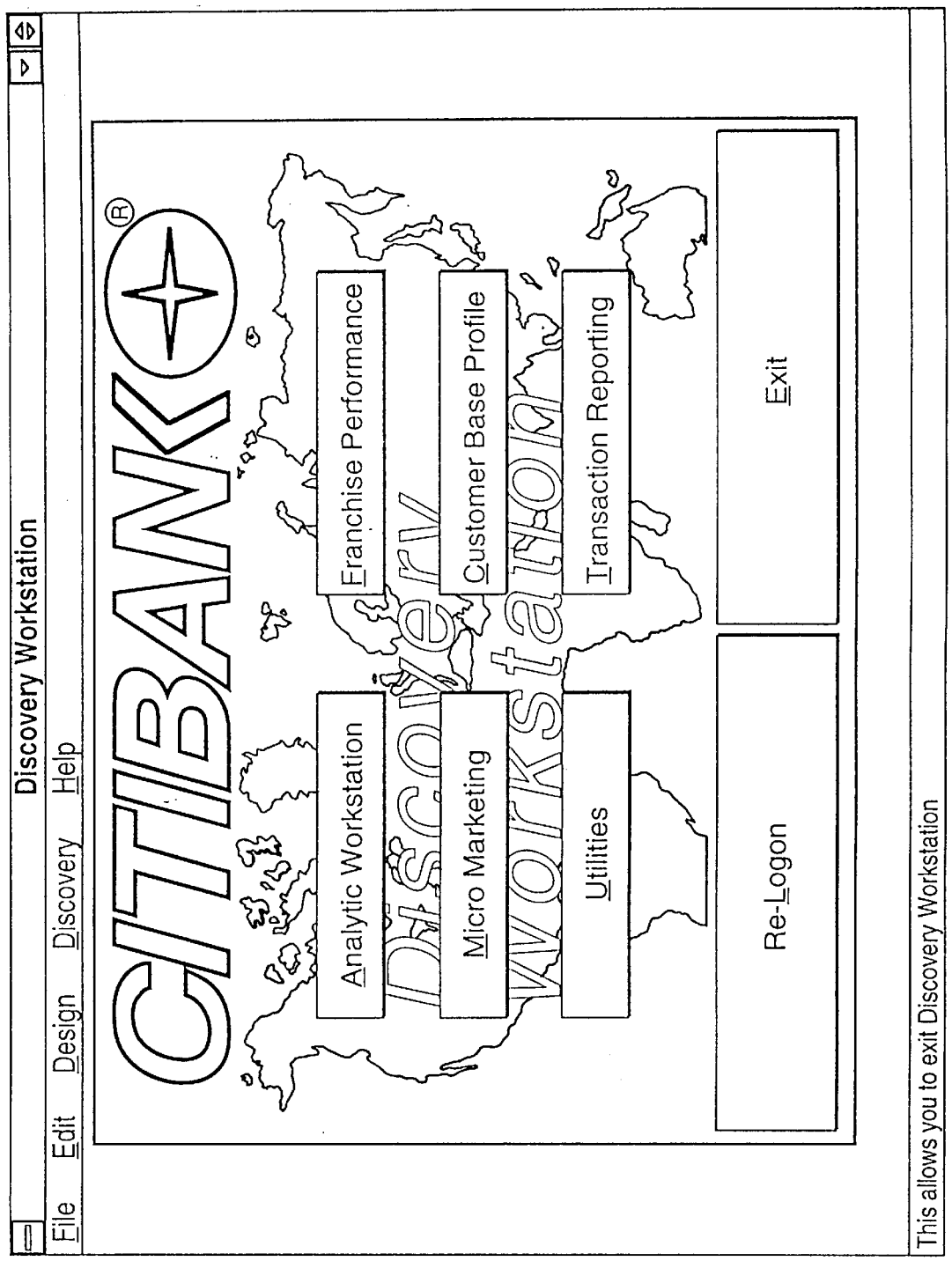

Following a valid logon, a check will be made for bulletin board messages for the current user ID. If unread messages are found, the user will be prompted to view the list of unread messages, but the user may ignore the prompt and read the messages at a later time. Immediately after log-on, a menu is displayed, as shown in FIG. 5A, to allow the user to select between Analytic Workstation and Micromarketing functions. The menu also provides user access to other functions, including Utilities, Franchise Performance, Customer Base Profile, and Transaction Reporting.

Figure 5B:
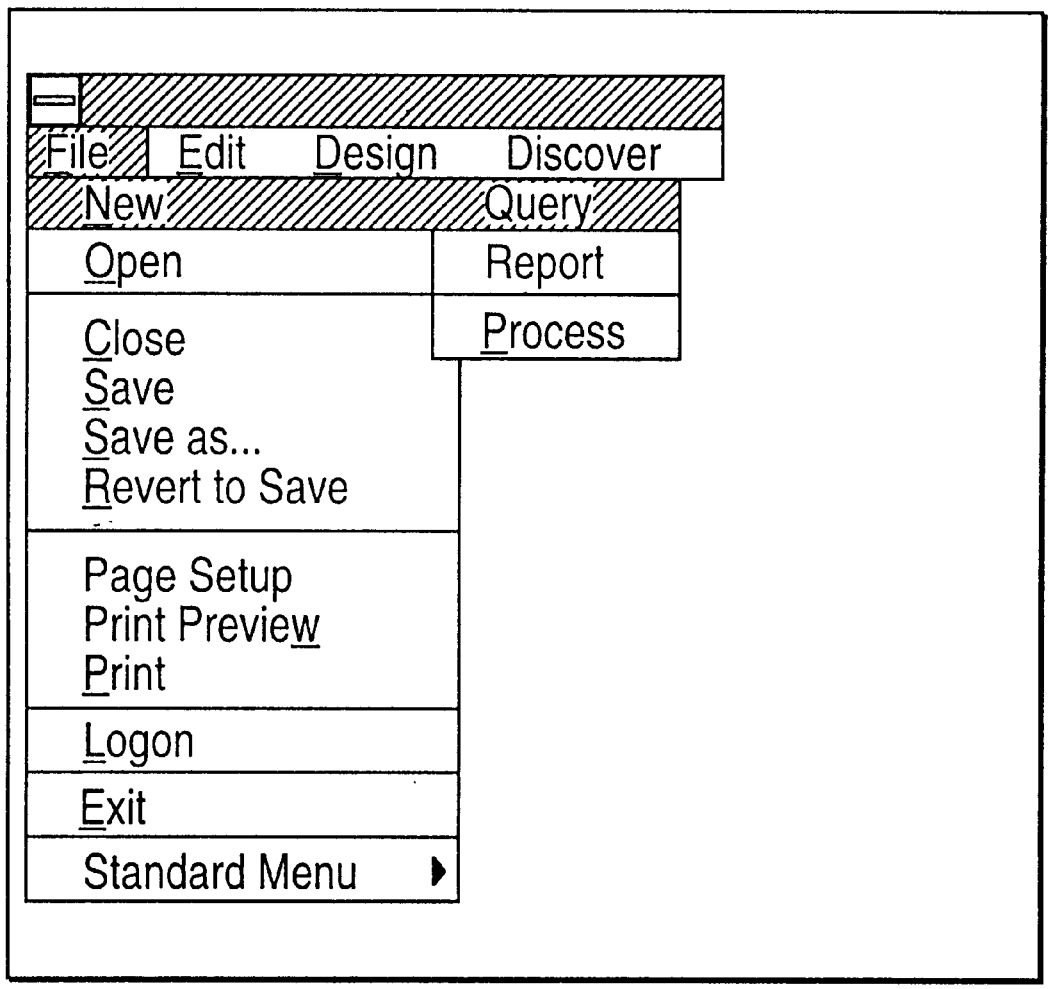

Upon selecting Analytic Workstation or Micromarketing from the menu of FIG. 5A, the workstation will next display a main menu, as shown in FIG. 5B, to provide high-level access to functions required for creating and opening the query, report, and process objects used by the workstation 12. From the main menu, the user is given the option to create a new query, report, or process, or to open an existing one. If the user chooses to create a new query, for example, to fulfill the request of a branch manager, the user next enters the various parameters for the query construction.

After the query is constructed, the user next enters the various parameters for the report format. Finally, the user defines a process to run the query and report, submits the query and report to the job queue, and runs the query and report against the central database 10. When the query and report are complete, the workstation 12 will display or print the results of the search, and will download the results to an output file or directly to the CCIS 13 for delivery to the bank branch that requested the report.

To assure that queries are constructed logically, the conversation should follow a combination of logical steps followed and/or combined with almost free-hand user interaction. The preferred conversation is the speed-select type of conversation. The speed select conversation starts by asking the user what type of query he/she wants to perform. There are two main types: Relationship and non-Relationship. The conversation for the non-Relationship option can be thought of as a subset of the Relationship conversation.

A program tracking file interfaces with speed select by creating a relationship key table using an account file previously registered into the system. Driver files use a similar procedure. After the driver or program tracking file is entered into the system and processed so that a key table is created and saved, the user may continue by selecting either of the above options and proceeding as described below.

The user is asked if she wants to do analysis at the household or customer levels. The answer determines whether keys are saved at the household or customer levels. It also may determine certain join conditions, etc. that will be generated for the user under the covers. The user will proceed by assembling a query made up of criteria blocks that define the universe of households, customers, and/or accounts desired. After an appropriate query is assembled, the user will run the query by assembling a process made up of process step blocks, such as query and report.

Figure 5C:
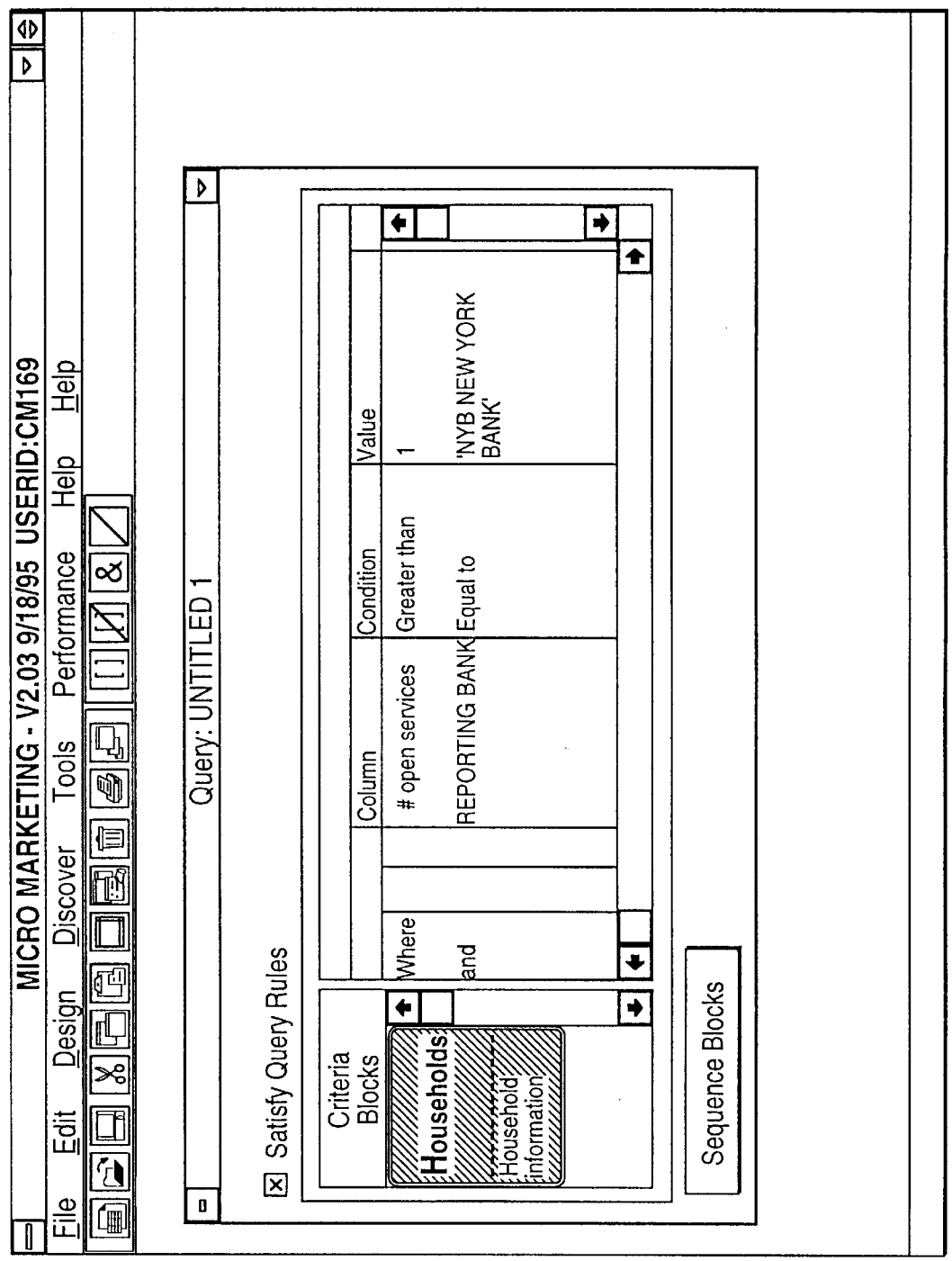
Figure 5D:
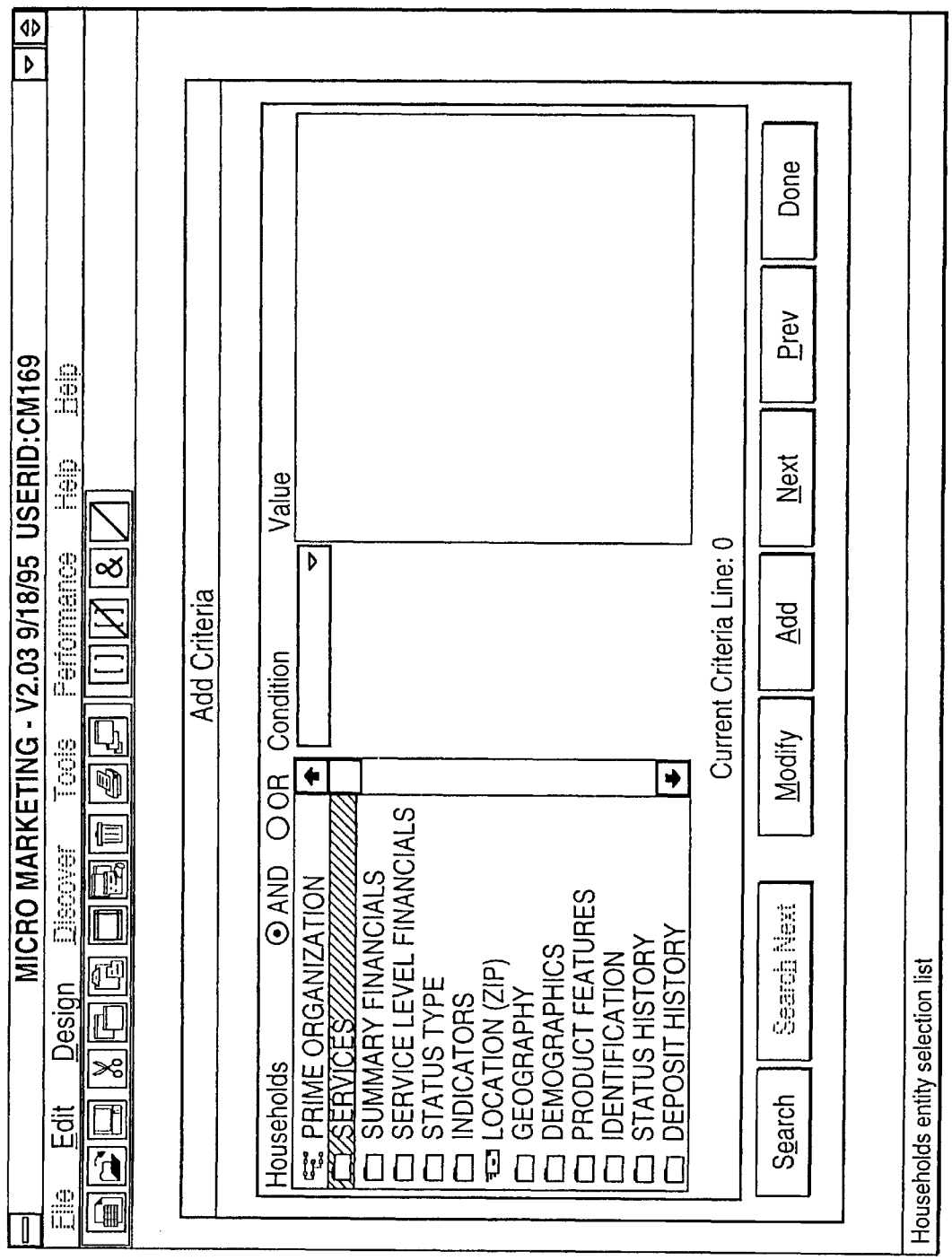

For example, as shown in FIG. 5C, a criteria block defining a universe of households is constructed that limits the universe to households having more than one open services and NYB NEW YORK BANK as the reporting bank. In constructing the criteria block of FIG. 5C, the user is prompted to fill the criteria column by selecting "# open services" and "REPORTING BANK" from criteria lists downloaded from the central data base. In selecting "# open services," the user first selects the category "SERVICES" from an Add Criteria menu shown in FIG. 5D, and then selects "# open services" from the Add Criteria sub-menu shown in FIG. 5E.

Figure 5E:
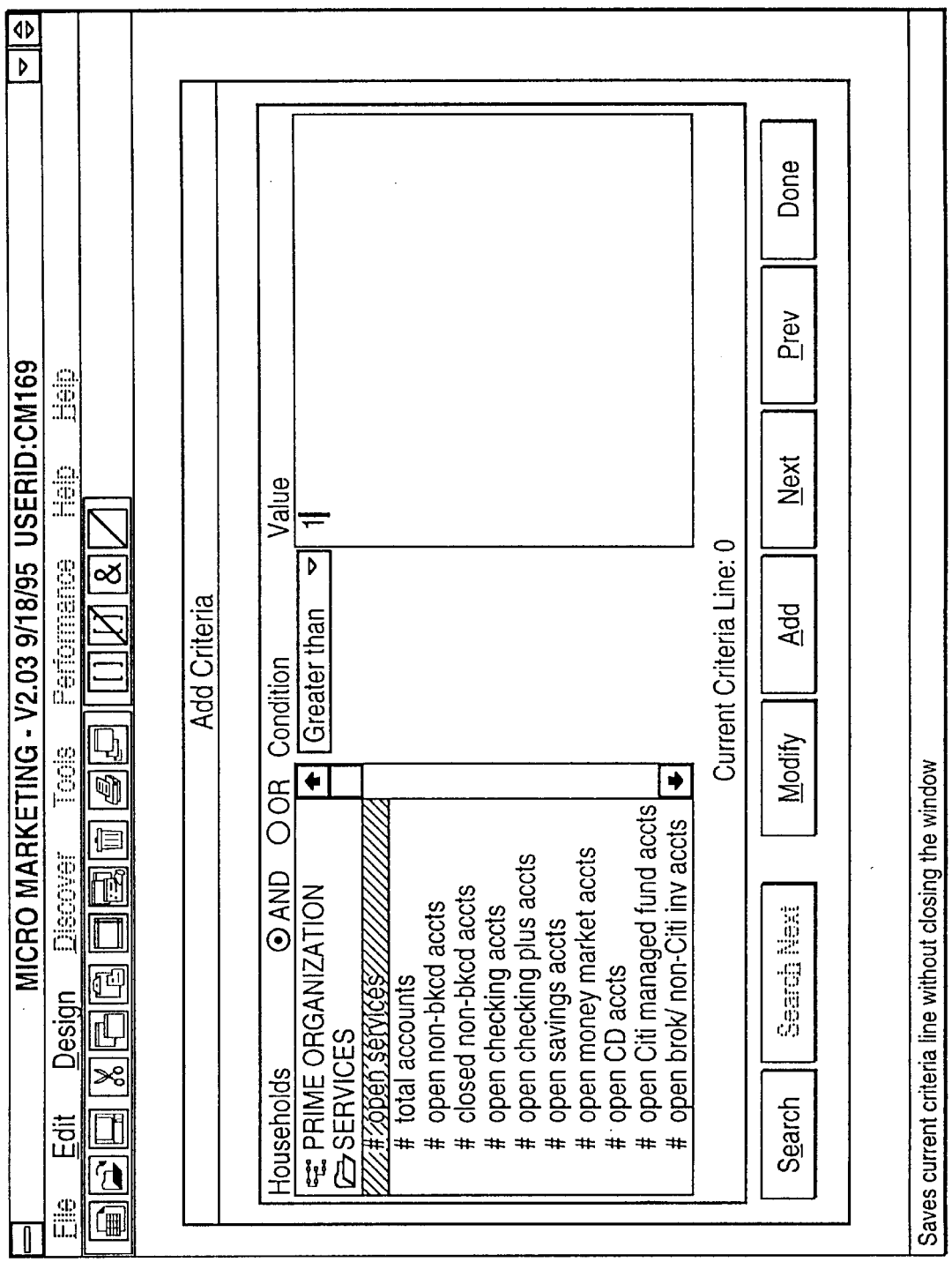

The condition "Greater than" and the value "1" are also entered or selected from the menu display shown in FIG. 5E. Criteria blocks can also be constructed to define a selected universe of customers and accounts.

Figure 5F:
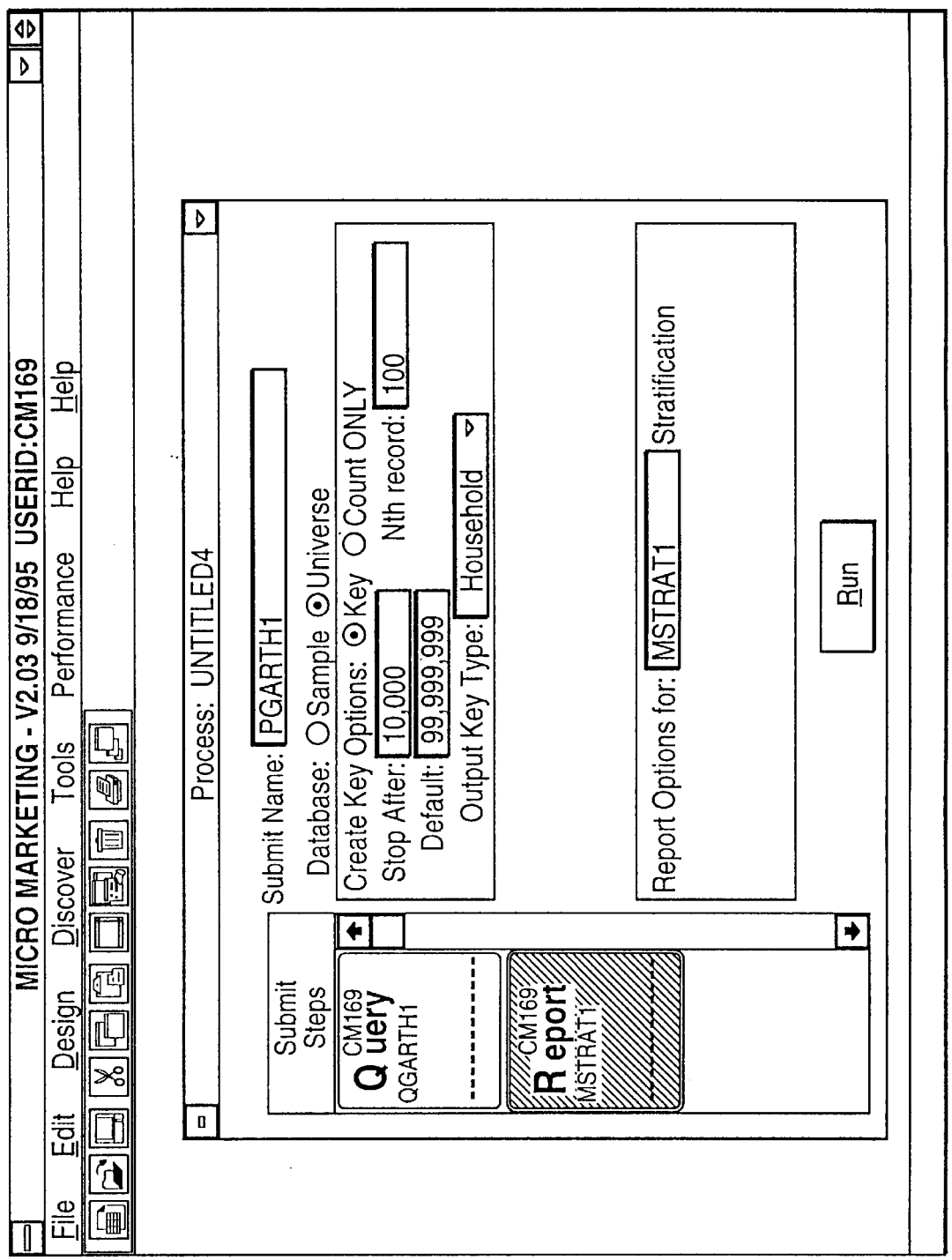
Figure 5G:
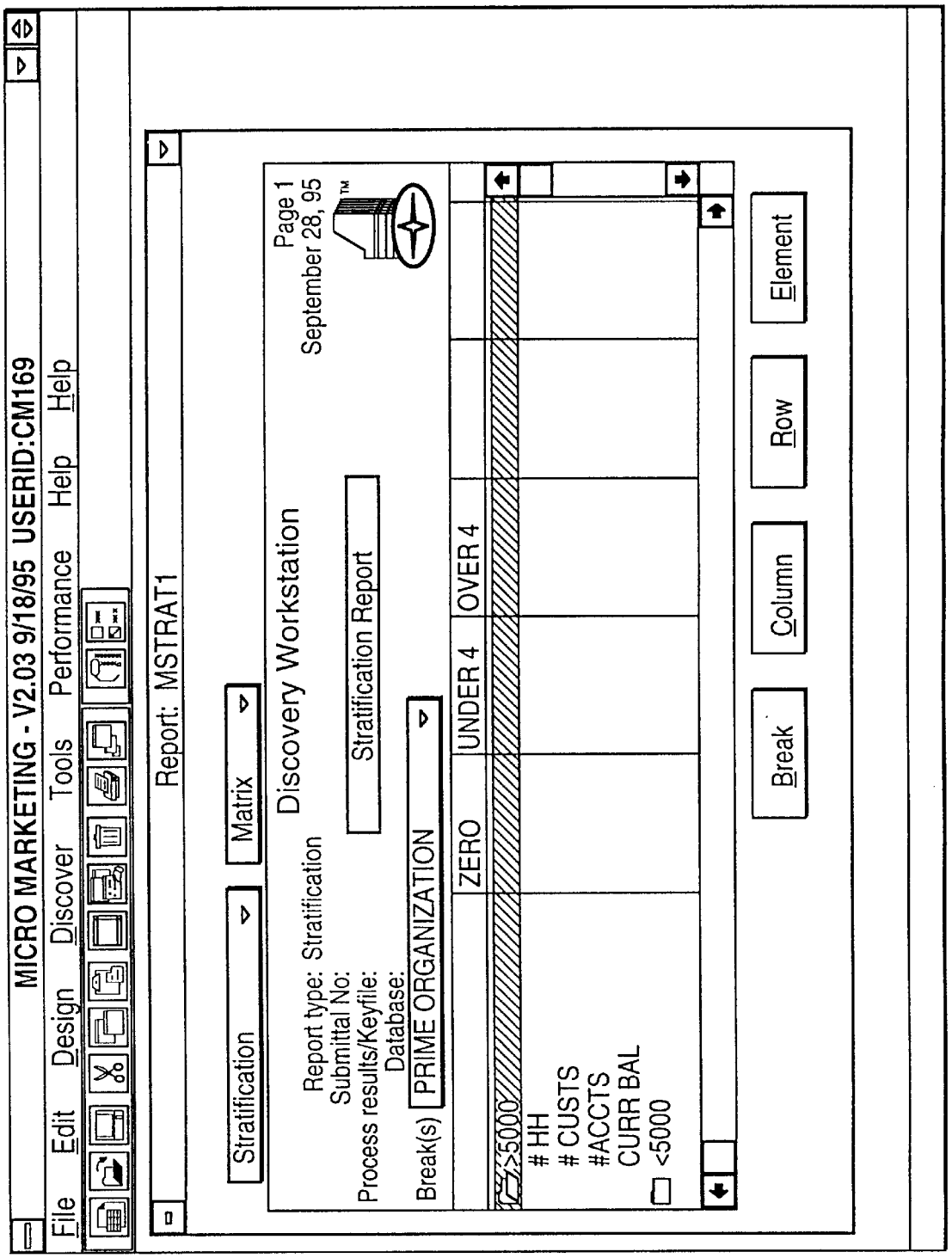
Figure 5H:
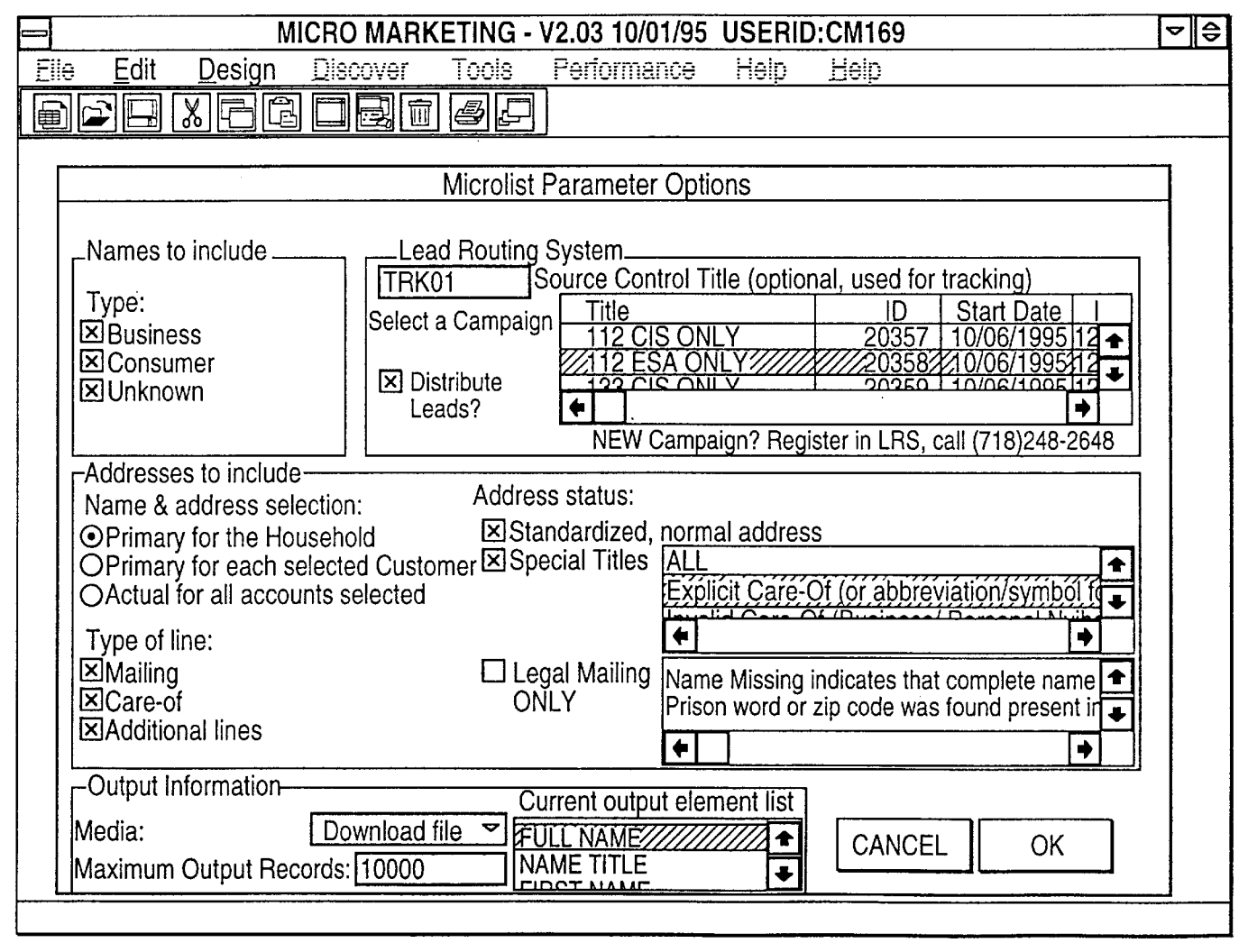

After creating the query, as shown in FIG. 5C, the user runs the query by creating a process using the display shown in FIG. 5F. The process shown in FIG. 5F, for example, submits two steps to the central database: Query and Report. The report step is created by defining the report type and report parameters using the display shown in FIG. 5G. Upon selecting Run from the display screen shown in FIG. 5F, the defined process is performed by the system, i.e., the query is run against the central database and a report is created according to the query results and the defined report parameters. As shown in FIG. 5H, a display screen is provided to allow the user to direct leads to a specific campaign and to load a file directly to a branch system.

Complement and General Limiting Criteria

The user will be asked to enter its Complement (universe) Limiting Criteria and the level at which it would be applied. The Complement Limiting Criteria is a type of criteria that limits the set of households (or customers) to be searched when the complement of a selection criteria is desired. A complement search is typical of NOT IN or NOT CONTAINS logic or functions.

The way to calculate these functions is to first find the keys (households or customers) that satisfy the positive condition. Then the complement of these keys is obtained. For example, if the households that do not have a certain product are desired, the system will first find the households that have the product, and then find the complement of these households. In searching for the complement, the set of households to be searched must be limited or the results will generally be undesirable. The criteria that limits the households to be searched during the complement operation will be referred to as Complement limiting criteria.

Two types of complement limiting criteria that are preferably used in the present invention are: location (organization) criteria and geographical criteria. The location criteria should always be required. Initial values may be assigned from the user profile. Each user is assigned to a maximum organization level whose data the user can access. A default location criteria will be assigned to the user's query, which the user can vary as long as the user limits the data further (by specifying one or more lower organization level within his own hierarchy path). The location criteria is used to schedule the job as a quick or long running job.

The location criteria fields are preferably in their own selection list. The workstation should ensure that any entries do not violate the user profile. However, the user should be forced to go through this selection process at least once.

The Geographical criteria includes fields such as state code, zip code, etc. These fields should also be in their own window selection list.

In addition to the complement limiting criteria described above, general limiting criteria are provided that have the common characteristic of appearing at all levels of the database hierarchy (household, customer, and account). At the account level the general limiting criteria are Actual values associated with each account. At the household and customer levels these are values derived from the Prime account.

Therefore, Complement Limiting Criteria can be applied three ways: at the Actual level, at the Prime level or at both levels. The user is asked at which level he wants to do the analysis and the workstation then generates the appropriate selection criteria at whatever level is desired.

If the Prime level is selected, it will be applied across the board. If the actual level (or both levels) is selected, the user should be given the opportunity to change the Complement Limiting criteria every time an account path is entered.

If a key table is saved, the key table may be used in NOT IN operations as long as the NOT IN appears together with the AND operator (AND NOT IN Key table).

The level of application of complement limiting criteria can be asked for in their own window that is associated to the location and geographic selection lists mentioned above.

The user is given the opportunity to specify key table operations by: 1) specifying if she wants to save the keys produced; and 2) incorporating previously saved keys in the current selection process.

If the user does not want to save the keys produced, the user will be forced later on to specify a list of output columns, the format of the output, etc. In other words the user will be forced to go through an output specification conversation. If so desired, Keys will be saved for later reuse at the (household or customer) level specified by the user.

If the user wants to reuse a previously saved key table, a window will open on the workstation interface to show a list of key tables available to him. The user can then point to a key table in the list to get further information about it. The capability of reusing and further refining key tables makes the system very flexible.

Once the above basic questions are out of the way, the workstation can show a menu of a series of selection lists pointing to various data groupings available to the user, one each for household, customer and the Asset & Liability and Bankcard account tables. Each selection list will have an associated selection criteria window where the user will see the criteria being built with data of that list.

In addition to the data selection windows there should be a Path Interrelationship window where the low level selection criteria under each window will be related among themselves with logical operators and parenthesis, as further described below.

The workstations in the micromarketing center provide for operations using data selection lists in generating queries and defining reports. Use of these data selection lists will now be described.

Household and Customer Selection Lists or Paths

A first set of windows are provided on the workstation interface to create selection criteria using household and customer columns, respectively. The workstation will help the user to do this task graphically.

For example, the user may point to a column, choose among SQL operators, and pick from a list of valid codes. As the user completely identifies a full SQL predicate, the predicate is moved into the associated selection criteria window, in "ghost" fashion. The user can then pick the predicate and insert it into a specific portion of the selection criteria window at which time the user can select among AND/OR/NOT and parenthesis operators to associate the predicate with other criteria already in the selection window. In similar fashion the user can move or delete any previously entered predicate within the selection criteria window and/or add/delete/move any parenthesis.

The workstation helps the user create predicates that include any SQL function and/or set of arithmetic operators, so that the user can include those in the selection criteria. Any initial predicate entry into the selection criteria window associated with a data window will automatically create an entry for that data path into the Path Interrelationship window, which can be manipulated as discussed below.

Account: Selection Lists or Paths

Account selection lists (account paths) under the relationship option present some special situations. First, the account selection lists work together with Account Path functions. There are four initial account path functions:

1. Household (customer) CoNTains Accounts
2. Household (customer) Does Not CoNTain Accounts
3. Household (customer) Contains Accounts having certain AGGregate characteristics.
4. Household (customer) Does Not Contain Accounts having certain AGGregate characteristics.

For the Household CoNTains/Not CoNTains Accounts path functions, the user picks a function and then specifies the criteria at the account level for that function, in a manner similar to the way criteria is specified for the household and customer above. This specification will also create an entry in the Path Interrelationship window.

Each of the functions have their own special characteristics. The first two allow the entry of selection criteria that are referred to herein as a simple account path. There are three versions of simple Account Path criteria:

1. CG_PROD_TYPE=A AND (CG_ACCT_BAL>1000 AND . . . )
2. (CG_PROD_TYPE=A AND (CG_ACCT_BAL>1000 AND . . . ) OR
   (CG_PROD_TYPE=B AND (CGQACCT_BAL<3000 AND . . .)
3. CG_PROD_TYPE IN (A,B,C) AND (CG_ACCT_BAL>1000 AND/OR . . . )

The three formulations for simple account path criteria are possible, but provide very different answers. The second is a generalization of the first and the third is a special case of the second. For non-expert users, it may be desirable to have the workstation limit users to one and two. Therefore, a single selection criteria can construct a Household CoNTains function that selects households that have any of one or more products with particular characteristics.

The selection criteria for the Household Contains/Not Contains Accounts Having Certain Aggregate Characteristics function has two parts. In the first part, the user specifies the products whose characteristics are to be aggregated. This first part is similar to the simple account path criteria described above.

In the second part, the user specifies which characteristics are to be aggregated and the aggregate conditions under which the household (customer) would be selected. Aggregations can be Counts, Sums or Averages. A typical criteria will be:

Under a WHERE clause:
CG_PROD_TYPE=A AND (CG_ACCT_BAL>1000 AND . . .)
Under a HAVING clause:
(SUM(CG_ACCT_BAL)>5000 AND COUNT(*)>3)

The Selecting products function is also organized by the workstation. Instead of presenting different column names (CG_SERV_TYP, CG_PROD_TYP and CG_SUB_PROD_TYP), the workstation presents a hierarchy of products. The hierarchy is preferably presented graphically, and includes higher level aggregations (asset or liability, deposit vs loans, revolving vs non-revolving etc.). The user may select a product set at any level of the hierarchy. If the selected product set is not stored as a value/column in the database (a revolving flag for example), the workstation will generate a compound predicate or IN list with the values within the hierarchy that are equivalent to the product set desired by the user.

If the selection is done at the CG_SERV_TYP level and aggregate functions are requested, the workstation will recognize that these may exist at the household (customer) level already and use them. The database will ascertain whether the user has specified criteria at the account level that is consistent with what is in storage at the household or customer level in the central database 10.

As the user enters selection criteria associated with the different data selection lists (and also using the account functions) a higher level inter path logic must be defined. The user will be asked to enter logical operators and/or parenthesis to define this logic. It is this high level logic that will guide the generation program. As described above for the individual selection criteria associated with a data path, the user will be able to point & click a component of a predicate and drag(move) or delete it, etc. A double click activates the detail selection criteria window for the component of the predicate (key table components will display the description of the key table). At any time the user can print this or any other data/selection criteria window of the query, or the full query details.

Although SQL provides a language to build selection criteria, the higher level functions supported by the system require a higher level set of keywords. This set of keywords is used at the Path Interrelationship window, but is also useful at each individual selection criteria window. To give an idea of these high level set of keywords a preferred general format follows with some examples.

General Format
{Path}{*high level function @ function-seq-no}{* SQ1 or other clauses and/or parenthesis}

Examples of Paths
HHD—criteria at the household level was entered.
CUS—criteria at the customer level was entered.
LOC*Lvl—Location criteria at the Prime (P), Actual (A), or both levels (PA).
GEO*Lvl—Geographic criteria at the Prime (P), Actual (A), or both levels (PA).
ALA—criteria for Asset & Liability accounts
BC—criteria for Bankcard accounts.

Examples of High Level Functions
CONT—household (customer) contains accounts of specified products
NCONT—household (customer) does not contain accounts of specified products
AGG—household (customer) has product with certain-aggregate (household, customer) characteristics (SUM, AVG,COUNT).
NAGG—household (customer) is lacking a product with certain aggregate (household, customer) characteristics (SUM, AVG, COUNT).

Examples of Clauses
PROD—A simple product (account type) criteria. The product can be specified at various levels (SERVTYP, PTYPE, STYP or predefined grouping such as all assets, all liabilities, all revolving credit, non-revolving credit, etc.)
HAVING—Describes the aggregate characteristics desired for selected simple product criteria.

The above keywords are combined with AND, OR, NOT (in) and parenthesis in the path Interrelationship screen or at the Selection criteria screen. For example, at the path interrelationship screen, the keywords can be combined as follows:
HHD AND CUS AND LOC*P AND GEO*P AND
((ALA*CONT@1 AND ALA*AGG@2) OR
(SAVED-KEY-TABLE))

At the Individual Path Selection Window, the keywords can be combined for asset/liability accounts, for example, as follows:

(CONT@1 [PROD (SERV_TYP='CHK' AND CG_ACCT_BAL>2000))]
AND
AGG@2 [PROD (PROD_TYP='CD6')
HAVING (SUM(CG_ACCT_BAL)>1000 AND COUNT>=1)])

At the selection criteria window the user will see a detail of the high level logic described in the path interrelationship window. The AGG, CONT, etc. serve as markers for high level functions. In a DAX/Prime type of query these functions do not exist and the selection criteria should look similar to straight SQL criteria. Alternatively, the Path Interrelationship window can be avoided by having the workstation generate a simulation of it for the mainframe to analyze, or by having the database generator at the mainframe do more work to breakdown the request.

The workstation may also be equipped to handle predicates that cross over paths as shown, for example, in the following statement:

(HH_FIPS_ST_CD='36' or CG_FIPS_ST_CD='36')

However, except for LOCation or Geographic data there is usually no need for this type of criteria and these cases can be taken care of by merely asking whether the user wants to apply these criteria at the Prime or Actual level.

After the user finishes all the above steps, she can submit her query for execution and follow its progress on the job control subsystem. Alternatively, the user can enter the output specifications to use with the selection criteria (universe selection).

Central Customer Information System

The CCIS 13 preferably includes workstations located in the bank branches for each of the personal bankers and branch managers, and also in the main office of the community bank for the officers and/or sales managers of the community bank. Each of the various workstations of the CCIS 13 has a different function, depending upon the user's responsibilities and duties within the bank.

The branch managers receive the list of leads generated by the micromarketing center 11 and electronically load the leads into the CCIS workstations for distribution among selected personal bankers within the branch. The branch managers assign the leads to the personal bankers most qualified to handle the leads, or based on the workload and availability of the personal bankers.

The personal bankers receive access to the list of leads on the CCIS workstation after the list is generated by the micromarketing center and communicated to the CCIS. The personal bankers then conduct sales sessions (e.g., telephone calls) with each of the customers on the list of leads. Before and during the sales sessions, the personal bankers use the CCIS 13 to view a complete profile (in detail or in summary form) of the customer's relationship with the bank and any other demographic information about the customer contained on the central database 10. This allows the personal banker to speak intelligently with the customer during the sales session and thereby increase the success rate of the marketing campaign.

The branch managers and bank officers, in turn, use the CCIS 13 as a tracking and reporting management tool to automatically capture daily sales information. The branch managers and officers access the detailed sales transactions for each personal banker using the CCIS 13, and view the sales results for the various campaigns to track the performance and make adjustments in the campaigns as necessary. The branch managers and bank officers can also use the CCIS 13 to reassign leads among personal bankers and/or branches to optimize the use of marketing resources.

The CCIS 13 therefore is a marketing, management, and sales tool. The CCIS 13 includes several integrated components that are used to view customer information and manage customer contacts and relationships. The operation of the CCIS 13 is described below.

Figure 6A:
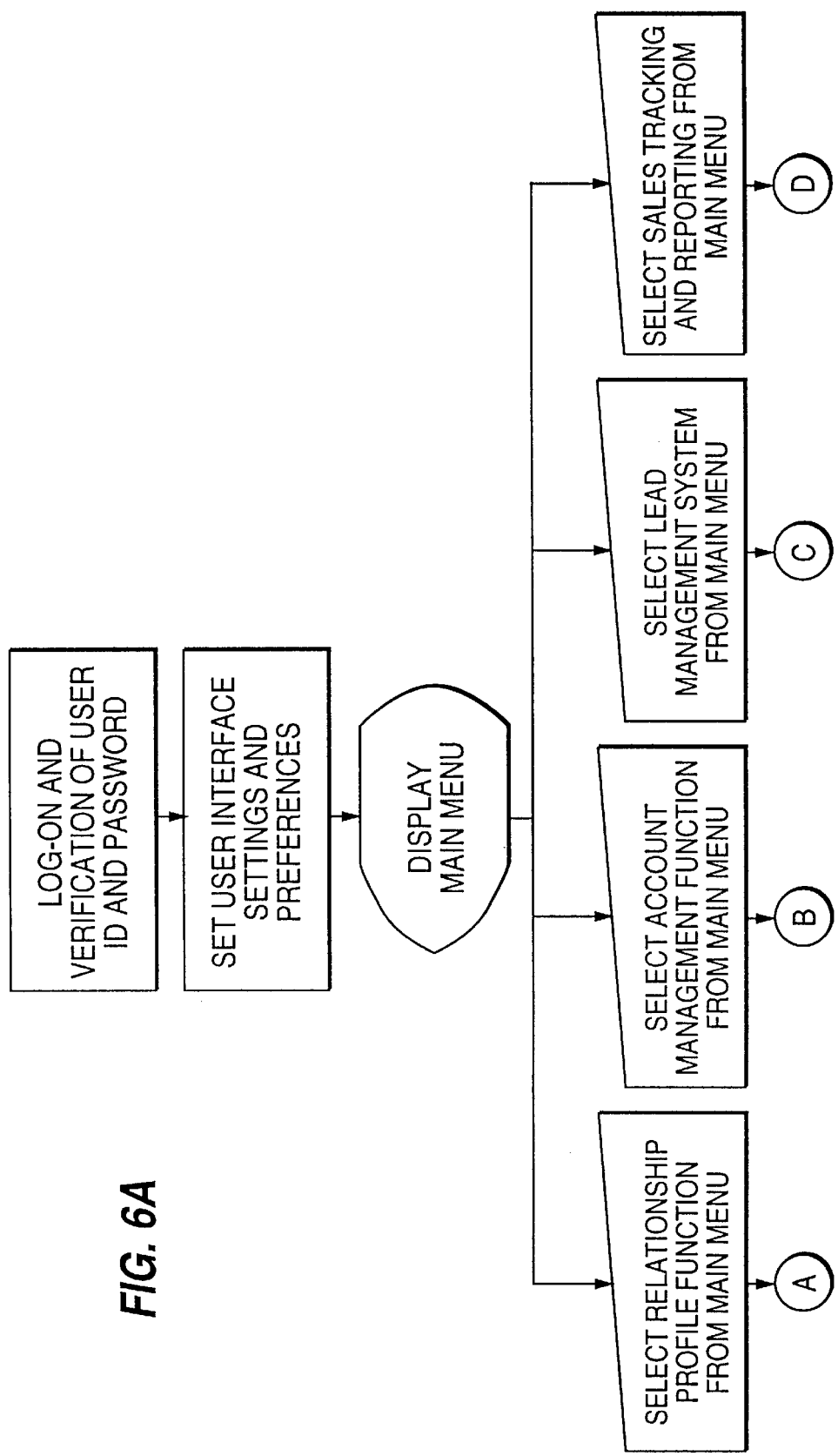
FIG. 6A is a flow chart showing the initial process steps of accessing and entering information from the central customer information system.

Referring to FIG. 6A, the workstations of the CCIS 13 first require a logon and verification procedure similar to the workstations of the micromarketing center 11. Users enter their user ID and password into the workstation, and the system verifies the ID and password against the central database 10 to set the user's interface settings and preferences and determine the user's entitlements. Upon entry of a valid user ID and password, the workstation then displays a main menu giving the user the option of selecting a relationship profile component, an account management component, a lead management system, or a sales tracking and reporting component. These components are each described below.

Relationship Profile Component

The relationship profile component of the CCIS 13 allows appropriate staff members to find and view household, customer, and account level information. The relationship profile component shows current and historical firancial and behavioral information about the total relationship of the household or customer with the financial institution. It contains information on individual accounts owned, how customers do their banking at the financial institution, and whether they are managed by a particular personal banker. The relationship profile component provides a sales preparation tool that displays all the information available about the customer, the customer's relationships to other customers, and in-depth account information on all accounts owned by the customer and/or the entire household.

Information is available in the relationship profile component in detail as well as in summary forms. In combination, the information in the relationship profile can be used to gauge the depth of each banking relationship in order to better prepare for sales and service conversations.

The relationship profile component includes a promotional suppression facility that allows the financial institution to flag or otherwise identify those customers and non-customers who have requested not to be contacted by phone, by mail, or both. Customers who do not want promotional contacts may be registered on a promotional suppression screen in the relationship profile or relationship building functions if the customer is listed as a lead in a campaign. Non-customers who do not wish to be solicited can also be registered on a suppression screen from the main menu.

Once the customer is identified, the suppression flag is automatically transferred to all applicable customer information screens and also becomes part of the list generation process to insure that these customers are not contacted.

The relationship profile component also includes a customer promotional contact history file that contains information about prior customer contacts in which the customer participated in a mail or telemarketing campaign. Customer contact information may be viewed using the relationship profile component or the relationship building function.

The contact history file is important because it prevents the various businesses within the financial institution from "overcontacting" customers. It helps to unify and manage the customer contact process.

Figure 6B:
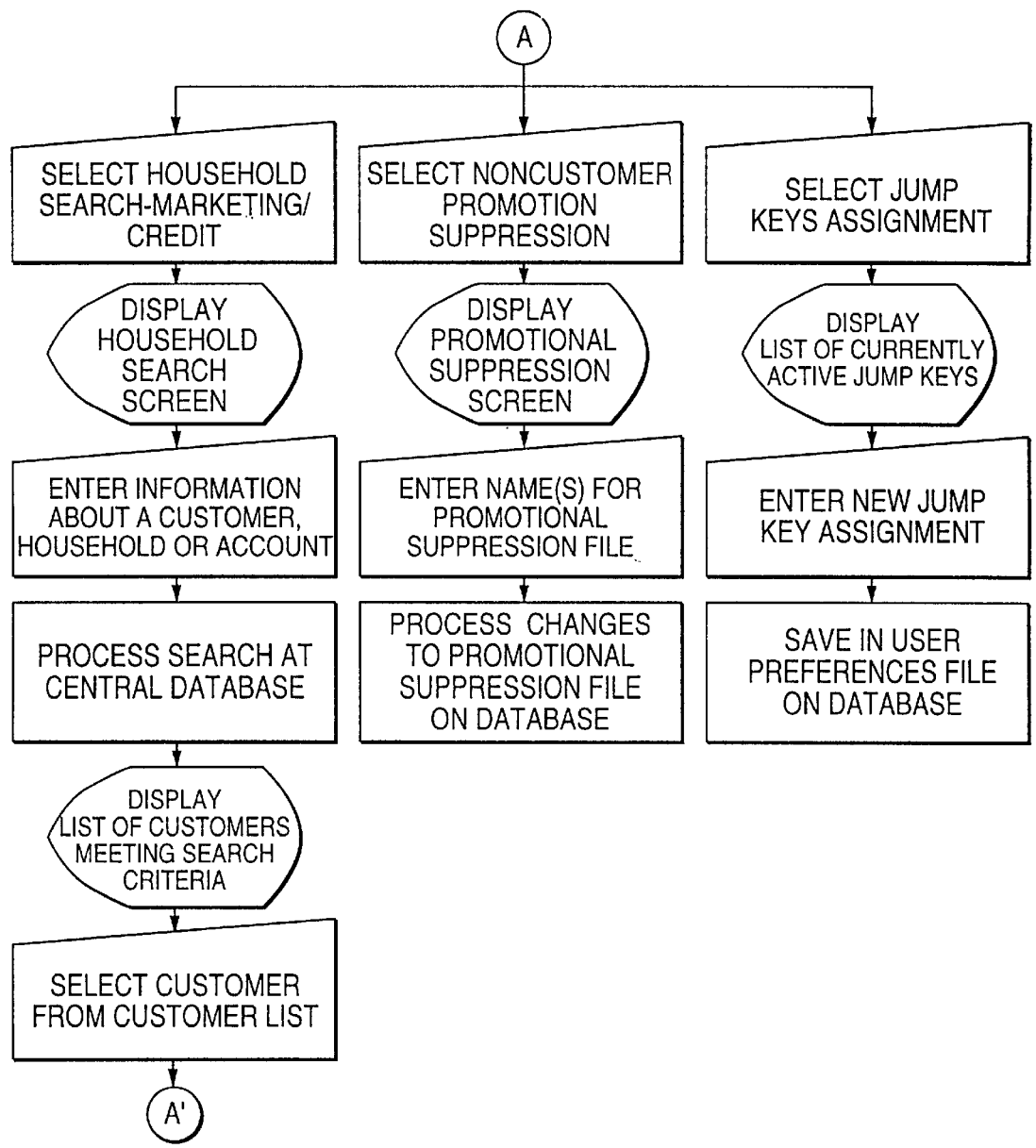
FIGS. 6B–6C are flow charts showing process steps for viewing various customer and household profile screens from a workstation in the central customer information system.

Referring to FIG. 6B, in selecting the relationship profile component from the main menu, the user is given the option of selecting a household search function, a promotion suppression function, or assigning jump keys to various relationship profile screens. If the household search function is selected, the user is prompted to enter selection criteria (e.g., a unique identifier number, name, address, bank, branch, service, etc.) to find and view information about a particular customer, household, or account.

The search function may be used in two ways: to help narrow a search for a specific customer or to view an enrollment program customer list. Each function allows the user to select a particular customer in order to view information about that customer.

In viewing an enrollment program customer list, the user can enter the personal banker's personnel number and the name of the enrollment program. The system will then provide an alphabetical listing of households assigned to the personal banker, any of which households can be selected for viewing detailed information about the household.

Figure 6C:
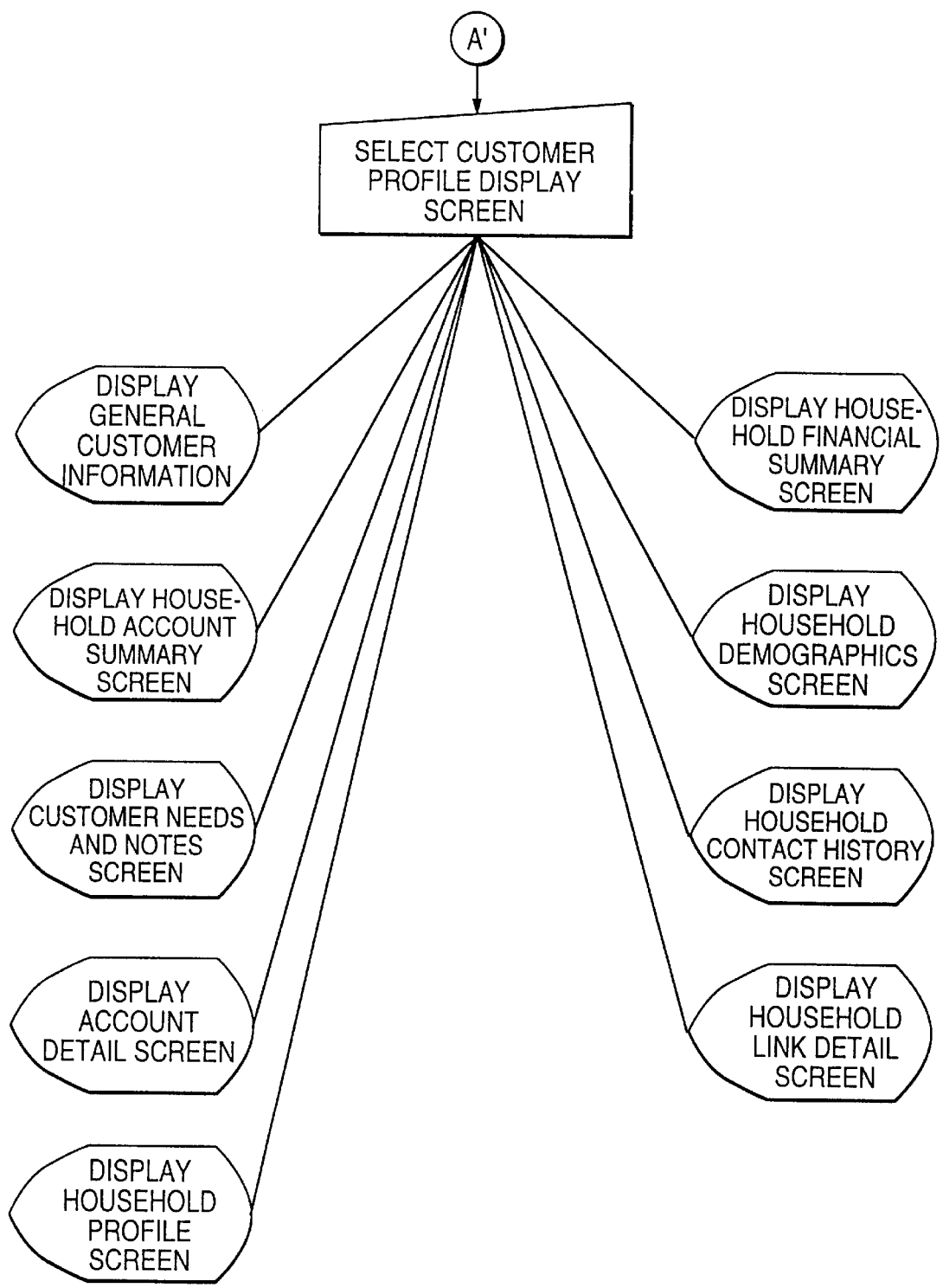

Once the particular customer, household, or account is identified, a number of customized display screens are available to present the information about the customer. As shown in FIG. 6C, for example, the user can select from among a general customer information screen, a household summary screen, a customer needs and notes screen, an account detail screen, a household profile screen, a household financial summary screen, a household demographics screen, a household contact history screen, and a household link detail screen.

The general customer information screen displays general customer information, including products owned, services used, and customer behavior. The customer information on this screen includes the primary name and address for the customer and the "best" phone number based on internal feeds into the central database and external matches, and the name of the customer's personal banker (if any). The customer information on this screen also includes details of the customer's activities, including the number of checks written, teller transactions, ATM usage, electronic and phone banking services used, payments made with checks from financial competitors, current and historic balances, customer net revenue, credit card usage patterns, the branch where the customer's primary account is domiciled, the customer's preferred branches based on frequency of use, and other products and services used by the customer.

The household account summary screen shows accounts and other information for all members of a selected household. The user can view detailed product and account information by selecting the product or account from the list displayed on the household account summary screen.

The customer needs and notes screen identifies possible sales opportunities based on account ownership, balances, and customer behavior. These are system generated tags. The screen also allows the user to add the user's own notes to capture information about the customer (e.g., homeowner, children, competitor, business address change, etc.) or record telemarketing calls to the customer.

The account detail screen shows information about a single account. A top portion of the screen shows customer information, while a bottom portion of the screen shows details about the specific account, including a balance history where applicable.

The household profile screen displays information about the entire household. It includes aggregate financial and product information, specific information about each member of the household, and appended external "best guess" demographic information for use in planning calls or for developing sales plans. The household profile screen also displays the primary name, address, phone number, and branch for the household, as taken from the primary account in the household.

The household/customer financial summary screen aggregates accounts owned by all members of a household or by a particular customer into product types (major services) and compares balances to the prior month and the prior year. Summaries are available for total accounts, private bank accounts, commercial accounts only, or retail accounts only. All product types owned by the household or customer will be displayed, including investment services such as brokerage accounts and managed funds, credit services such as bank cards, credit lines, mortgages, secured credit, and business and professional credit products, and other fee-based services such as safe deposit and insurance.

The household demographics screen displays appended household information purchased from outside sources. This screen may also display information that is inferred from other information about the customer. For example, repeated usage of a credit card at a baby supply store might be used to infer that the customer has one or more small children.

The household contact history screen displays household level information about telemarketing and mail contacts. The information comes from the customer contact history file, which captures information about customer contacts (both telemarketing calls and mailings) from the various businesses of the financial institution and from use of the relationship building function.

The household link detail screen displays the links used by the central database 10 householding process to bring customer accounts together. It displays the account number, the last name or business name on the account, the zip code, the link type, and the link value.

In order to properly manage certain households it is necessary to link two or more households together or to de-link parts of a household to make separate households. The CCIS 13 includes means for bringing accounts together or delinking accounts based upon information received from the source systems, such as common names and addresses, social security numbers, and account links.

Account Management Component

The account management component of the CCIS 13 is a system for account officers to use to manage groups of households and/or customers by enrolling them into special programs provided by the financial institution. Once the household or customer is enrolled in a program and is assigned to a personal banker, the personal banker can offer the customer personal relationship management to better manage the customer's banking relationships. The customer will be "flagged" as a managed household to alert other sales staff that the customer has an exclusive relationship with a personal banker. It also guarantees that leads distributed from the micromarketing center 11 are assigned to the personal banker for that customer. The customer has the added benefit of dealing with only one personal banker who understands the customer's needs.

The account management component includes on-line report viewing and printing facilities that generate monthly reports used by personal bankers and their branch managers to evaluate program growth. Reports show account management program information in a variety of ways, from individual account and customer level information to summary overviews for the entire portfolio.

Figure 7:
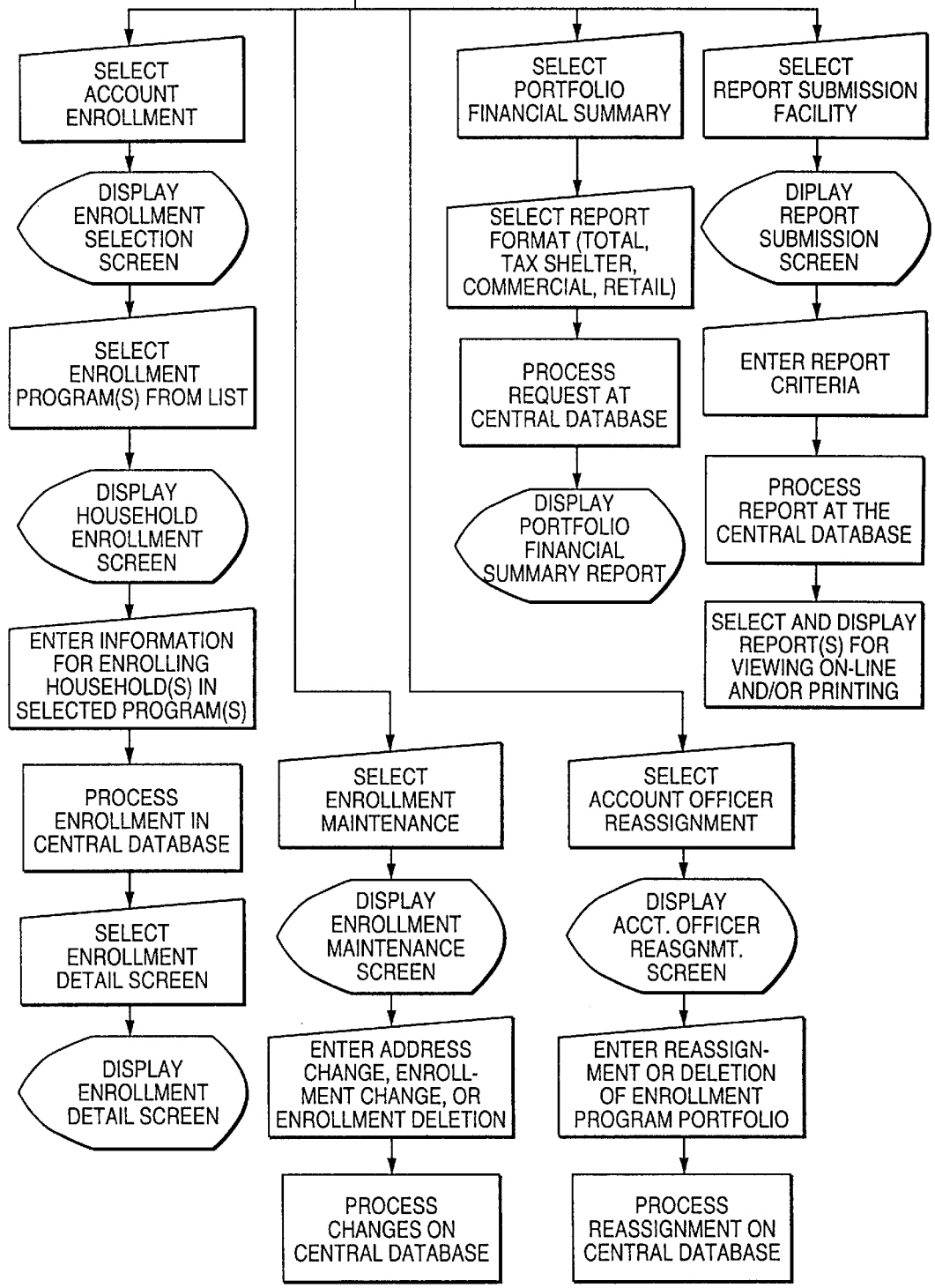
FIG. 7 is a flow chart showing process steps for account management functions using the central customer information system.

Referring to FIG. 7, in selecting the account management component from the main menu, the user has the option of selecting account enrollment, enrollment maintenance, account officer reassignment, portfolio financial summary, or a report submission facility. These functions will be described in turn.

By selecting account enrollment, the workstation displays an enrollment selection screen. The enrollment selection screen allows the user to select a program, supply program information, and enroll households in a particular program. The list of enrollment programs is updated and maintained on the central database 10.

After a particular program or programs are selected from the list, a household enrollment screen will be displayed that allows the user to enroll several households in one program at a time. The user enters the information for each household, including the account number and special address (if any). The enrollment is then processed in the central database 10 and can be displayed by selecting the enrollment detail screen. To avoid enrolling a household in more than one enrollment program or to more than one personal banker, the CCIS 13 automatically displays the enrollment detail screen and alerts the user whenever a user tries to enroll a customer into an account management program and the household is already enrolled in an active program.

By selecting enrollment maintenance from the main menu, a mailing address or enrollment maintenance screen is displayed to select or create a special home and/or business address that is only valid for the CCIS enrollment program, or to make an enrollment change or deletion on the CCIS 13.

By selecting account officer reassignment from the main menu, an account officer reassignment screen is displayed to reassign or delete a personal banker's full portfolio of households in an enrollment program. This feature is preferably accessible to only those users having control officer entitlements.

Reassignments can be for all enrollment programs or for only selected programs, and can be used to reassign the same officer to a different branch or to reassign the enrollment programs to another officer at the same branch or a different branch.

By selecting portfolio financial summary from the main menu, the user can select a report format and display a dynamic report showing current enrollments. The portfolio financial summary is an on-line report that displays summary information based on the accounts belonging to households enrolled in a program assigned to an individual account officer. It aggregates accounts in the portfolio into product types and compares balances and customer net revenue to a month ago and a year ago. Separate summaries are preferably available for total accounts, tax shelter accounts, commercial accounts, and retail accounts.

By selecting the report submission facility from the main menu, the user can run reports and place them in a file so that they can be viewed and/or printed from the report viewing facility, or sent to a central data center for printing. These reports preferably include an account officer summary, a portfolio summary, a growth measurements summary, and a household profile. The reports are "point in time" reports available at personal banker, branch, area, and bank levels.

Lead Management System

The lead management system of the CCIS 13 provides full lead management capabilities through on-line delivery of sales lists to personal bankers. It supports a comprehensive sales process with numerous options for working sales leads, including the ability to place active leads into a calendar for further action, to add new leads (both current customers and non-customers), and to transfer leads on-line to specialists or other personal bankers within the financial institution for future action.

The lead management system is the contact management component of the CCIS 13. The lead management system provides paperless delivery of leads to personal bankers, paperless delivery of referrals to appropriate specialists across the financial institution, and paperless capture of sales activities.

The lead management system supports a comprehensive sales process. Personal bankers have many options for working sales leads. They may work against an appointment calendar, the "next" customer in the priority queue regardless of campaign, the "next" customer for a particular campaign, or leads already in progress.

The lead management system also allows users to add leads directly to the CCIS 13. These can be leads that they will work personally or leads that they will refer to other experts within the financial institution.

Personal bankers are offered a full array of sales preparation information about the campaign and the customer to prepare for the sales contact. Results of the contact are fed into a personal calendar function, which is updated in real time. This allows the personal banker to schedule and track follow-ups on each sales call.

Branch managers and area directors can view lead statistics, such as ratios of leads being worked versus those not being worked among branches for campaigns and among personal bankers in specific branches. Leads can be assigned and reassigned so that they are more effectively distributed.

The lead management system starts with a database of leads for each personal banker. These are organized by program and are prioritized so that the best leads are worked first. These leads also honor account officer assignments so that leads are first directed to the personal banker or officer assigned to the relationship.

Figure 8A:
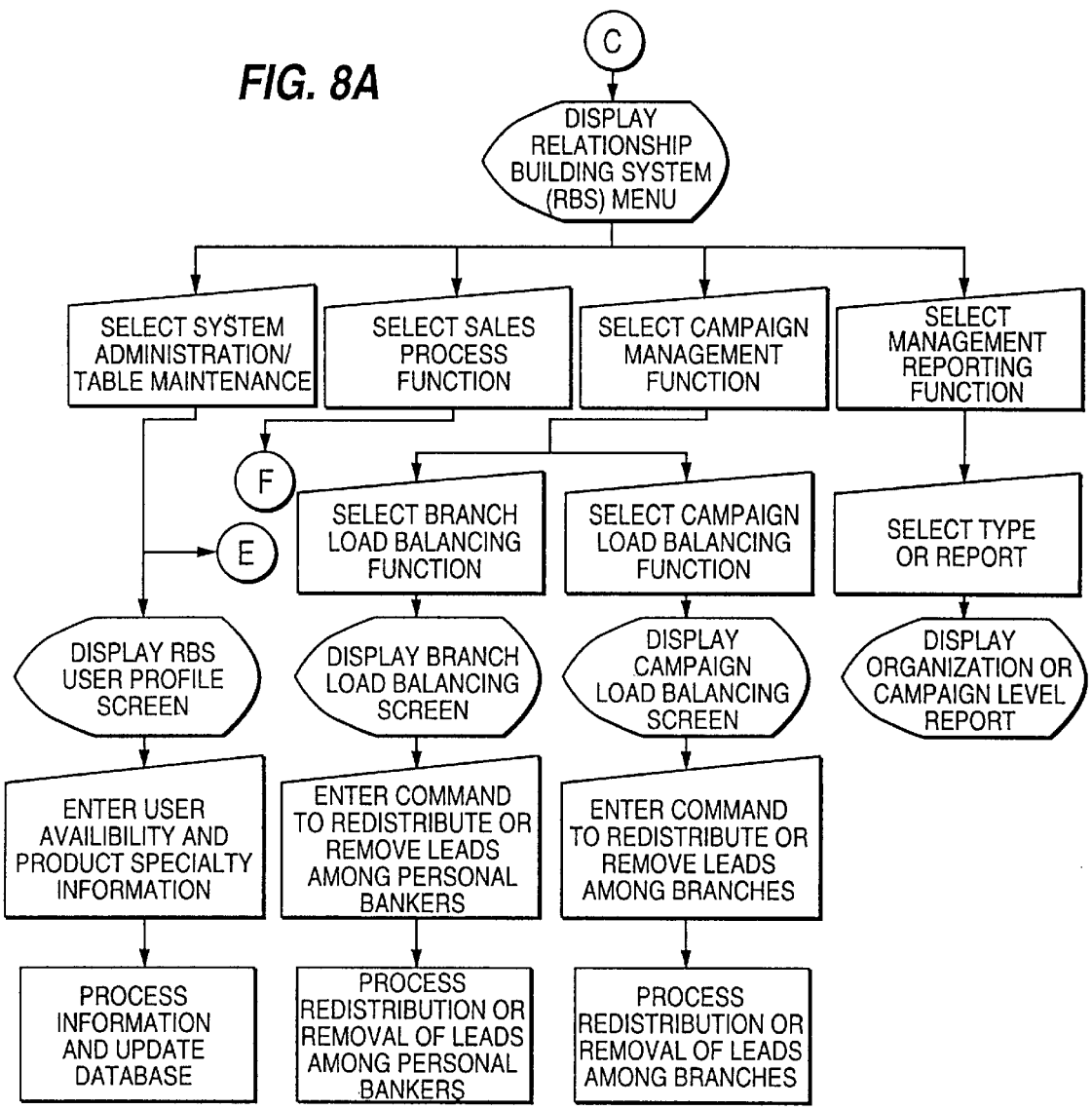
FIGS. 8A–8C are flow charts showing process steps for a relationship building system using the central customer information system.

Referring to FIG. 8A, the lead management system provides a means for selecting a number of functions from the main menu. Branch managers can use a user profile feature of the system administration/table maintenance function to define personal banker availability and product specialties. This function allows branch managers to communicate to the system user availability and product specialty information. This information is then used to determine: which personal bankers are accepting new leads and which are on vacation, involved in a special project, etc.; which personal bankers are accepting leads in multiple locations; and product specialties that should be used in assigning leads, such as mortgages, investments, etc.

Figure 8B:
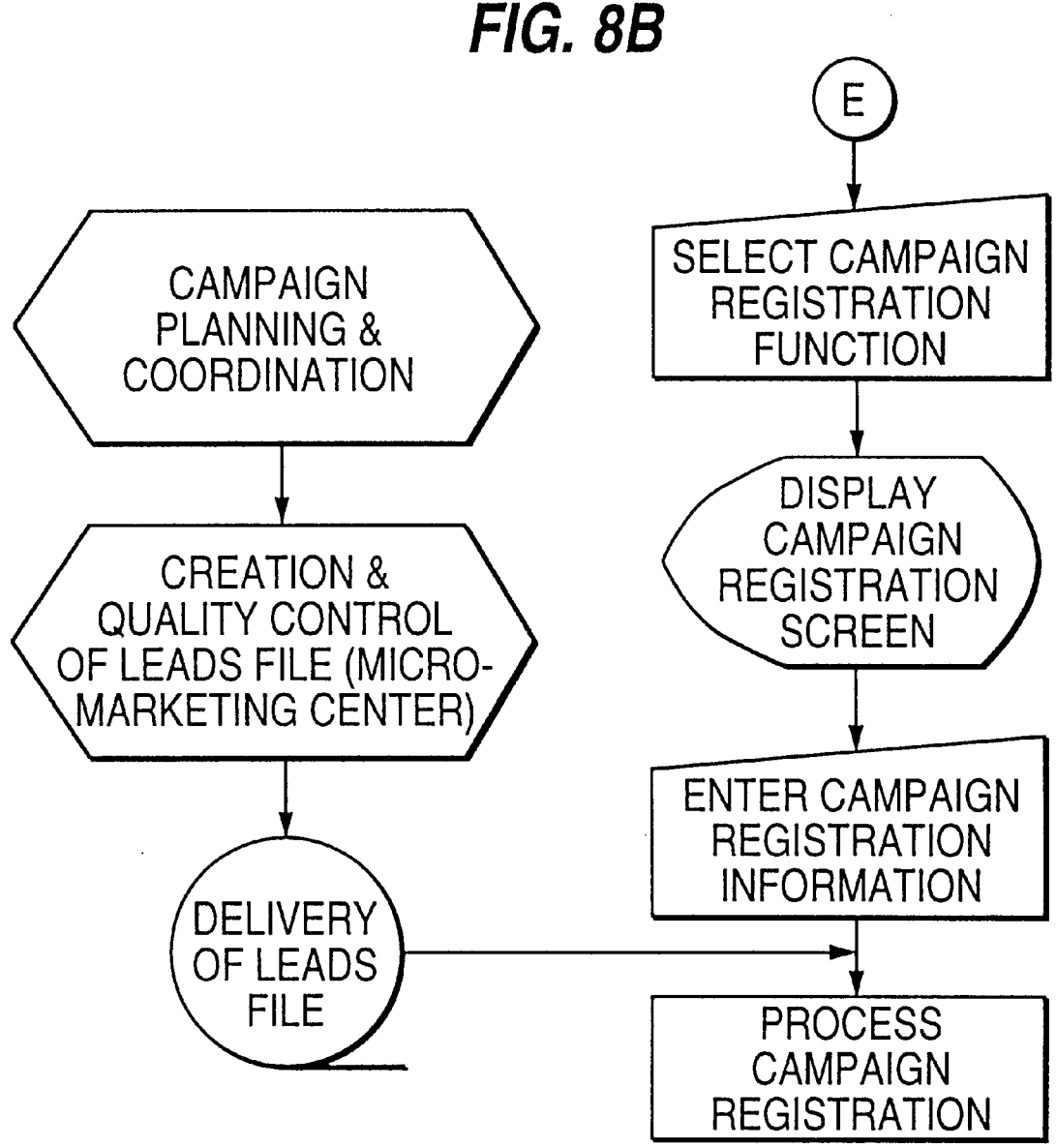

Referring to FIG. 8B, the lead management system also provides a campaign registration function for setting up new marketing campaigns. The campaign registration function is preferably done centrally by the management of the CCIS 13 coordinating with the management of the micromarketing center 11. However, sales leads can also be manually input by the personal bankers and branch managers. Both customer and non-customer leads can be individually ranked and added to campaigns while the campaign is in progress using the campaign registration function.

Leads are created according to management priorities. The campaign registration process has three parts. First, the campaign must be planned and coordinated. This also includes prioritizing the leads by the organization that will work the leads. Second, the file of leads must be created, quality controlled, and delivered to the CCIS 13. Third, the campaign must be registered on the campaign registration screen.

The campaign registration screen captures information used to distribute leads and execute the campaign. The information entered into the campaign registration screen preferably includes: a description of the campaign that includes the coordinator's name and address and explains the purpose of the campaign and any qualifying factors; a ranking for the campaign among all campaigns; whether referral leads may be added to the campaign; whether new leads should be appended or whether the campaign should be rebuilt when refreshed; milestones such as start and expiration dates, retention periods, and purge date; how to rank leads within the campaign (e.g., by balances, footings, profitability, or special priority order); and on what basis to select the branch to work the leads (e.g., where the account is domiciled, where the customer does most transactions, mailing address, etc.).

The leads are then distributed to personal bankers based on preset priorities. The lead management system honors existing personal banker relationships. A lead for a customer or household enrolled in an account management program is automatically assigned to the personal banker managing that relationship.

The lead management system has calendar functions, automatic lead transfer functions, a facility where additional customer and non-customer leads can be added, and automatic activity tracking capabilities. Also, users may "toggle" to other screens in the lead management system or customer profile system via jump keys in order to view customer information or perform other functions.

Figure 8C:
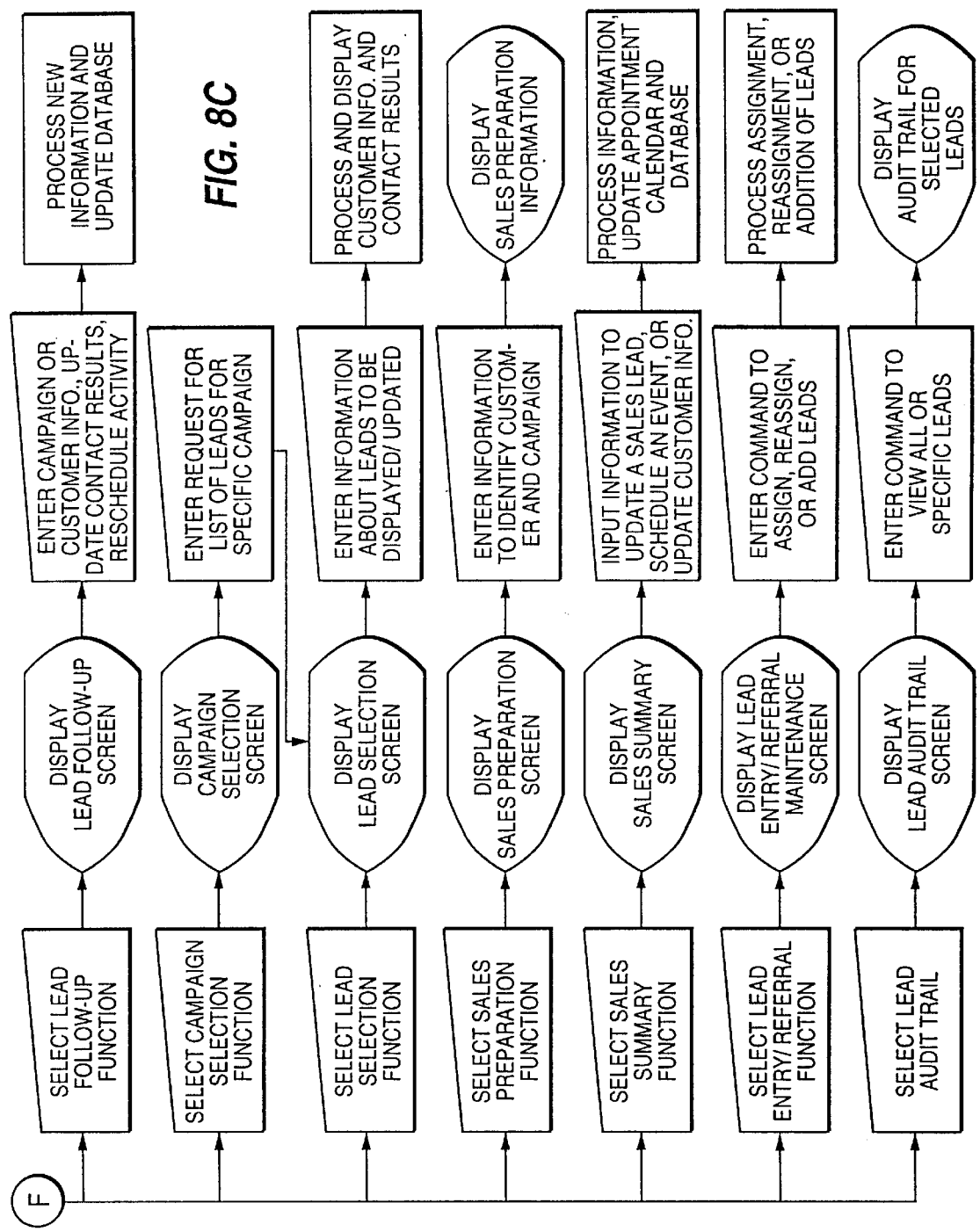

Referring to FIG. 8C, the sales process function of the lead management system will be explained in further detail. The sales process function provides a number of features, including lead follow-up, campaign selection, lead selection, sales preparation, sales summary, lead entry/referral, and lead audit trail.

The lead follow-up feature, when selected by the user, displays all scheduled appointments and events by date and time. Appointments can be made for main follow-ups, phone calls, or face to face meetings. The user can use this feature to view information about the campaign or customer such as contact history, customer notes and sales prompts, to update customer information and contact results, refer the customer to another sales person, or to reschedule the planned activity.

The campaign selection feature, when selected by the user, lists all campaigns assigned to the branch and/or personal banker with the number of leads and the lead status for each campaign.

The lead selection feature, when selected by the user, displays leads based on how the display was requested. The leads can be displayed in either rank or alphabetical order. From this screen, the user can view campaign or customer notes, view product and balance information, view contact history, view prompts, update customer information and contact results or schedule a follow-up activity, or update customer contact information and refer the customer to another sales person.

The sales preparation feature, when selected by the user, displays all of the campaigns for the customer, customer contact information such as name/address, phone, best time to call, suppression information, and a history of prior contacts. This feature also provides sales preparation prompts and notes that originate from other sources within the system. For example, customer prompts and notes come from customer information in the relationship profile component. Campaign prompts originate in the campaign registration function, and campaign notes are entered by the person working the lead on an "endless" note pad. Campaign prompts and notes stay with the lead.

The sales summary feature, when selected, is used to capture the outcome of each sales contact or sales attempt. The system will present the appropriate screen for entering information for closing a sales lead, maintaining a sales lead in progress, scheduling the next event for this lead, updating customer information, or entering customer notes.

The sales summary feature feeds information to the appointment calendar (the lead follow-up screen). If a date is input, the appointment calendar will be updated and the event will be scheduled. The sales summary screen will also feed information to the various facilities that summarize lead inventories, such as call attempts, and provide various campaign statistics for use by management.

The lead entry/referral feature, when selected by the user, is used to assign or reassign customer and non-customer leads to a campaign and to a specific branch and/or personal banker. The lead entry/referral screen can also be used to capture new leads or to capture information on referrals so that the lead can be added to a campaign or transferred to another personal banker.

Leads, which are always assigned to a specific campaign, can refer to existing customers or to non-customers. Leads can come from walk-in business, customers who attended a seminar, referrals from current customers, and so forth.

The lead audit trail feature, when selected by the user, informs the personal bankers whether anyone else has worked their assigned leads. The lead audit trail screen displays leads that have been worked by others or that have been transferred into or out of a personal banker's inventory. Branch managers can audit all personal bankers in their branch using the lead audit trail feature.

The campaign selection management function is used to balance campaign loads among personal bankers and branches. The branch load balancing screen shows how the leads for each campaign are distributed to the personal bankers in the branch and indicates "new" leads versus those "in progress." This screen allows leads to be moved from one personal banker to another, from one personal banker and redistributed evenly to all personal bankers in the branch based upon work load, or removed altogether and dropped from the campaign.

The campaign load balancing screen is similar to the branch load balancing screen, but shows how the leads for each campaign are distributed among the branches, rather than among the personal bankers. This screen allows leads to be moved from one branch and assigned to another branch, moved from one branch and redistributed evenly to all branches based upon work loads, or removed altogether and dropped from the campaign.

The management reporting function displays or prints organization or campaign level reports showing the status of leads in each campaign. This reporting function also displays a listing of all branches within an area or bank for one specific campaign, and a listing of all campaigns for each specific organizational level.

Sales Tracking and Reporting Component

The sales tracking and reporting component is a management information system ("MIS") that provides daily on-line sales summary reports on products and services for organizations from bank and area to branch and personal banker. The sales tracking and reporting component utilizes the central database 10 to analyze and report sales transactions for each personal banker or other customer service representative.

The sales tracking or management information component of the CCIS is preferably in the form of a general purpose programmable computer that is linked, preferably by telecommunications means such as an X.25 network, to the other systems of the present invention. More specifically, the sales tracking or management information component is linked to the other portions of the system such that every transaction occurring within the system can be tracked. This provides numerous opportunities for tracking and reporting sales information to facilitate the sales process. For example, the sales tracking or management information component preferably includes means for receiving inputs from the branch systems and means for tracking and reporting totals on-line according to two different hierarchies, product and organization. On-line viewing and printing is available on a daily basis and totals are available by sales reps within branches and business. Also, information is reported by time periods; daily, monthly, quarterly or by the year.

Sales transactions are stored on the central database 10 for a predetermined time after entry into the CCIS 13 (e.g., twenty-four months), are captured directly from actual bookings during the sales sessions, and are available in real time as soon as the sales transactions are transmitted to the central database 10. The sales tracking and reporting component includes a sales summary stored in the central database 10 that is updated daily, so that up-to-date sales information is available at the start of each business day.

Figure 9A:
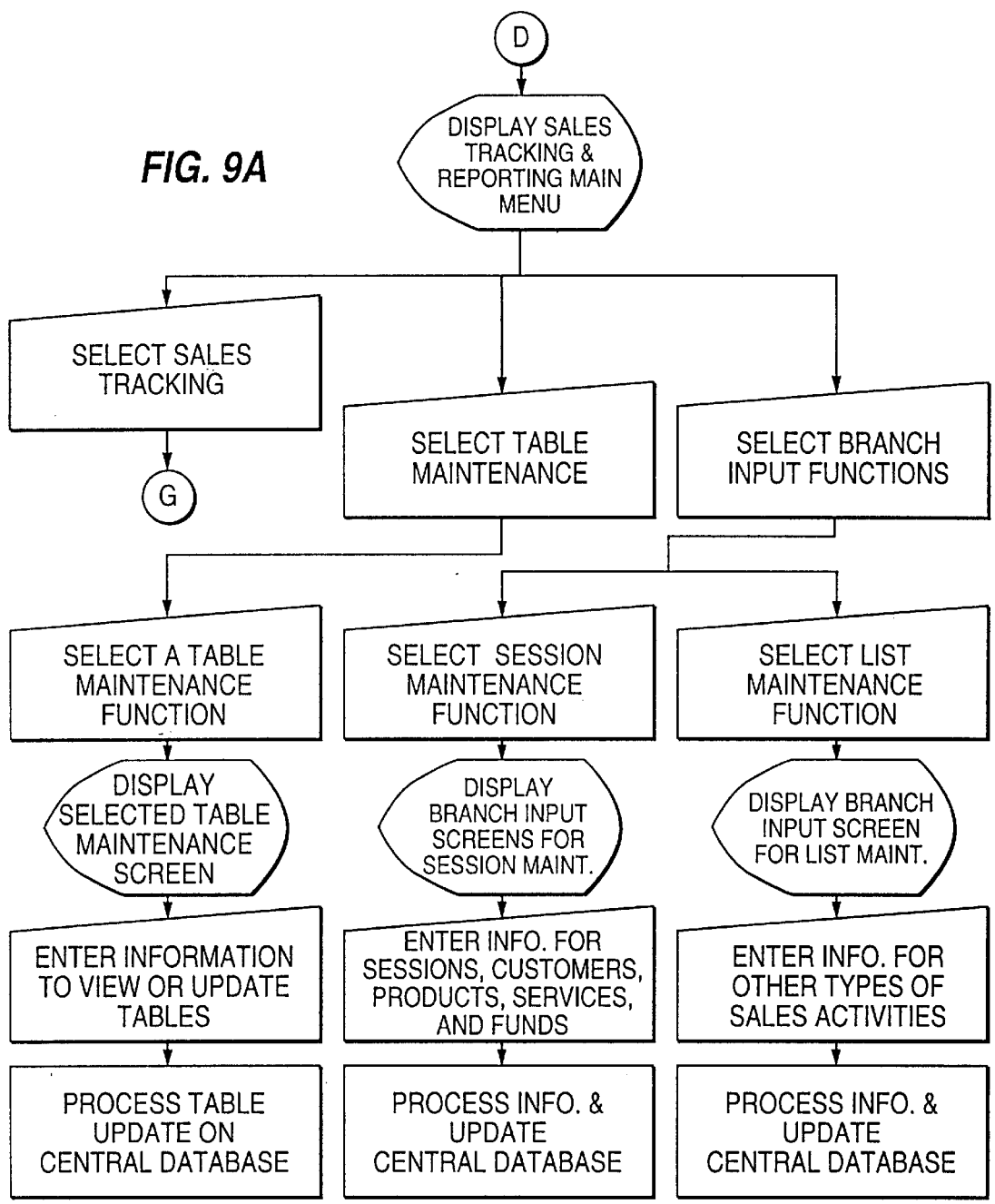
FIGS. 9A–9B are flow charts showing process steps for a sales tracking and reporting function using the central customer information system.

Referring to FIG. 9A, the sales tracking and reporting component includes three functional sections: "sales tracking" for creating reports; "table maintenance" for viewing or updating tables; and "branch input" functions for adding sessions, correcting sessions, and inputting information for other types of sales activities.

Figure 9B:
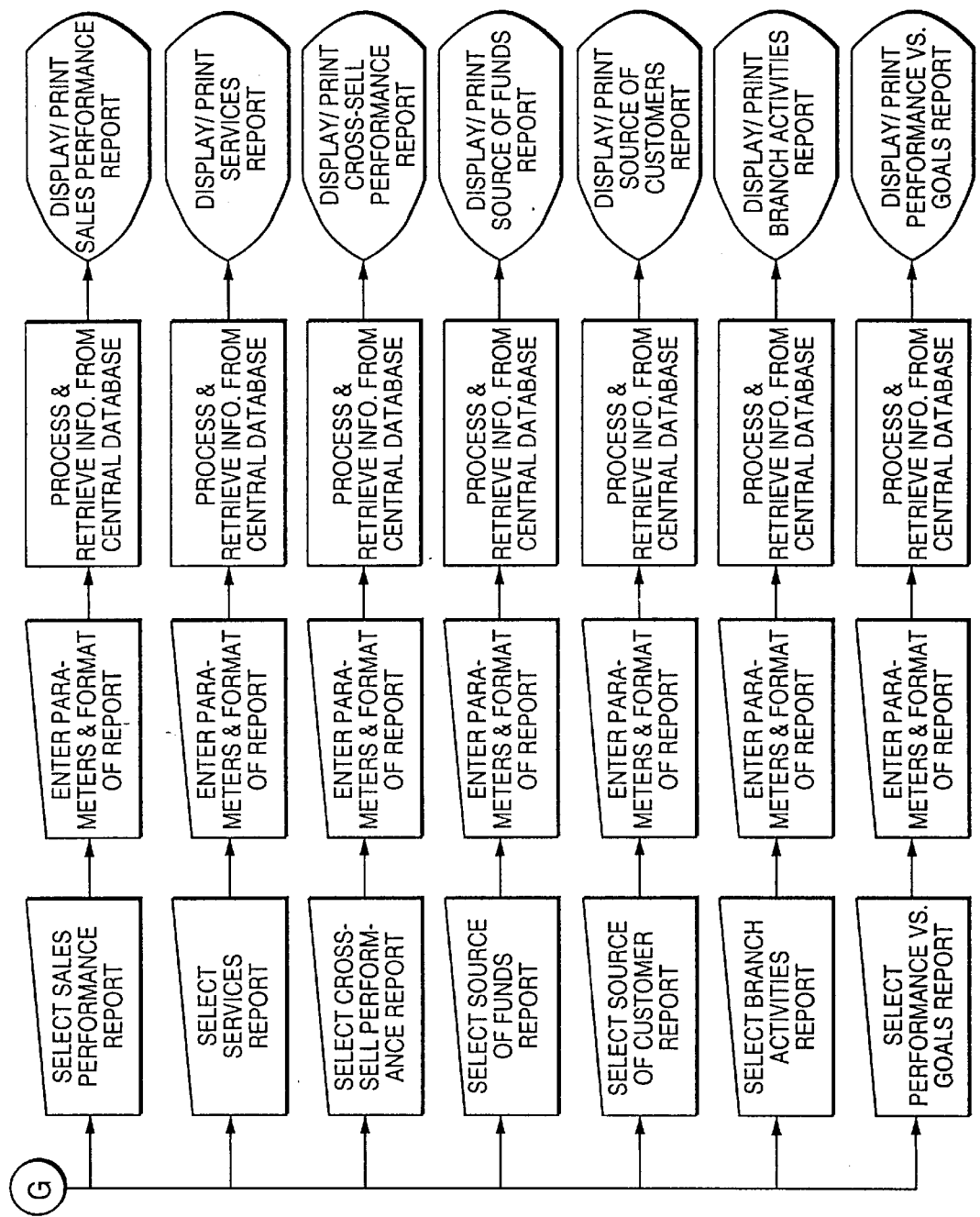

As shown in FIG. 9B, the sales tracking function includes several preformatted reports for displaying detailed sales information using information stored in the central database 10. A sales performance report shows sales by number of accounts and by new and existing dollars in liability, asset, and investment products. This report also provides consolidated reports for lists of branches and personal bankers.

A services report shows sales of such banking services as direct access, enhanced telephone, and checks as cash. A cross-sell performance report shows the number of products sold per session to new and existing customers. A source of funds report shows whether accounts are being funded from other competing banks, investment companies, and specific types of accounts. A source of customers report shows campaign and advertising impacts. A branch activities report shows branch activities entered through the sales tracking and reporting component. A performance versus goals report indicates whether a particular branch or personal banker is meeting the goals set by the campaign management.

Referring again to FIG. 9A, the session and list maintenance functions of the sales tracking and reporting component provide several branch input screens. Based upon the user's security profile, the user can use the branch input screens to add, delete, or edit information about whole sessions, customers, products, services, funds, or other types of sales activities. The input information is then processed and updated on the central database 10 and is available for review using the sales tracking and reporting function.

The sales tracking and reporting component preferably is used to provide objective indicators to drive employee compensation. For example, the sales tracking component provides an indication of the amount of revenue generated for the financial institution by each personal banker and branch manager. This, in turn, provides a direct indication of the value of the personal banker or branch manager to the financial institution. The client server technology of the sales tracking provides fast, time-stamped data extracts from the customer database.

When used in connection with a branch that uses a greeter station or some other way of tracking customer arrivals as described below, the sales tracking or management information component of the CCIS of the present invention preferably includes means for tracking and reporting the numbering of customer arrivals retrieved from greeter queue or the number of times a sales planning profile was performed by type (mail, phone, in person). The sales tracking or management information component of the CCIS can also include means for tracking and reporting the average session times that did not result in an account opening or the number of times that the sales planning profile screen in accessed.

The sales tracking or management information component can generate a variety of additional reports when used in connection with a branch that uses a greeter station or some other way of tracking customer arrivals. For example, the system can track and report information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

When a greeter station or some other way of tracking customer arrivals is provided, the sales tracking or management information component of the CCIS can also track and report information pertaining to instances in which the customer abandons the wait queue, this includes the following information: arrival type; arrival time; total wait time; expected wait time; customer name; customer address and purpose of visit.

The sales tracking or management information component can also track and report information pertaining to instances in which fee waivers are given to customers during account opening. Such reports include the following information: customer name; account number; account type; fee waiver reason; sales rep ID.

The sales tracking or management information component can also track and report information pertaining to instances in which exceptions to the loan & liability rate guide lines are given to customers during account opening. Such reports include the following information: customer name; account number; account type; guideline pricing rate; exception pricing rate; exception reason and sales rep ID.

Customer Scoring and Contact Strategies

A comprehensive, customized lifetime value (LTV) score is determined for each customer using the information contained on the central database 10. The LTV score is calculated based upon the total profits contributed by the customer over the entire spectrum of products and services used by the customer. The profits from all of the products and services are grouped together to provide an indication of the total value of the customer to the bank. The LTV score is then converted into a selectable feature on each customer record, so marketing and servicing programs can be designed around lifetime values. For example, a campaign for certain bank products or services could be limited to customers with a lifetime value exceeding a predetermined amount.

In addition, a dynamic, updated customer net revenue score is generated for indicating the current value of the individual profitability of the customer. This score can be used to compare business financials, to select candidates for marketing/branch programs, and to identify prime or marginal customer contributions.

A number of contact strategy models are preferably used in the present invention to identify and target sales leads that are the best candidates for each sales campaign. These models are based on the customers' propensity to behave in certain ways. For example, customers meeting certain criteria, such as owning a home, having kids, financing college education and having low deposits or investments, have a higher likelihood of using credit products. The contact strategy models allow targeted leads to be generated in the micromarketing center 11 that increase the success rate for customer contacts by sales personnel using the CCIS 13.

A name/address standardization component provides a systematic approach to selecting "prime" names and addresses from among possible customer names and addresses in the database, and standardizing them to make the most mailable names and addresses. By standardizing the names and addresses, it is possible to enhance list generation from an end-user's desktop.

A distance from branch component provides a customized systems method of choosing the three branch locations nearest to a given address, taking into account geographical features like rivers, and so forth. This feature enables the three banks or branches nearest the address to use targeted marketing programs utilizing radius marketing techniques.

ACCOUNT OPENING SYSTEM AND PROCESS

Another important aspect of the present invention is interface of the electronic sales and service support system and process with a system and method for opening a single account that includes a full range of financial components. Thus, the integrated system of the present invention also preferably includes a system 17 for opening an account, preferably in a single session. The system is preferably in communication with the central database, micromarketing centers, central customer information systems and branch systems of the present invention so that data can pass between these systems where legal and appropriate.

In its preferred form, the system 17 and process for one-step account or relationship opening includes several general steps or stages. These are: account selection, needs assessment, building a personal profile, building the customer account, selecting customer services, enrolling the customer in remote access services, printing an enrollment form, issuing a bankcard, determining the identity and number of persons having access to an account and finally, suitable follow-ups.

The means for accomplishing these steps include a specially programmed general purpose computer, a modem, a printer and a card embosser. The computer is programmed to provide a variety of integrated accounts that are effectively (but not actually) "hard wired" to one another rather than linked on an ad hoc basis. More generally, the system includes means for collecting data concerning a customer's financial and/or investment situation, means for performing a needs analysis based on the data collected, means for displaying account information, means for making recommendations based on the needs assessment, means for inputting a customer's component selection, means for displaying a facsimile or representation of a customer's bank statement, means for adding account components to build a single account that provides all the services desired by the customer and best satisfies the customer's needs, means for updating the display of facsimile representation of a customer's bank statement, means for performing a credit check, means for determining a single fee based on services provided, means for enrolling a customer in remote access services including means for issuing a bank card and personal identification code; means for identifying missing data and means for prompting the user to enter data that has not been provided.

Figure 10A:
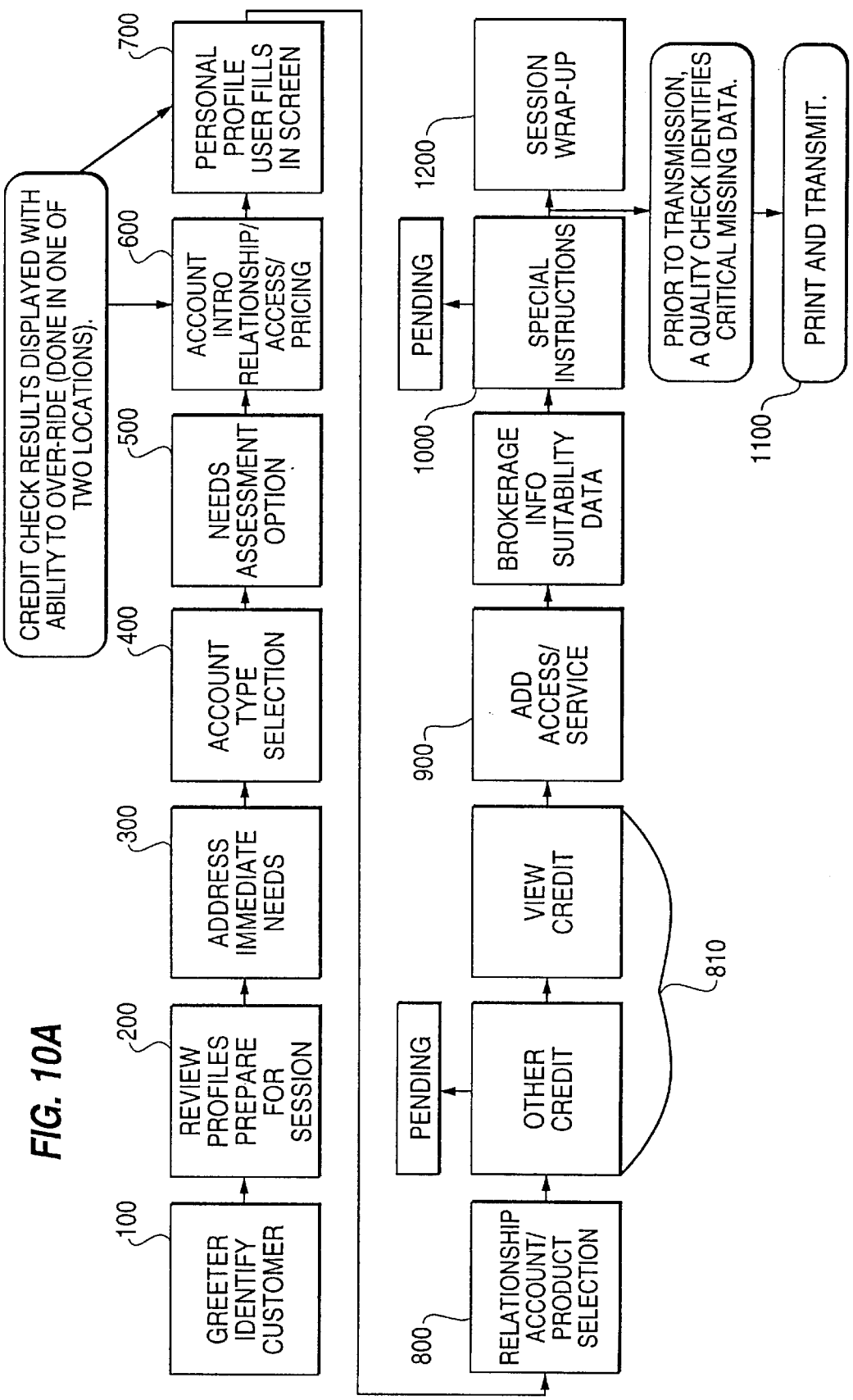
FIG. 10A is a block diagram showing the steps in a preferred embodiment of a method of opening an account with a new customer in the integrated financial system of the present invention.

FIGS. 10A and 10B show one currently preferred sequence of the account opening process of the present invention at a high level. Specifically, FIG. 10A shows the process for a new customer and FIG. 10B shows the process for an existing customer. The processes are naturally quite similar. The differences reflect the fact that the bank already has basic information concerning existing customers and the fact that existing customers typically have some familiarity with the services and access devices offered by the bank. In a more general sense, the differences in the process steps reflect the difference between account creation and account conversion. As explained below, the sequence of the particular steps can vary without departing from the central objective, namely one step account opening. The preferred embodiment of the system for performing the steps of FIGS. 10A–10B is detailed in flow charts shown in FIGS. 11A–17B.

CUSTOMER IDENTIFICATION (GREETER) SYSTEM AND STEP (100)

An optional, but useful step in the method of one step relationship opening is an initial screening step that is sometimes referred to as the greeter step. The purpose of this step is to gather preliminary customer information and ascertain the purpose of the customer's visit.

Upon contacting the bank, typically by entering a branch, a customer is greeted and entered into a queue. This initial greeting step is useful for identifying new customers. For a new customer, name, address, and purpose of visit will be requested. For existing customers, the customer is identified in several different ways: by account number, name (either alone or with address and zip code), social security number, and bankcard, either by entry of the number or by bankcard dip and personal identification code (PIC) entry. The system includes means such as a specially programmed general purpose computer or workstation and an input device (such as a keyboard, card reader, mouse or touch screen) that allows the user to input data obtained from the customer.

The greeter then creates (in the case of a new customer) or calls up (in the case of an existing customer) a profile that allows the (the teller or personal banker) to know as much about the customer as is available; including, but not limited to, information on credit cards, mortgages, tax shelters, etc. The system of the present invention preferably allows different levels of access depending on the needs of the user and desired customer flow. For example, a greeter or teller typically has limited access because the bank would like them to complete transactions as quickly as possible. A personal banker, on the other hand, generally spends more time with the customer and should therefore have greater access. If a preliminary identification profile is not captured by a greeter, the system will prompt the next user to capture the preliminary profile before doing a credit check. Thus, the system allows this initial information to be gathered at one of two steps. Specifically, the system of the present invention is programmed to permit data input in connection with one step to flow up or down into others (and preferably all) relevant data fields for use in other, and preferably all steps.

The initial greeting step 100, though not a necessary step in the system of the present invention, is helpful in achieving the objective of making the process as easy as possible for the customer by not asking for information that the customer has already provided. The greeter can also determine the purpose of the customer's visit, redirect the customer to access alternatives and, when feasible, fulfill immediate needs. The initial greeter step also makes it possible for the next user to prepare for the customer as discussed below.

When the account opening system and process is used as part of the integrated system of the present invention, the greeter step is particularly important. In particular, aside from the aforementioned advantages, the greeter step provides useful information concerning customers and potential customers that enter a branch and make it possible to determine, among other things, how long a customer waits in line, how frequently a customer visits a particular branch. This is useful to the management information system components of the CCIS of the present invention, as described above.

REVIEW PROFILE SYSTEM AND STEP (200)

Before meeting with the customer, the user (personal banker) should review the customer profile to prepare for the sales conversation. The system preferably includes a general purpose computer and/or networked work stations for this purpose. The computers or workstations should, of course, include some type of display. The principal objective of the profile review is to prepare for a sales session with the customer. Again, where legal and appropriate, additional information obtained from the central database, for example, could be used during this step.

ADDRESS IMMEDIATE NEEDS SYSTEM AND STEP (300)

Customers sometimes come into contact with consumer banks for a very specific and simple reason that can be handled quickly and does not require close personal assistance. Examples include purchasing a certificate of deposit or U.S. Savings Bond. In such cases, the customer should be serviced as soon as possible. The system permits this by prompting the user to determine if the customer is interested in a simple transaction that can and should be handled immediately. For this step, the system includes a programmed general purpose computer or workstation with a display or other device for prompting the user.

ACCOUNT TYPE SELECTION SYSTEM AND STEP (400)

After the customer is greeted and immediate needs are taken care of, the customer is greeted by the next user (normally a personal banker) (if this wasn't done in Address Immediate Needs), and the customer profile continues on the same system. There will be some basic questions that the personal banker (also the user) can ask the customer to determine, in a general sense, the customer's financial needs and how to best help the customer. Specifically, the type of account the customer needs is determined (assuming the bank offers more than one class of account). The account opening flow is flexible enough to support a customer interested in opening one piece of an account, such as a certificate of deposit in a short amount of time, as well as a customer willing to spend a longer time discussing their financial needs and opening the various components of an integrated account that best suit them. To facilitate this step, the system includes a general purpose computer or workstation programmed to prompt the user to provide certain data, receive the data and send the data to all relevant fields. Again, the system also includes a suitable input device to allow the user to interact with the computer.

The discussion with the customer will also give the user (typically a personal banker or consumer bank telephone service center representative) a sense of the components within the integrated bank account of the present invention that the customer is explicitly interested in and the components that the user will need to sell to the customer. The system has flexibility to address the vast differences in customer interactions. To accommodate this need, the system is programmed to allow data to flow up and downstream to wherever it is needed and by checking at each step to see whether required data has already been received. A programmed general purpose computer is used for this purpose, but the computer operates as if the data fields for the account component were "hardwired" to one another. In this way, the data will be requested once and only once at the point in process the user finds most convenient. As discussed below, the system also provides a "pending file" for storing relevant information that is collected, but not immediately needed.

As shown in FIGS. 10A and 10B, the process after the account type selection step is slightly different for new customers and existing customers. Specifically, the process for a new customer presents each step in sequence. For existing customers, however, the user may elect to bypass either the account introduction or needs assessment step entirely. Again, this allows the user (personal banker) to exercise her or his judgement. For both processes, however, the step is essentially the same, as discussed below.

NEEDS ASSESSMENT SYSTEM AND STEP (500)

The needs assessment step is essentially a sales tool to allow the user and customer to choose the best account and account components for the particular customer's needs. A system used for the Needs Assessment step is flexible such that data can be provided in an order that is consistent with the sales expertise of the user or telephone service center rep and the expressed needs of the customer. Again, the system includes a computer programmed to accommodate this need by sending data, upstream or downstream, to all locations where it is required. In this way, the user can temporarily delay inputting critical data.

The needs assessment step involves inputting data in response to more detailed questions that identify specific customer needs and/or sales opportunities for the user. These questions will help the user customize the integrated bank account for the customer. The system is, again, programmed such that data input during this step will pass through to other relevant fields.

Figure 11A:
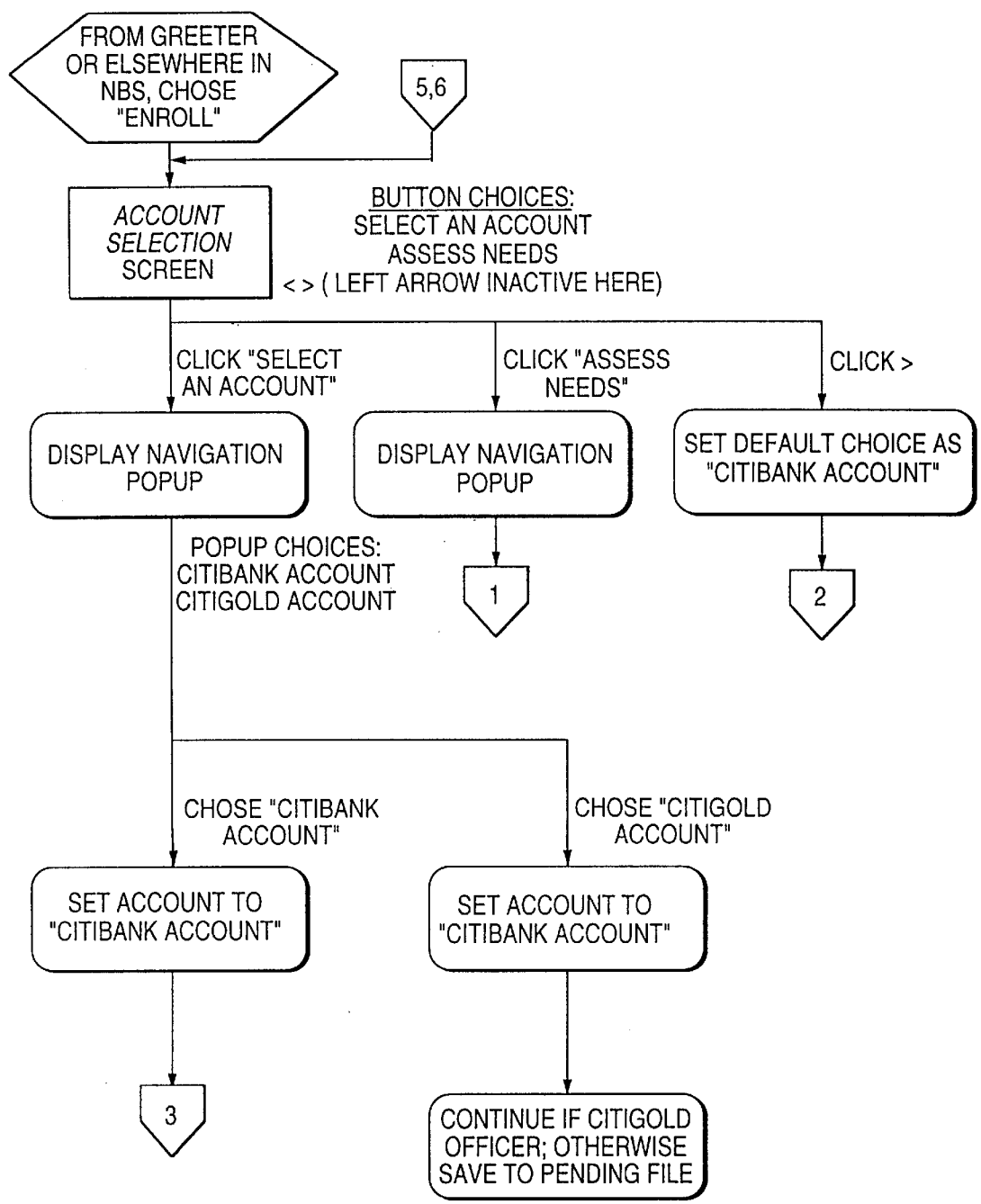
FIGS. 11A–11C are a flow chart showing the process involved in the step of account selections/needs analysis in the method shown in FIG. 10.
Figure 11B:
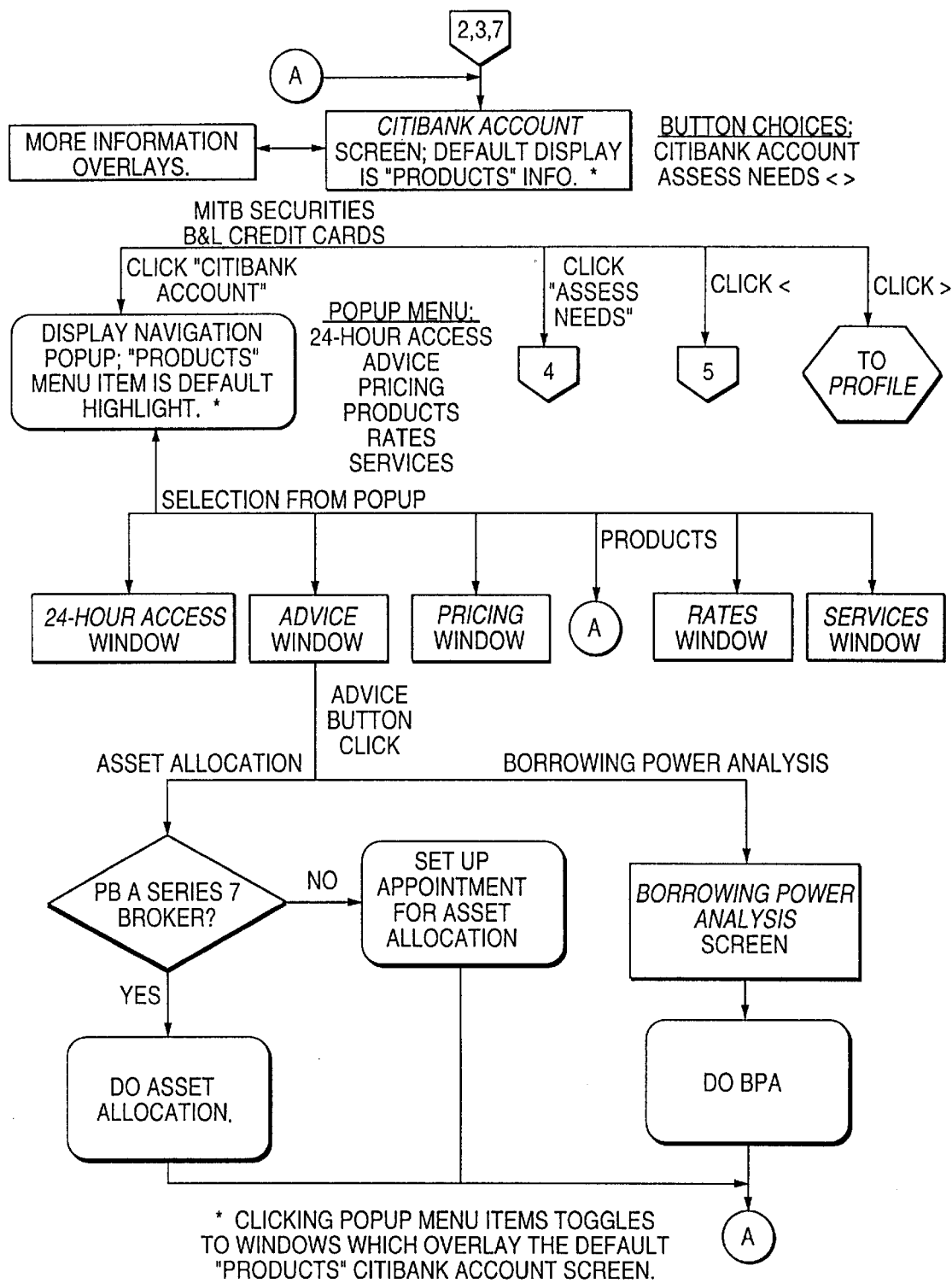
Figure 11C:
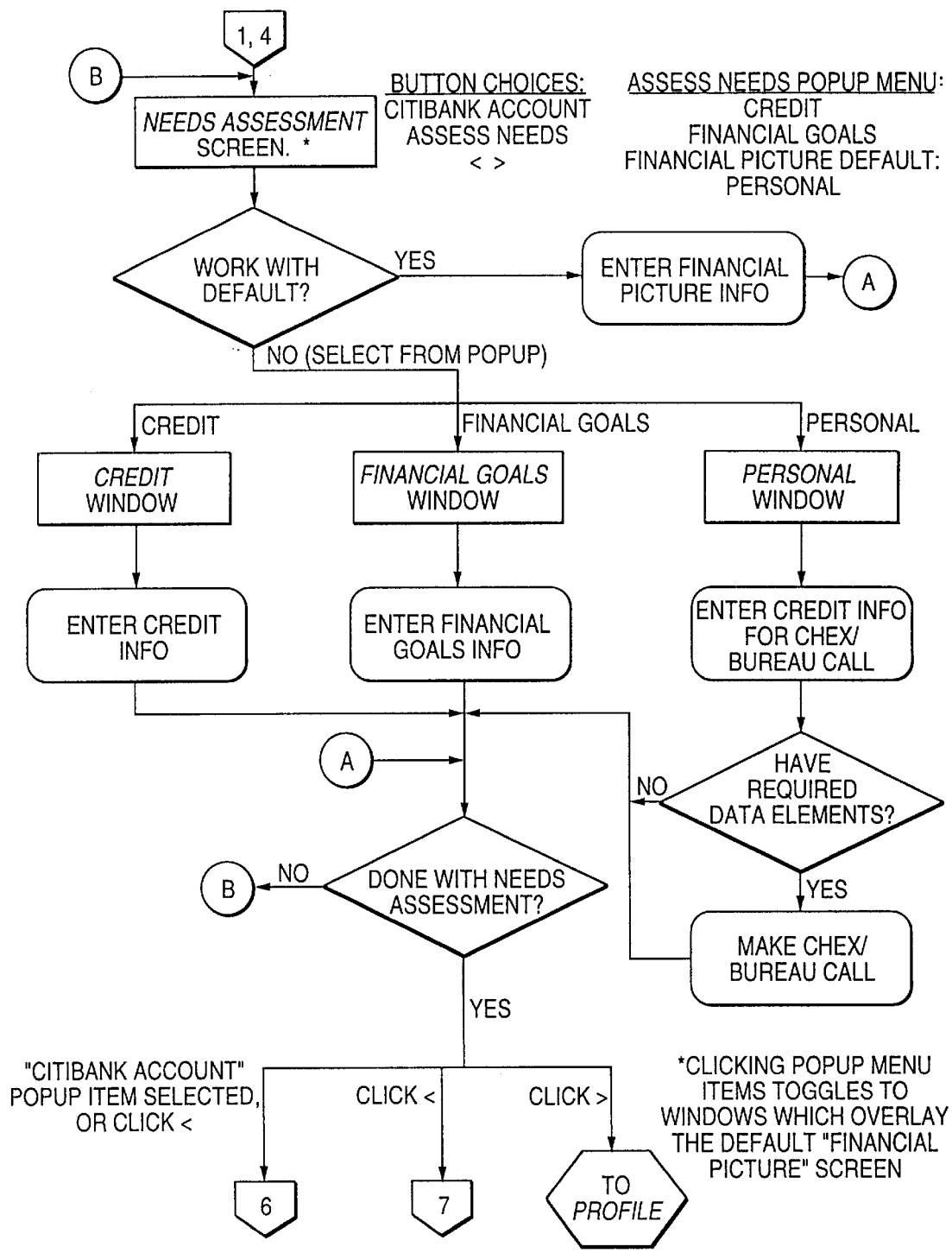

A description of one embodiment of the account selection and needs assessment steps is illustrated in FIGS. 11A–11C. The process may be easily understood by reference to the flow chart and FIGS. 11A–11C. However, several features should be noted.

As shown in FIG. 11A, once the user enters the account selection process, they are presented with a screen that provides a choice of selecting an account or assessing needs. Thus, if the customer is interested in a specific type of account, e.g., "Citibank" or "CitiGold" account, the process of needs analysis may be bypassed.

In the example illustrated in FIG. 11A, when the user chooses to "SELECT AN ACCOUNT", the user is presented with a listing of the available accounts to make a further selection. If, on the other hand, a needs analysis is desired, the user selects "ASSESS NEEDS" and the process detailed in FIG. 11C is followed. In the specific embodiment shown in FIG. 11A, a default selection of "CITIBANK ACCOUNT" can be selected as well.

FIG. 11C illustrates an example of the needs assessment account opening process of the present invention. As shown therein, after the user decides to assess needs, they are presented with a menu that allows them to select a particular area, e.g., "CREDIT", "FINANCIAL GOALS", "PERSONAL" or by default, "FINANCIAL PICTURE". Depending on the selection made at this point, the user is prompted to provide information concerning the specific area selected or, in the case of the "FINANCIAL PICTURE" selection, information concerning a variety of areas. This process continues until the needs assessment is complete.

The process for providing product information is depicted in FIGS. 11B. As shown therein, this system allows the user to provide information relating to the specific areas of concern to the customer. The process can be repeated until all questions have been answered. At that point, the user may choose to proceed to the personal profile section.

Again, flexibility is an important aspect of the system of the present invention. The user may elect not to provide certain information if in her or his judgement the customer should not be asked to provide the information at that time. Thus, data input will not be required at this step, but some record is made if this step is bypassed so that data can be collected later.

Information captured during the Needs Assessment step is eventually stored in the customer's profile along with the answers to the basic Needs Assessment questions. In this way, other users (bank employees) will be able to access customer information no matter where the customer touches the bank.

As mentioned earlier, the system of the present invention includes a "pending file" for storing information that is collected, but not immediately needed. More specifically, the system preferably includes some form of electronically retrievable storage device. Again, where legal and appropriate, additional information obtained from the central database, for example, could be used during this step.

The system can include a number of user sales tools, including a Borrowing Power Analysis that takes advantage of the data collected at this step. For example, a user will have the ability to display and print pricing information.

Other sales tools available include information concerning 24-hour access; financial advice; rates and services. The system is flexible enough to make all of these tools available while at the same time permitting the user to quickly bypass these sales tools in their entirety. To accommodate BPA pricing information and any other sales tool, the system includes a programmed general purpose computer and/or workstation.

Thus, as used in connection with the system of the present invention, the needs assessment step captures and store customer information to identify existing and future customer needs. The information is preferably passed through to account opening where applicable and legally allowed. In addition, information collected during account opening is preferably fed through the central customer information system of the present invention interface and used to close leads; assign customer's to a personal banker's portfolio; report daily arrivals; track new account statistics, etc.; assign referrals and follow-ups from pending files.

ACCOUNT INTRODUCTION SYSTEM AND STEP (600)

For new customers, this step involves an introduction to the various types of integrated accounts offered by the bank. The components available and the monthly pricing are also preferably discussed. For existing customers, this step involves an explanation of the new integrated account.

In addition, a credit check is performed once the user obtains a clear indication that the customer intends to open an account. Typically, the credit check involves two separate steps—an initial screening to see whether the customer is among a list of bad customers, e.g., a CHEX screening, and second, a standard credit bureau report. To facilitate credit checks with outside services or agencies, the system preferably includes a modem or other communication equipment.

Ordinarily, the system will conduct both steps of the credit check at the same time, and the responses will be displayed on the same screen. However, in the event one response cannot be obtained (i.e., due to system problems), the other response is displayed and should not be withheld until the other becomes available. The system has the flexibility to enter only the basics needed for the credit check, i.e., name, address, social security number, date of birth, and citizenship and optionally, employment, income, and housing costs. If this identification data has not been obtained earlier it must be captured now. The system is flexible enough to excuse existing customers from this screening process if the last credit check (which is stored) was done within the past 12 months, for example. Also, the two steps of the credit check are executed separately and the system has the ability, given proper entitlement, to override the initial screening results. If the user has been able to obtain employment, income, and housing information, the system will be able to return a specific loan amount for whichever products are part of the credit-qualified offer. The credit qualified amount, if any, will display on the same screen that displays the credit check responses.

If the customer is not liability qualified, the system allows the user (typically authorized by the credit manager) to determine if the reason can be overridden and the account opened. If the account is opened, the circumstances of the waiver/override are captured and stored with the customer's demographic information. If the account is not opened, an "adverse action type" notice must be printed in the branch or the consumer bank telephone service center showing the name and phone number of Chex and/or the credit bureau from which the information was received and provided to the customer.

The outcome of the credit check and needs assessment is a specific recommendation of an account for components that will best serve the needs of the customer. The system provides the user with sales tools such as a screen or set of screens that will allow the user to clearly demonstrate the power of the integrated account, its components and how the customer can best access their accounts.

Again, the system includes a programmed computer and suitable input means for prompting the user and collecting data to perform this step.

PERSONAL PROFILE SYSTEM AND STEP (700)

Once the account selection/needs analysis step is complete, the system proceeds to the Personal Profile Step. During this step, the user will collect any other personal information that has not yet been completed. Because of the systems flexibility, the data collected here will vary depending on what was previously collected. Again, a computer with a suitable input device is used for this purpose. A modem or other communication equipment is preferably provided to allow the computer to communicate with outside credit bureaus, for example.

In some cases, the credit check will be executed during this step if not previously executed. Following personal information, any employment information that has not yet been collected will be completed. There will be one screen (per signer on the account) to capture personal information and one screen (again, per signer) to capture employment information. Information included on the employment screen will be name and address of current and previous employer, time at current and previous employer, occupation selector) from a pick list of catalogues. A field to input the method of employment verification, if performed, will be provided on this screen and, if input, will be transmitted to the credit bureau with the application so that the verification will not have to be performed when reviewing the credit decision.

The system for account opening according to the present invention will also enable the user to capture the customer language of preference for later use and enhancements such as inclusion in the magnetic stripe on bankcards. If the customer is a non-resident alien, for example, the account will be flagged so that this fact and the language of preference will be displayed on the customer profile for subsequent servicing.

Figure 12A:
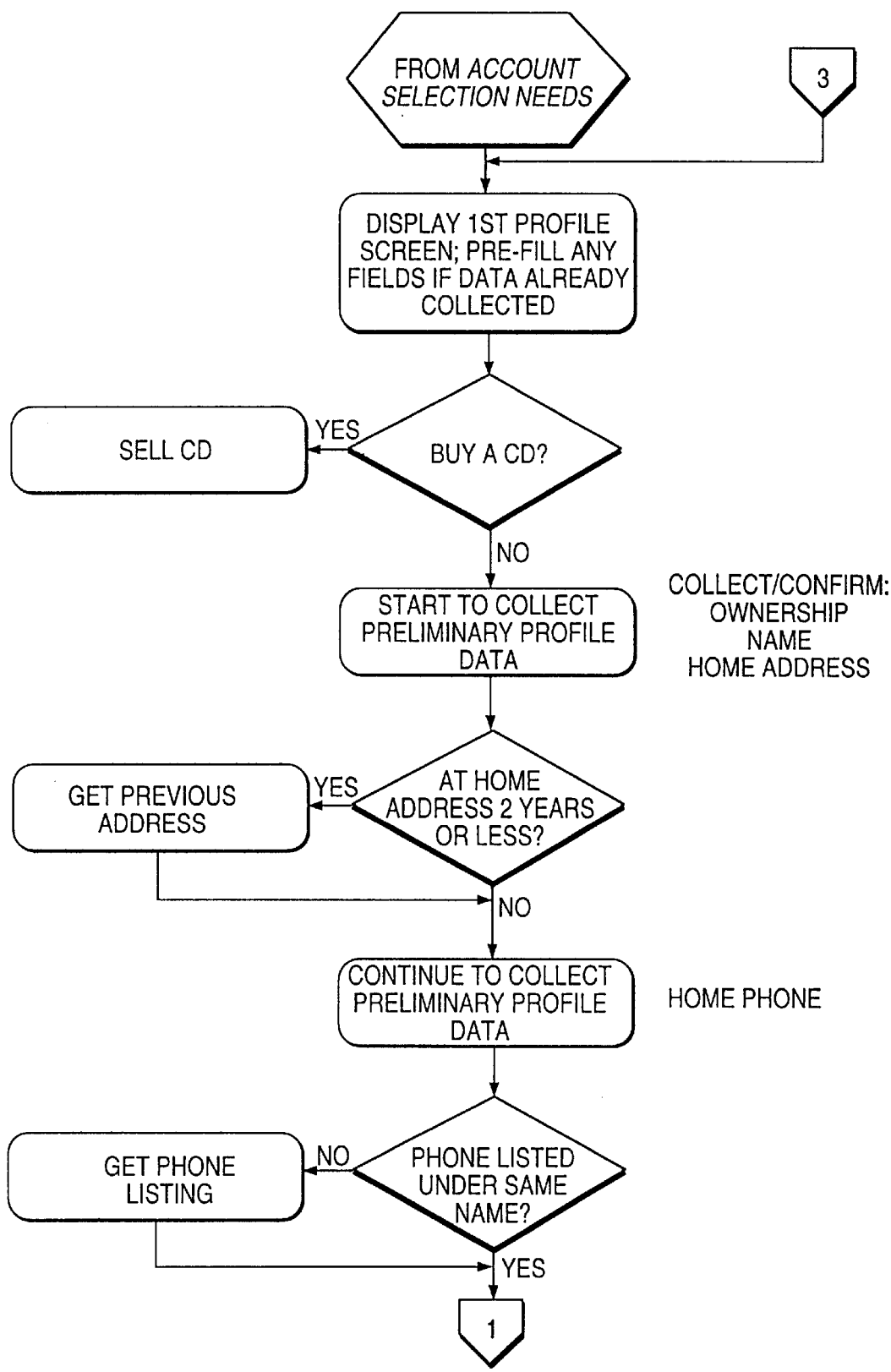
FIGS. 12A–12E are a flow chart showing the preferred embodiment of the process step of building a personal profile in the method illustrated in FIG. 10.
Figure 12B:
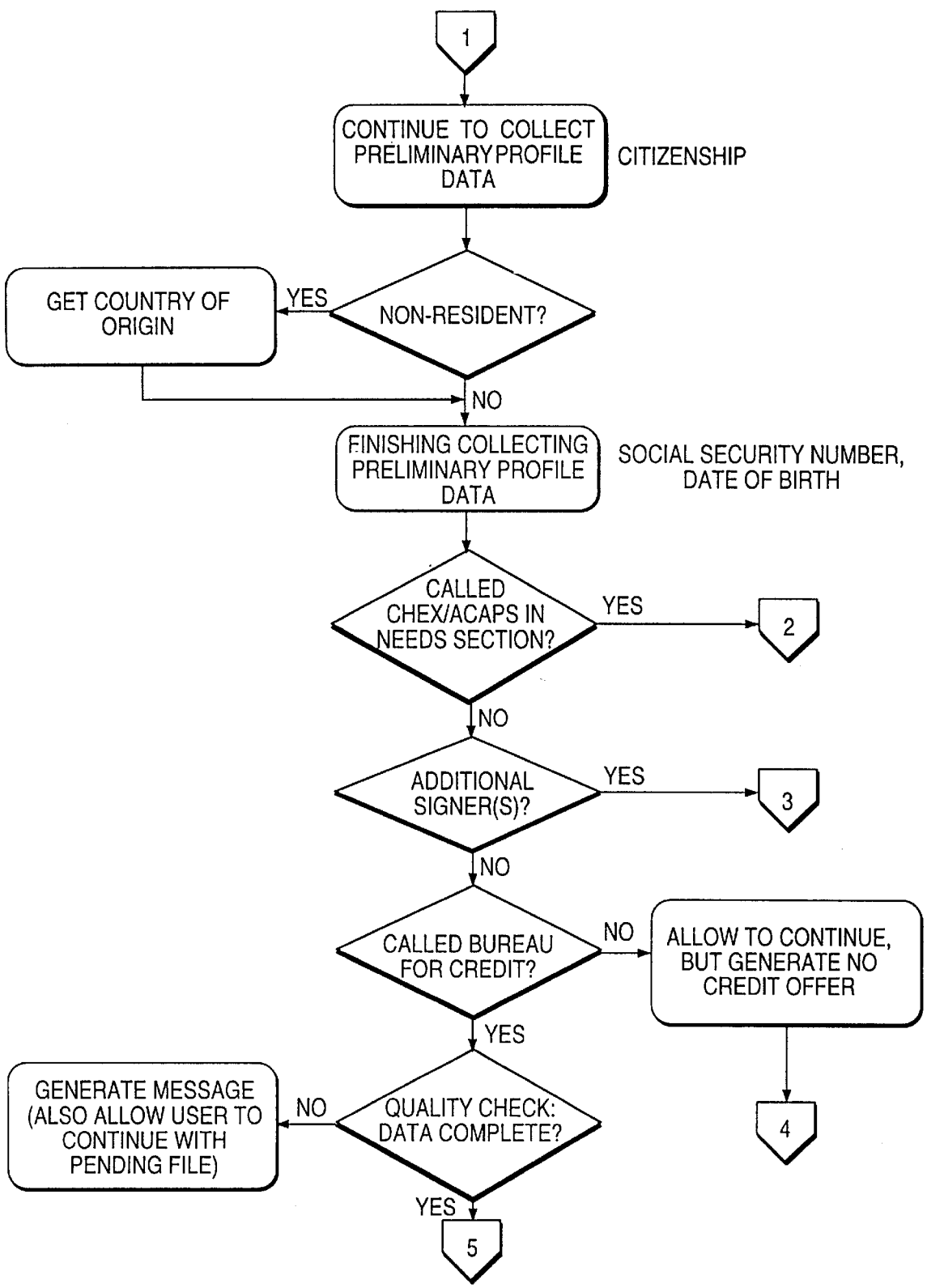

A preferred embodiment of the system and method for performing the personal profile process step is illustrated in the flow chart of FIGS. 12A–12E. Again, this process begins once the account selection/needs assessment step is complete. As shown in FIG. 12A, the process involves collecting identification and information such as ownership of the account, the name of the customer, the home address and phone number, citizenship, social security number and date of birth. The system includes a programmed general purpose computer and/or work station with suitable input means to facilitate this step. Again, where legal and appropriate, additional information obtained from the central database, for example, could be used during this step.

As shown in FIG. 12A, the system generates and displays to the user an initial profile screen showing the fields of data needed with any data that has already been collected in the field. Thus, consistent with the objectives of this invention, the customer need not provide this information again.

After preliminary profile data is collected, the system determines whether a credit check has already been conducted in the previous step. If so, the system moves to the process flow shown in FIG. 12D to continue building the personal profile. If the credit bureau has not already been called the system inquires as to whether there will be additional signers on the account. If so, then the process reverts to the flow shown in FIG. 12A until preliminary profile data is collected for each of the additional signers.

After preliminary profile data is collected for each signer a determination is made as to whether to call the credit bureau. If the credit bureau is not called, the process may continue, but no credit offer may be made. If a determination is made to call the credit bureau then a quality check is made to determine whether the data is complete. If not, an error message is generated and the user is allowed to continue with the pending file. If all data is complete then the process continues to the flow shown on FIG. 12C.

Figure 12C:
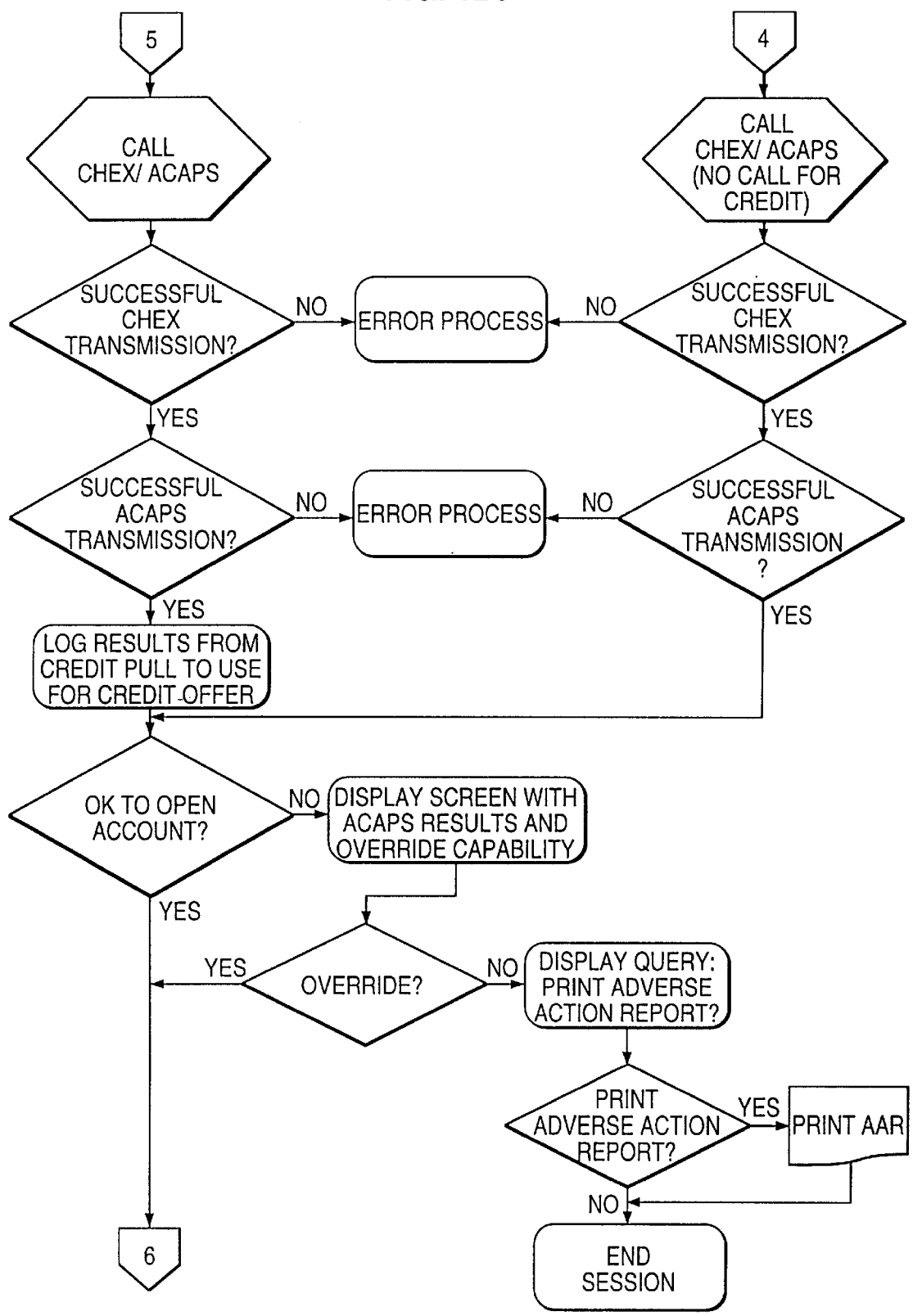

As shown in FIG. 12C, this part of the process flow begins with a call to the credit bureau. A programmed computer and communications equipment such as a modem is used for this purpose. The system checks to see whether transmission of information to the credit bureau. In the preferred embodiment, a two-step credit check is performed as discussed.

Figure 12D:
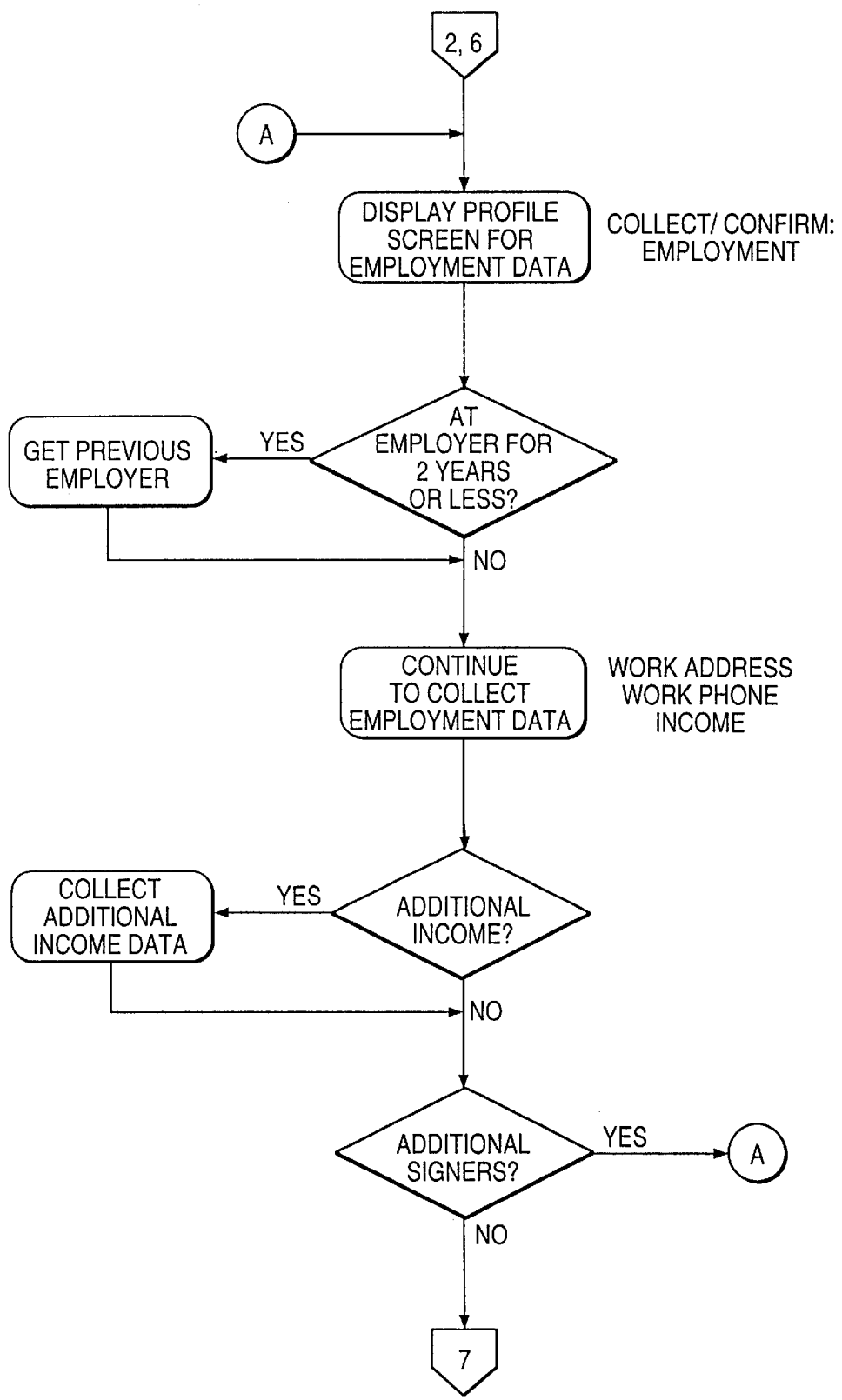

Based on the results of the credit bureau report, a determination is made as to whether the account is approved. If the account is approved, then the process flow continues as shown on FIG. 12D. If a negative determination is made, then a screen is displayed with the results of the credit report giving the user, a bank employee, override capability. If the user chooses to override the refusal then the process continues as shown in FIG. 12D. If, on the other hand, the negative decision is not overridden, the user is given an option to print an adverse action report and the session ends.

Figure 12E:
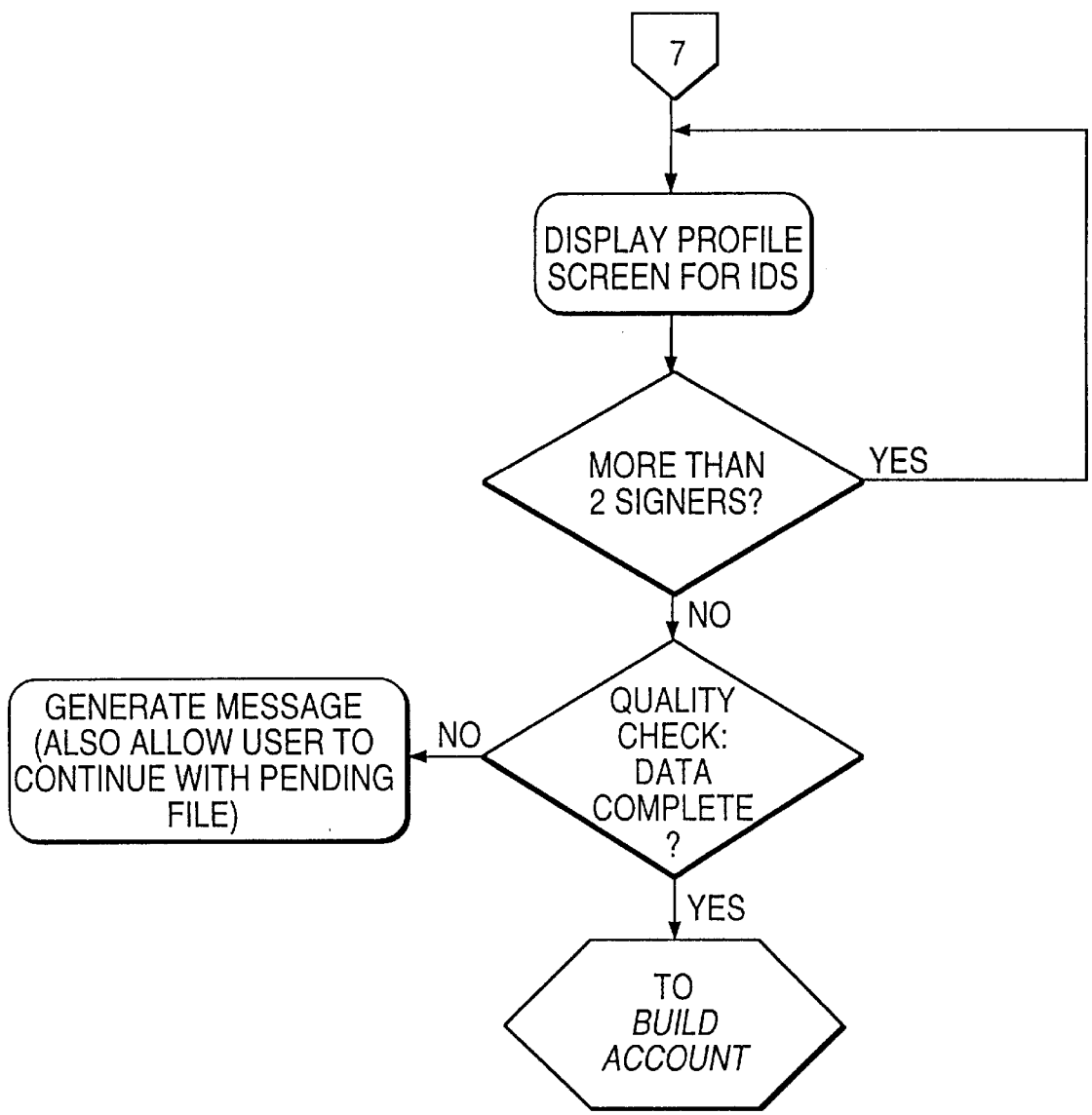

FIG. 12D shows the continuation of the process in the case where the customer's application for account has been approved. As shown therein the process begins by prompting the user to input data concerning employment. If the customer has been with the employer for two years or less information concerning the previous employer is obtained. The system continues by prompting for information concerning work address, work phone and income. If the user wishes to rely on additional sources of income, then that additional income data is collected. The process is repeated for each signer in the account. Once the data has been collected for all signers, the process continues as shown in FIG. 12E.

The process of building a personal profile concludes with a display of the profile screen for user IDs. If there are more than two signers, the process is repeated until all signers are displayed. Finally, a quality check is made to determine that complete data has been received. If complete data has not been received, a message is generated and the user is allowed to continue with the pending file. If complete data has been received, then the process continues to the next step, namely building an account.

ACCOUNT BUILDING PRODUCT SELECTION SYSTEM AND STEP (800) (INCLUDING CREDIT DECISION 800 (810))

Figure 18A:

Another particularly important aspect of the present invention is the means and process of building the account. In particular, the present invention provides a visual interface that allows the user and customer to watch the account as it is being built. FIGS. 18A–18C show an example of the visual display used in the account building process.

As shown in FIG. 18A, the system displays account information on a computer screen in a bank statement motif, i.e., a facsimile or representation of a bank statement is displayed. The use of the bank statement motif for the account building display is an important part of this invention and is in accord with the underlying objective of presenting a consistent interface to customers. The display shows what the customers bank statement looks like before the account is built. Core components such as checking, savings, IMMA, CD's, retirement, brokerage, line of credit and credit card are included in the example. Naturally, the displayed statement reflects zero balances for each account. When other components are added to the account as discussed below, they also appear on the displayed statement.

To build the account, the user selects (by input device) one of the listed components. If, for example, the "checking" component is selected, the system displays a checking component build screen of the type shown in FIG. 18B. The screen allows the user to select a particular component and enter the amount to be credited to the selected component. In the example shown, the user has selected the regular checking component. The system also prompts the user to enter an amount to be allocated to the checking component that has been selected.

If, for example, the customer chooses to allocate $5,000 to checking, the user enters this amount and returns to the displayed statement screen.

As shown in FIG. 18C, the displayed statement is then updated to reflect a checking balance of $5,000.

In this way, the customer and user can build the integrated account to the customer's specifications and watch the account being built in a step-by-step fashion. In addition, the information is presented in a bank statement format that is consistent with all other customer access points for interfacing with the bank.

Once the components of the bank account the customer intends to fund during the session have been determined, the user will select functions on the account opening screen. To begin with, the user will select any products that will be opened in the session. At this point, the system will automatically assign the component number for the liability components in the consumer bank account. The automatically assigned number may be overridden if necessary.

Next, the user will complete any necessary details such as term, initial deposit, and interest rates. Then, the user will enter the account title and any other account specific data needed (for example, number of signers required if other than the default of one). A preferred embodiment of the system for building the account is shown in FIGS. 13A–13M. The system includes a programmed general purpose computer to facilitate those steps.

Figure 13A:
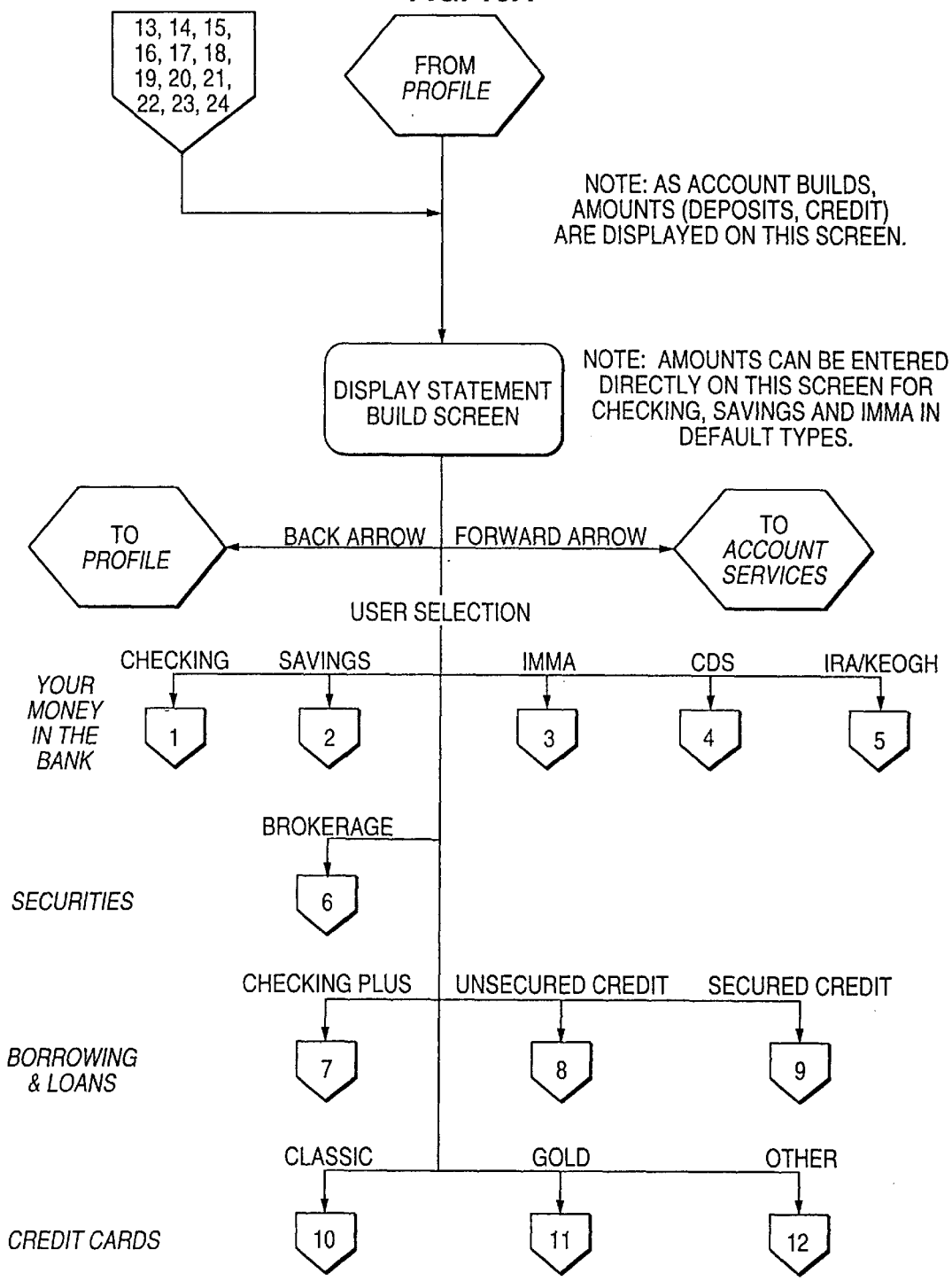

As shown in FIG. 13A, the system begins the account building process by displaying a statement build screen. Preferably, this display provides the user with the opportunity to select each of the components of the integrated account. In the embodiment shown, the user may select between twelve components. As components are selected in the account and the account builds, the amounts (deposits, credit) are displayed on the statement build screen of the type shown in FIGS. 18A and 18C, for example.

Typically, the amount for each component and relevant information concerning that component is provided by selecting the component and following the process for building that component. In the preferred embodiment shown in FIG. 13A, however, amounts can be entered directly on the statement building screen for checking, savings and ensured money market accounts if desired.

As shown in FIG. 13A, the system consistently provides the user with the option to return to the previous step, i.e., building a personal profile or move forward to the next step i.e., account services. Absent one of these selections, the portion of the system shown in FIG. 13A operates in a loop whereby the customer selects a particular component and proceeds through the prescribed process for that component as shown in FIGS. 13B–13M and then returns to the statement building screen, which is progressively updated to include the components as they are built.

Figure 13B:
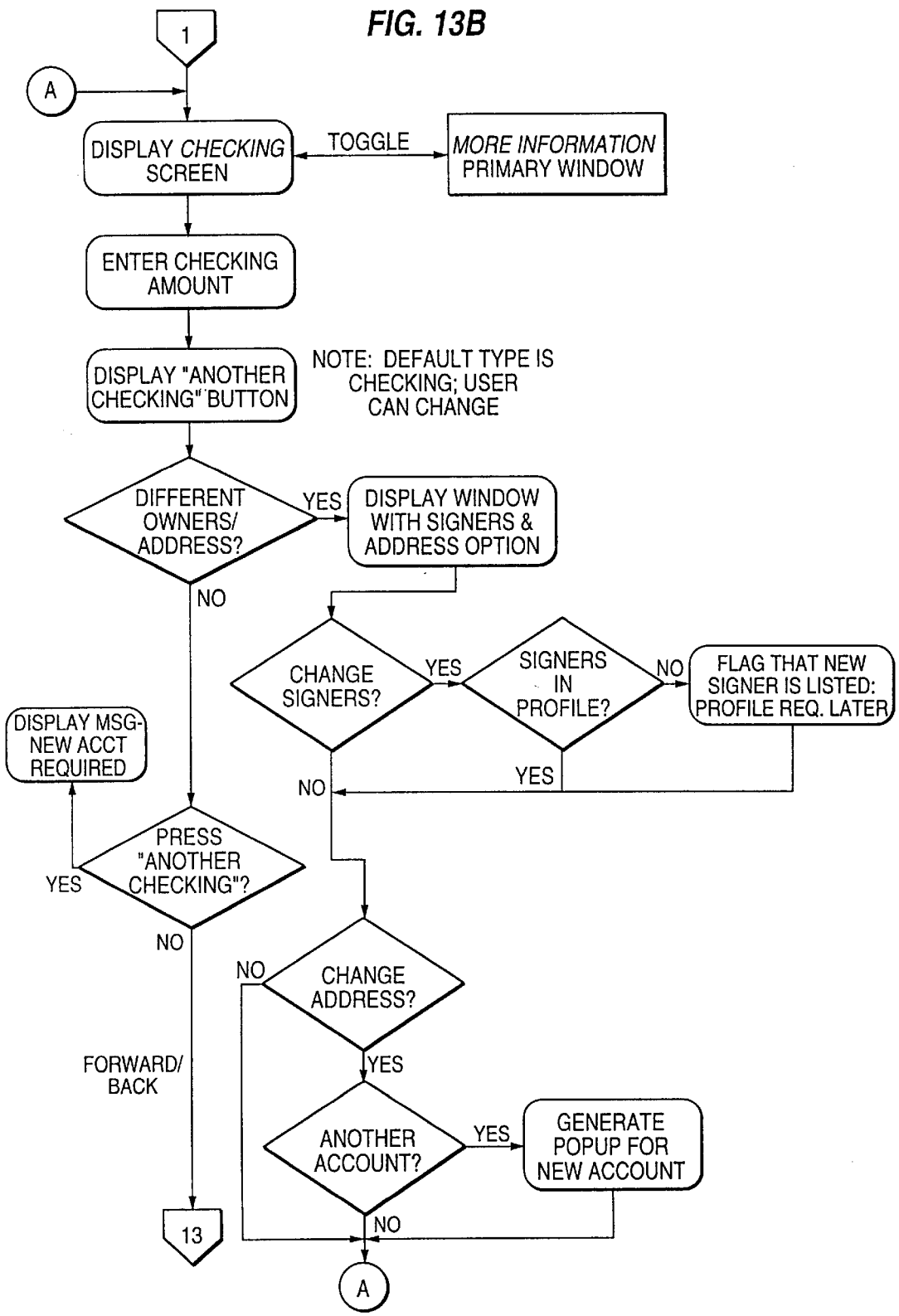

If the user selects a checking component the system follows the path shown in FIG. 13B. Specifically, the system displays a checking component screen or screens. The user then enters the amount to be allocated to checking. The system then inquires as to whether there will be different owners or different addresses for the checking component. If so, the system then enters a subroutine to obtain the additional information concerning different signers and/or changes in address. Again, an important aspect of the present invention is that the user is initially presented with a display showing all salient information that has been collected thus far. Thus, even in the subroutine, it is only necessary for the customer and user to provide information that has not previously been obtained. Once the checking component has been built to the customer's specification concerning owners and addresses, the system provides the possibility of building another checking component. If a customer elects to build an additional checking component, a message is displayed and the routine is followed again. If, on the other hand, the customer elects not to build another checking component, then the system returns to the statement building screen of FIG. 13A and the user is able to select another component.

Figure 13C:
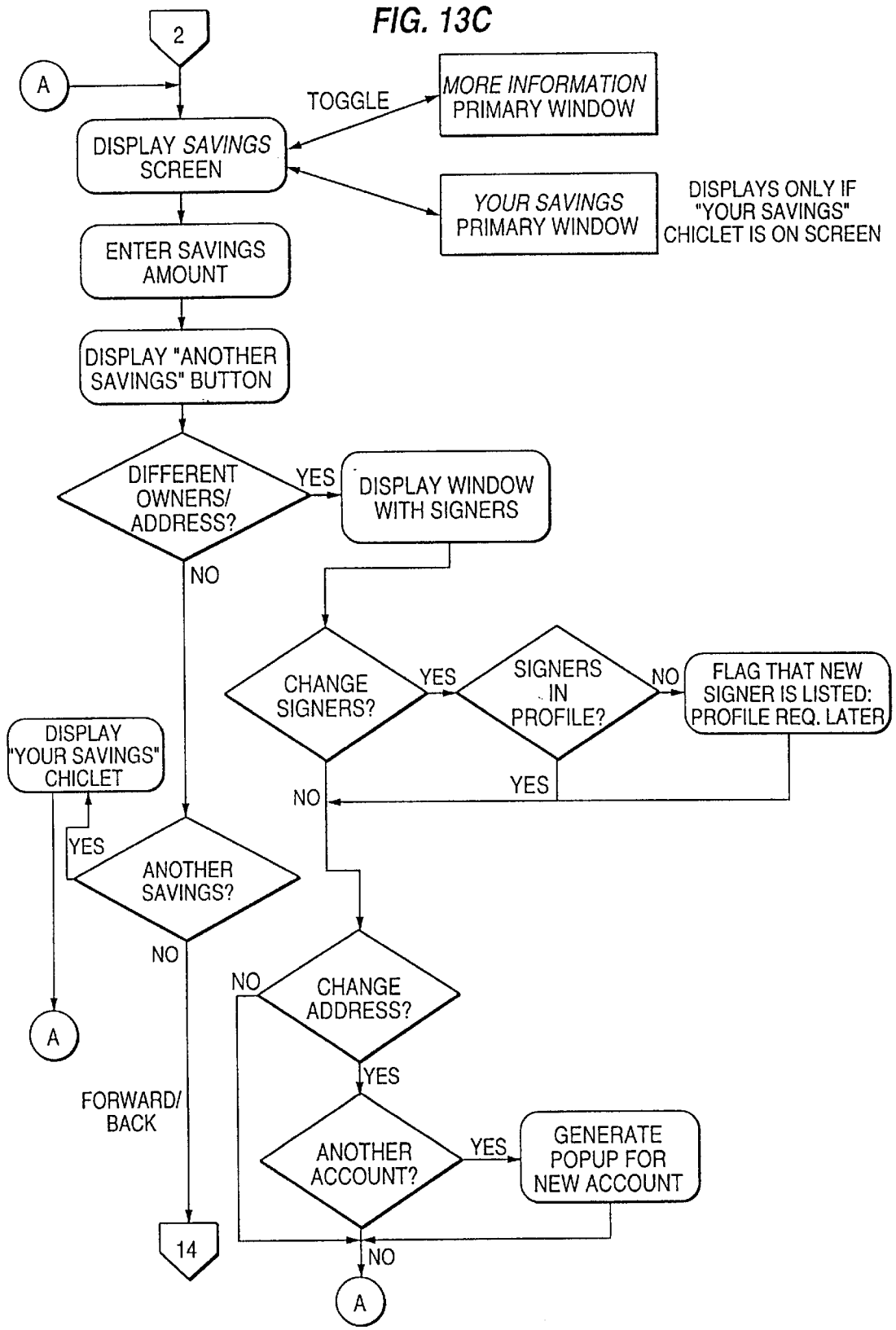

If the user selects the savings component from the statement building screen, the system follows the path shown in FIG. 13C. The process shown in FIG. 13C for building a savings component is essentially the same as the process for building a checking component. In particular, as shown in FIG. 13C, the user is prompted to enter an amount for a savings component and then allowed to provide any additional information required regarding different owners or addresses. This is, again, accomplished through the use of a subroutine. And finally the user is allowed to choose to build another savings component. When the savings component has been built to the customer's satisfaction, the system returns to the statement building screen shown in FIG. 13A.

Figure 13D:
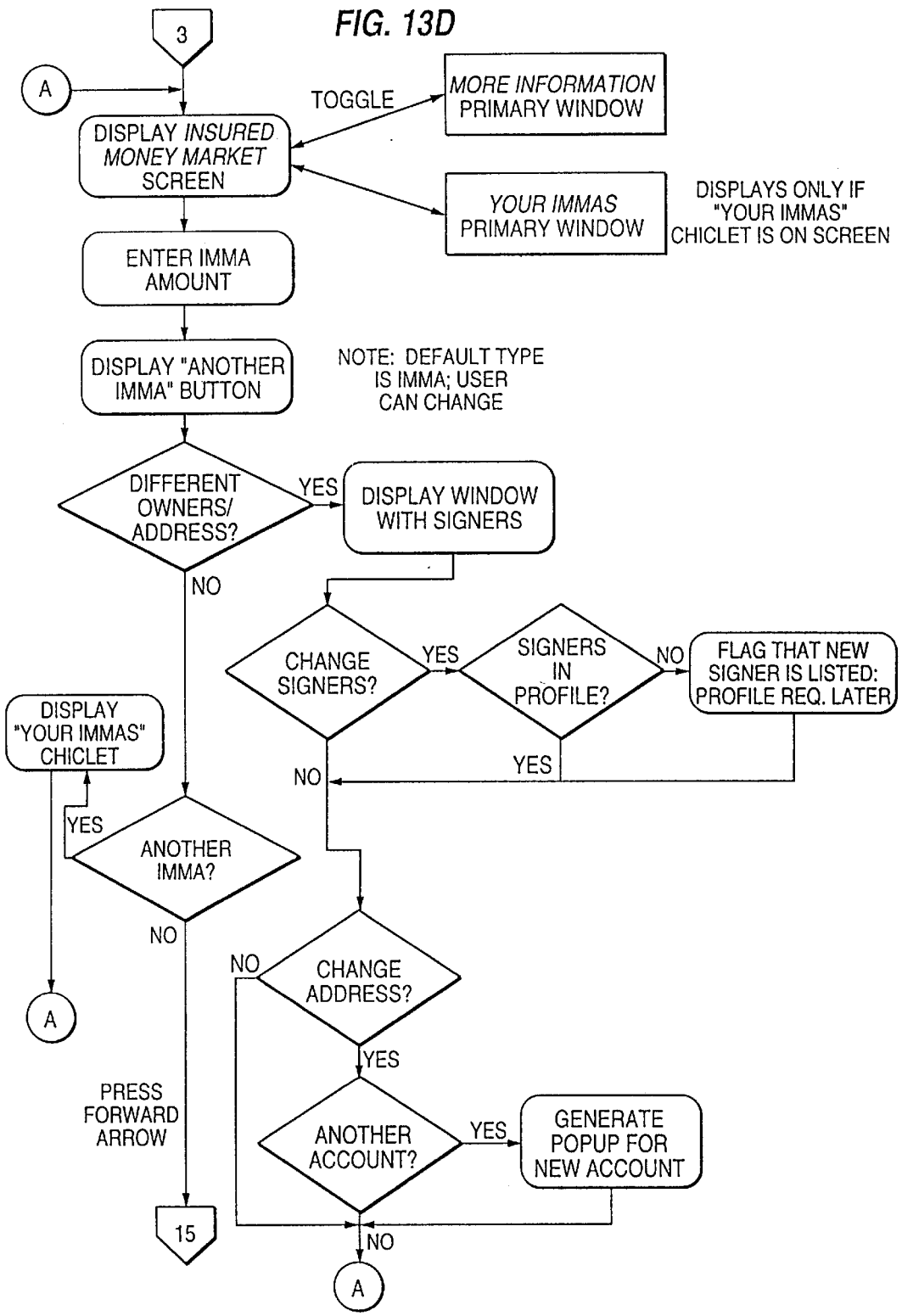

When the user selects the insured money market account IMMA) component, the process follows the flow shown in FIG. 13D. The process is again similar to that followed for building, checking and savings components. The user enters an IMMA amount and is then given the opportunity to update information concerning owners and addresses. Finally, the user is given the opportunity to build another IMMA account and, if that is desired, the process is repeated. Once all IMMA components have been built, the process returns to the statement building screen of FIG. 13A.

If the user selects a certificate of deposit component, the system follows the flow shown in FIG. 13E. Specifically, a certificate of deposit screen is displayed and the user then enters a certificate of deposit amount. The system then prompts the user to enter the certificate of deposit parameters including term, interest payment schedule and deposit instructions. The process is repeated until all parameters have been entered. Once all the parameters have been entered the system allows the user to decide upon the authorized signer for this component. This subroutine begins with a display of the authorized signers based on previously collected data. The user may then add additional signers. If the additional signers to be added have already been profiled, no further information is required. On the other hand, if a new signer is listed, the system flags that a new signer is listed and a profile will be required later.

Once the signers are consistent with the customer's intentions, the system allows the user to build another CD component. If the user elects to do so, the process is repeated. If, on the other hand, the user elects not to build another CD component, the system returns to the statement building screen of FIG. 13A.

Figure 13F:
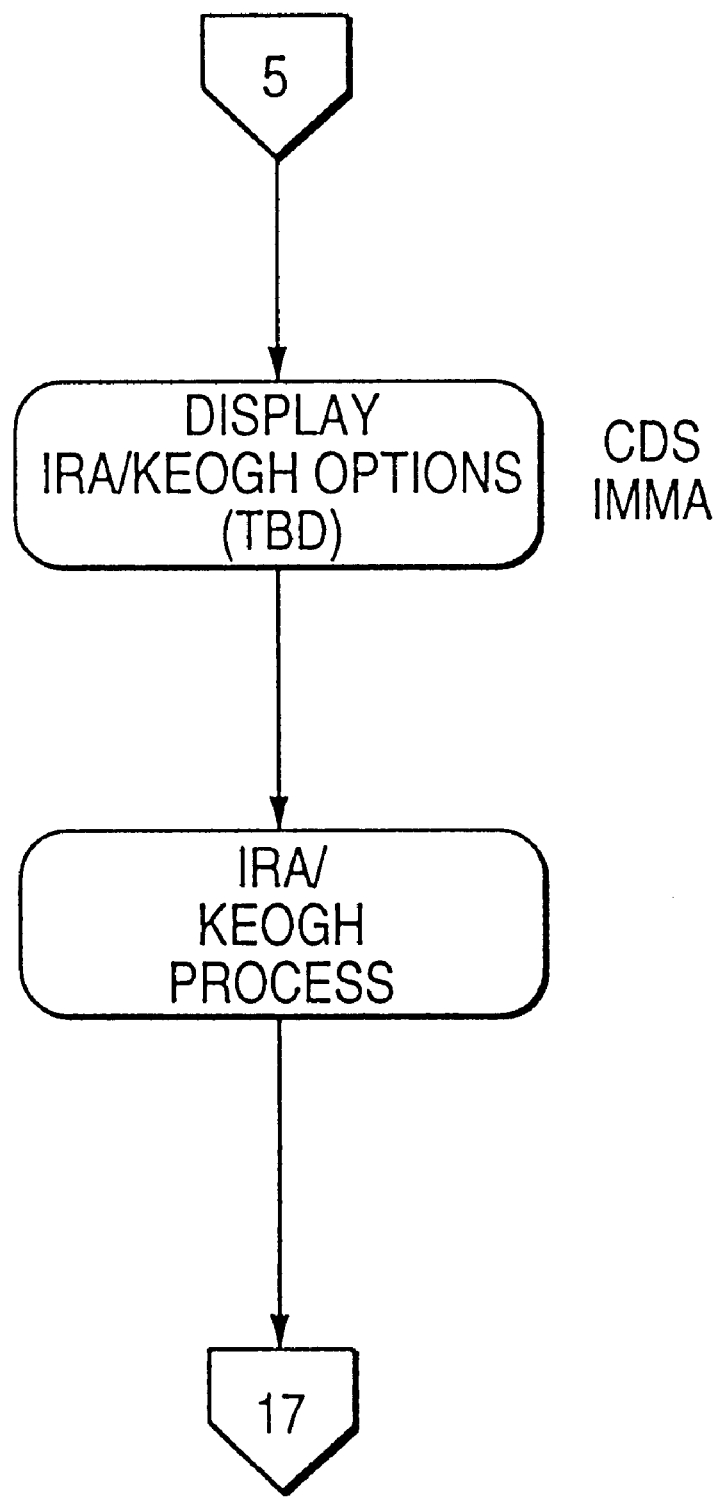

If the user selects the IRA/401K component, the system follows the flow shown in FIG. 13F. The flow shown in FIG. 13F is a very high level consisting only of a display of available options followed by execution of the process for building those options. The process for building the options could, according to the present invention, be constructed along the lines of the processes shown in FIGS. 13B–13E for building checking, savings, IMMA and CD components. Once the IRA/401K component is built to the customer and user's satisfaction, then the system returns to the statement building screen.

Figure 13G:
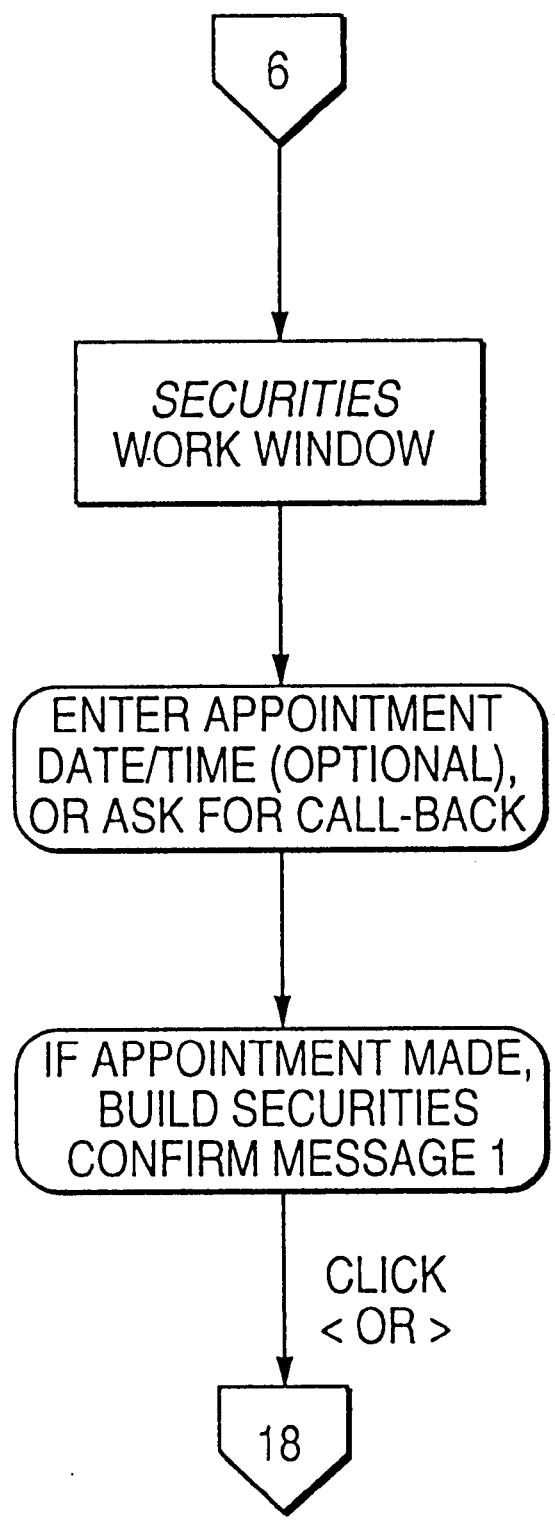

If the user selects the securities or brokerage component, the system follows the flow shown in FIG. 13G. Specifically, the system displays a securities work window that allows the user to enter an appointment date and time or ask for a call back. The reason for this is that typically information relating to building the securities component must be handled by a licensed bank employee. If an appointment is made, then the system builds a securities confirm message and the system returns to the statement building screen.

The system also includes means for limiting access to certain authorized or licensed users to ensure compliance with applicable regulations. For example, information obtained in the "Brokerage" section will be "investment information" and any other information that may be specific to Brokerage. According to regulations, "investment information" can only be discussed with a customer by a licensed individual. Therefore, access to this screen will be limited to licensed users. The means for limiting access is preferably a programmed general purpose component.

Figure 13H:
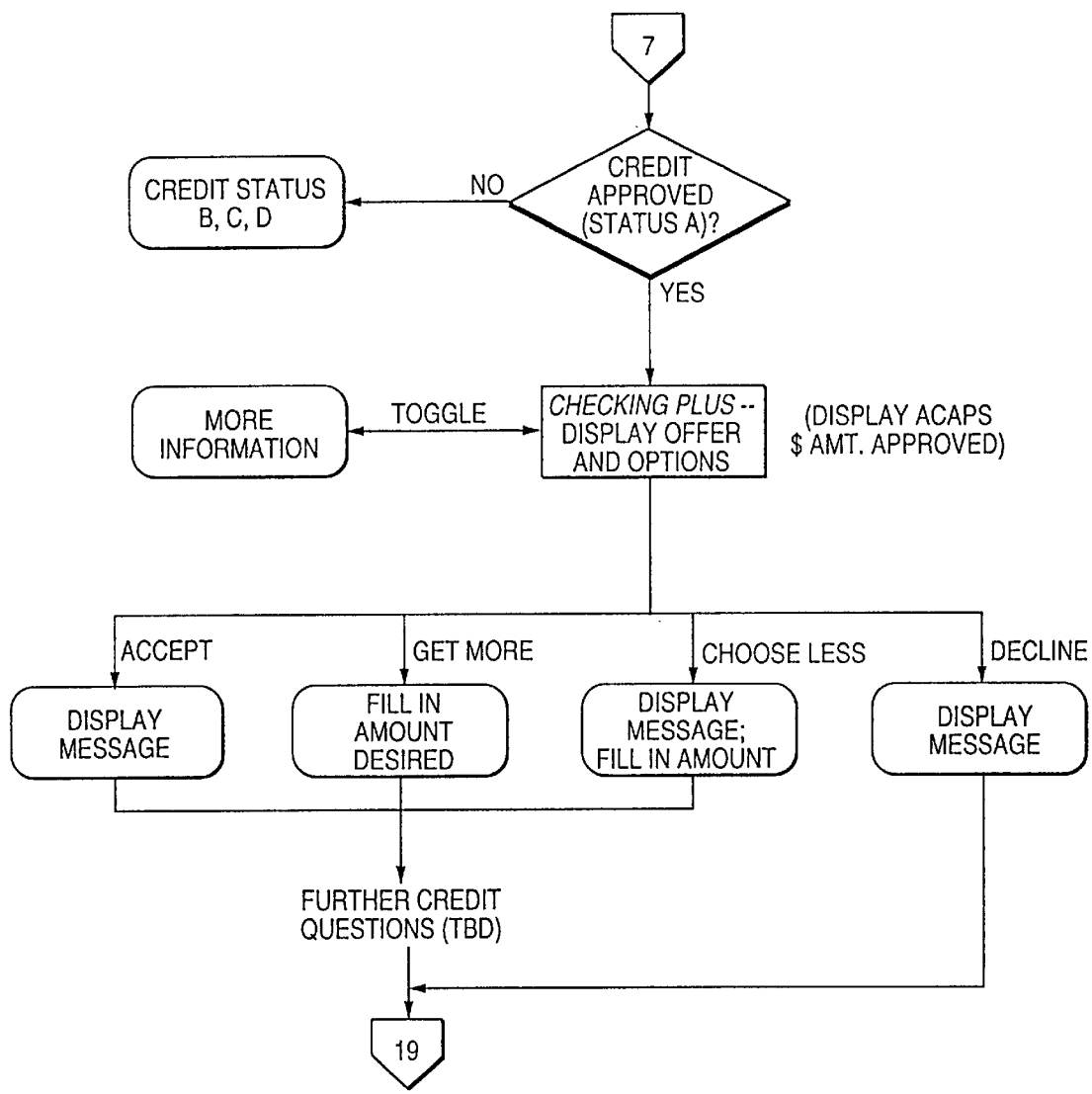

If the user selects a borrowing and loan component such as checking plus, the system follows the flow shown in FIG. 13H. Specifically, an initial determination is made as to whether credit has been approved. If credit has not been approved, then the user is not allowed to build this component of the account. If, on the other hand, credit has been approved, the system displays a checking plus offer and option screen that includes information concerning the amount of credit available. The customer, via the user, may then accept the amount of credit offered, request additional credit (in which case the system must enter a separate procedure, not shown) to seek authorization for the additional amount, choose to accept less credit than is offered or decline credit. The system then returns to the statement building screen of FIG. 13A.

Figure 13I:
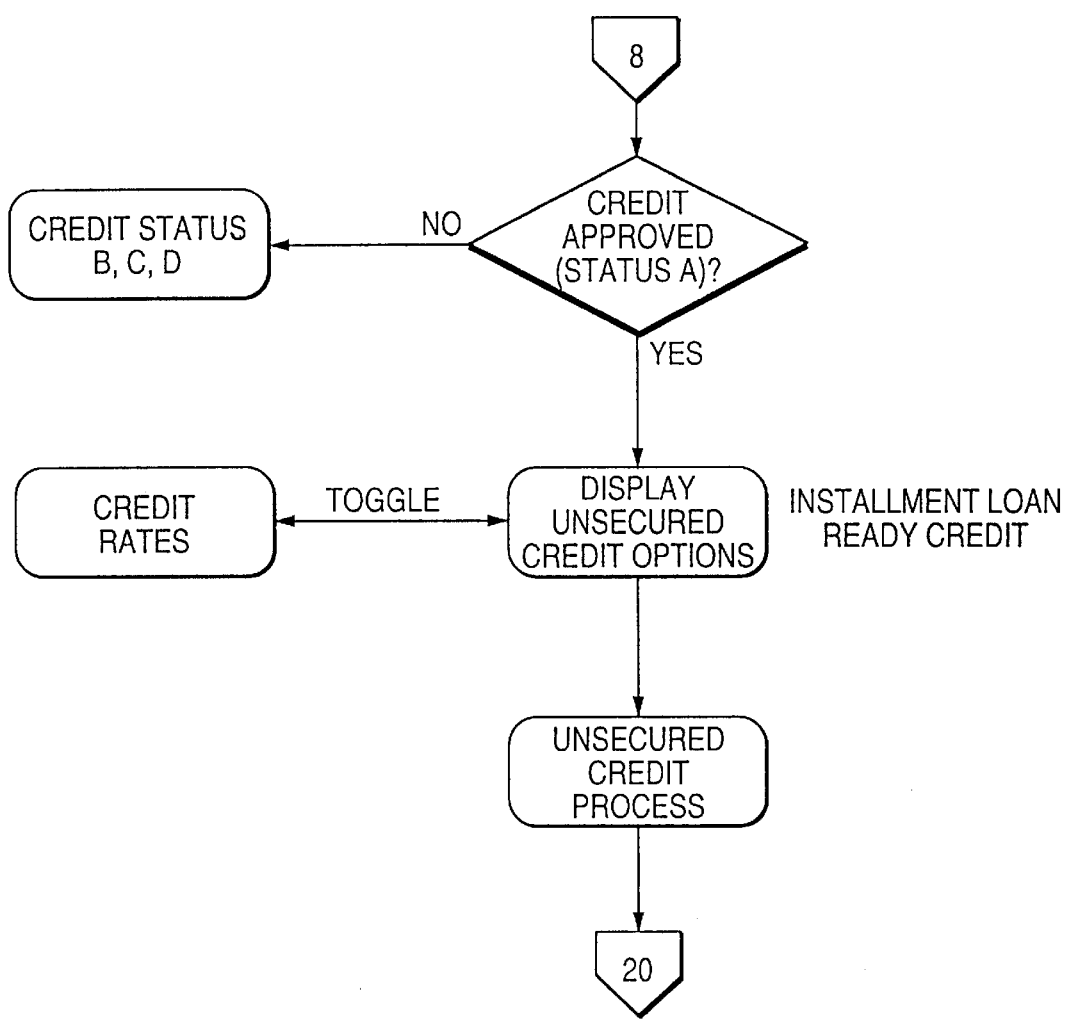

If the user elects to build an unsecured credit component, the system follows the flow shown in FIG. 13I. Specifically, an initial determination is made as to whether credit has been approved. If not, then the user is not permitted to build the unsecured credit component. If credit has been approved, then the system will display the unsecured credit options and credit rates. The system will then perform the unsecured credit component building process. Once the process is completed the system will return to the statement building screen.

Figure 13J:
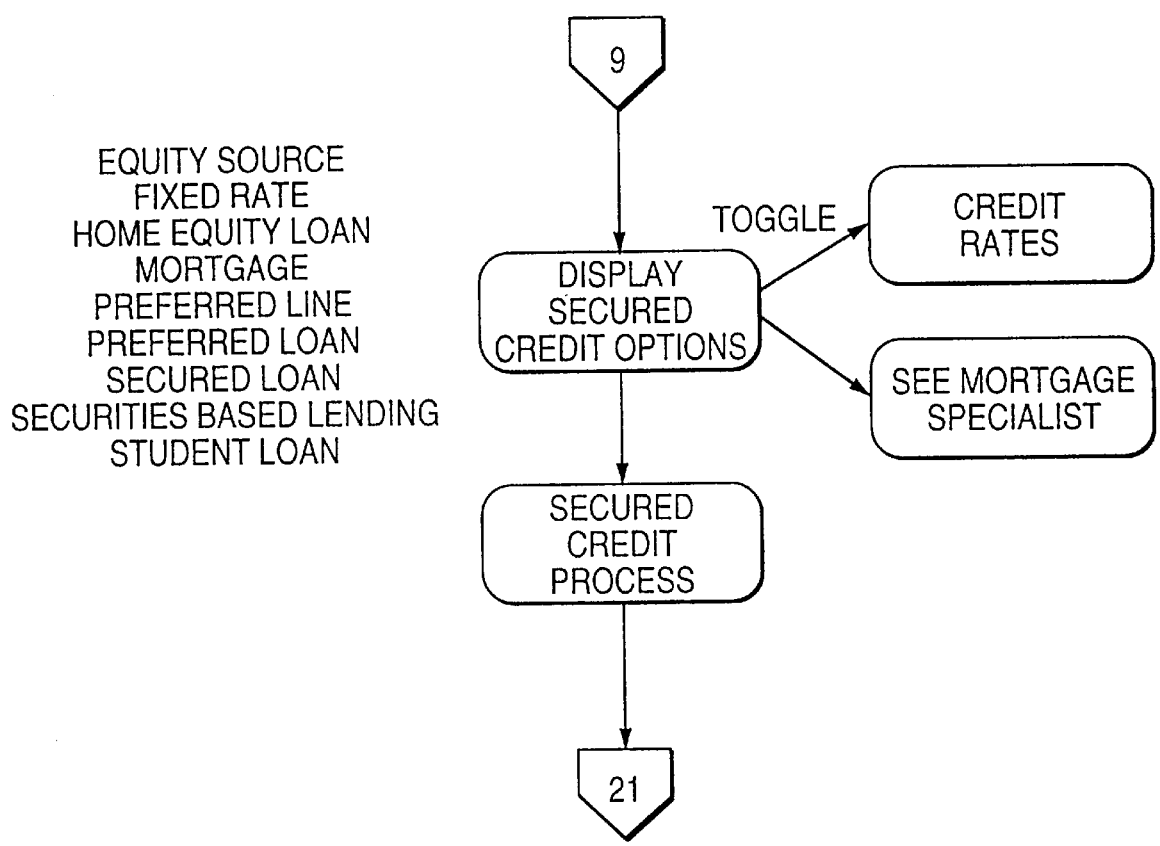

If the user elects to build a secured credit component, the system will follow the flow shown in FIG. 13J. Specifically, the system will display the various security credit options including equity source, fixed rate home equity loans, mortgage, preferred line, preferred loan, secured loan, securities based lending and student loan options. The system also can display credit rates and other information. Once a selection is made, the system performs the secured credit component building process until all the desired and available options have been built then the system returns to the statement building screen of FIG. 13A.

For some products, particularly secured credit, there will be additional information that will be required to complete the application. If the credit bureau pull did not indicate that the customer was 'credit-qualified, "this screen would not be displayed unless the customer made a specific request for a credit product. Included on this screen is items such as property information, housing expenses, Government Monitoring/HMDA information, etc. Any information that was captured as part of the BPA should flow forward into any of the appropriate fields in these screens.

Before the credit information is transmitted to a credit bureau for a credit decision, the system will need to perform a quality check on the data that has been entered to ensure that all required data has been entered. If any information is missing, the system should request the appropriate information. If the information is available, the user will be given the opportunity to enter it; if not available, the ability to place the application in "pending" will be provided.

According to the present invention, the credit decision screens will be accessible within the account opening flow to eliminate the need to toggle out of the account opening-session and into another system.

The user is able to complete verifications and any credit actions that are necessary on these series of screens within the account opening process. Verifications completed on one loan product should flow forward to any other loan products in the session. Various factors, such as line size and product type, determine the verifications to be performed; the verifications performed is updated on all products for which the customer has applied.

Figure 13K:
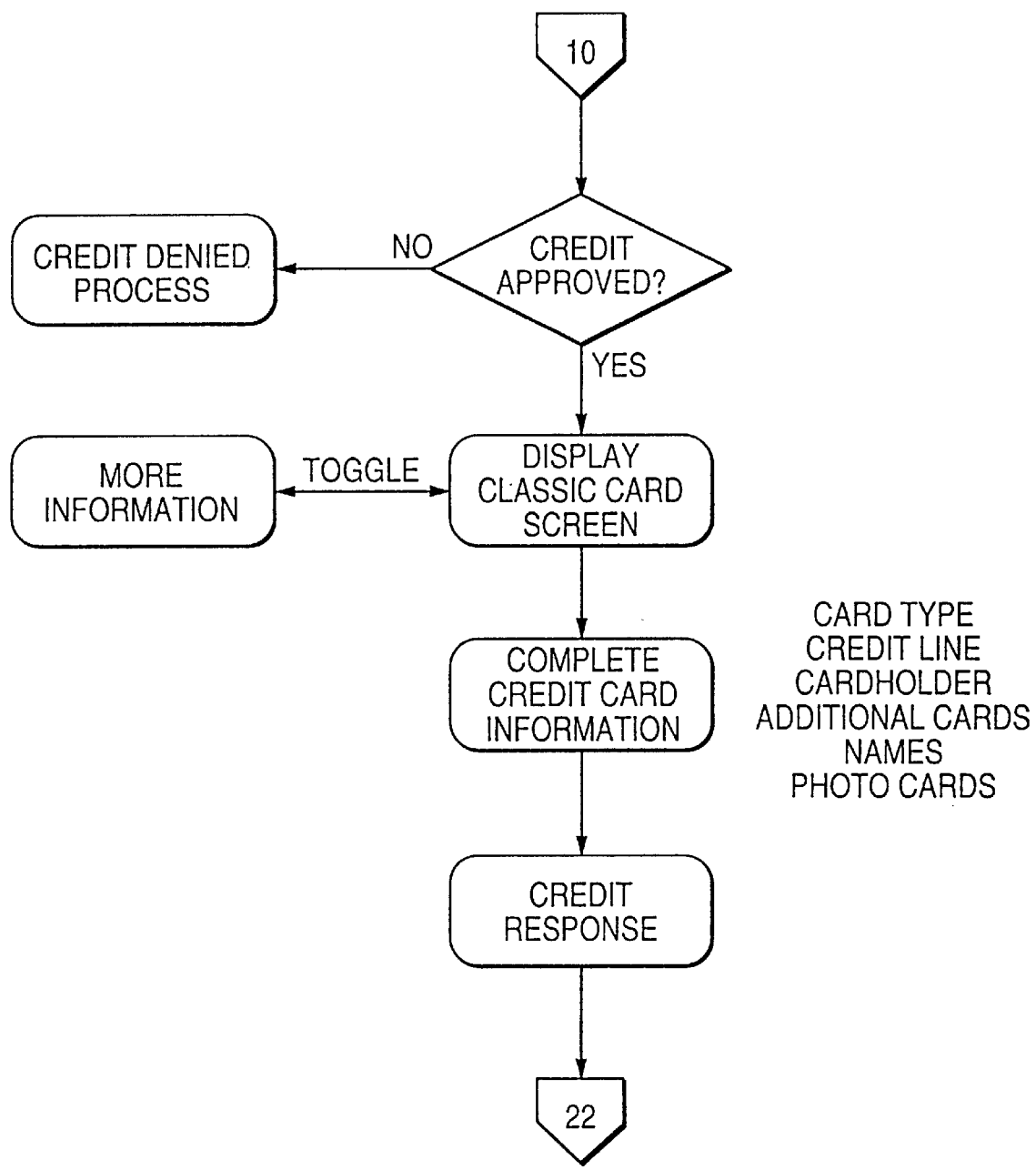
Figure 13L:
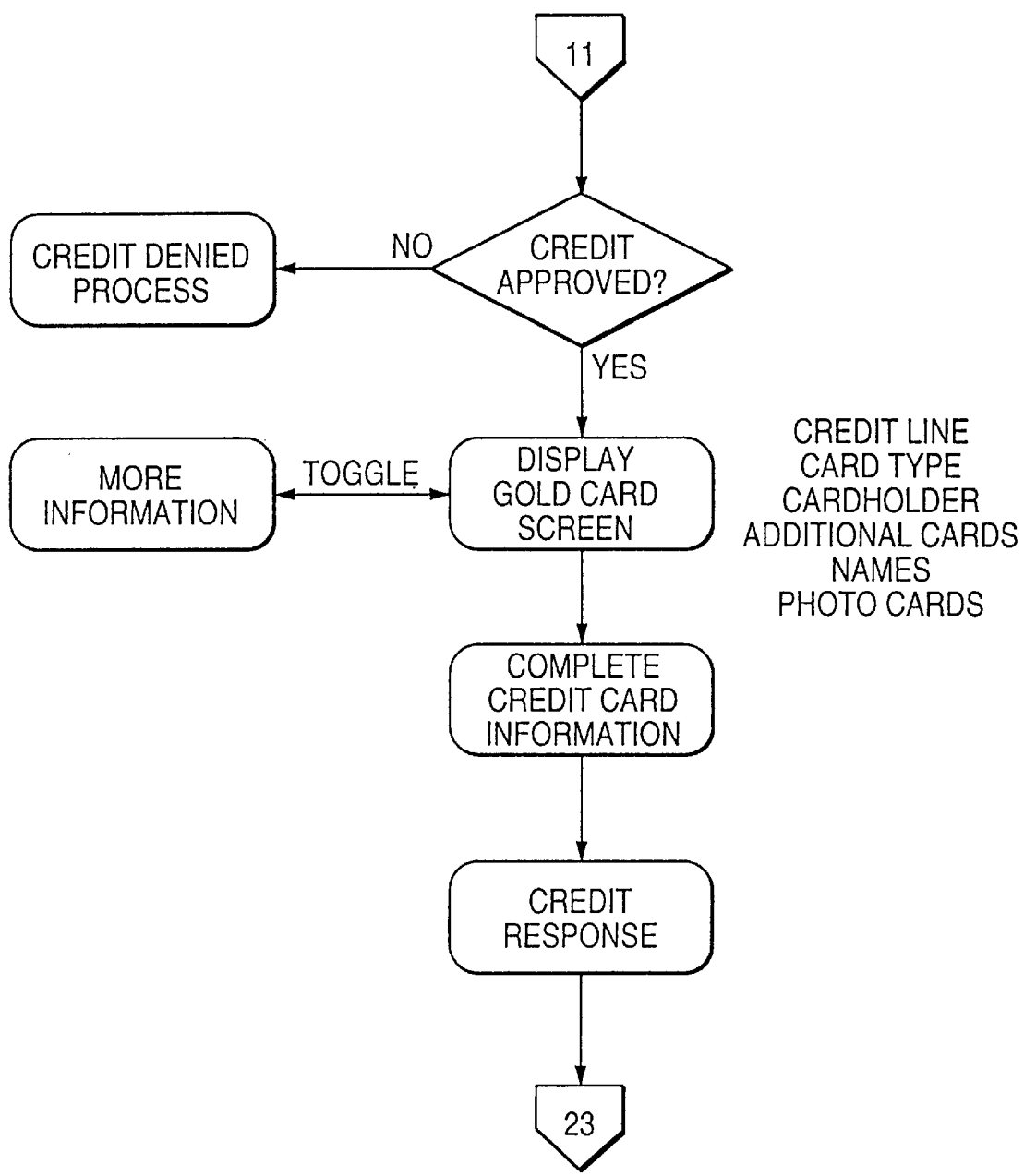
Figure 13M:
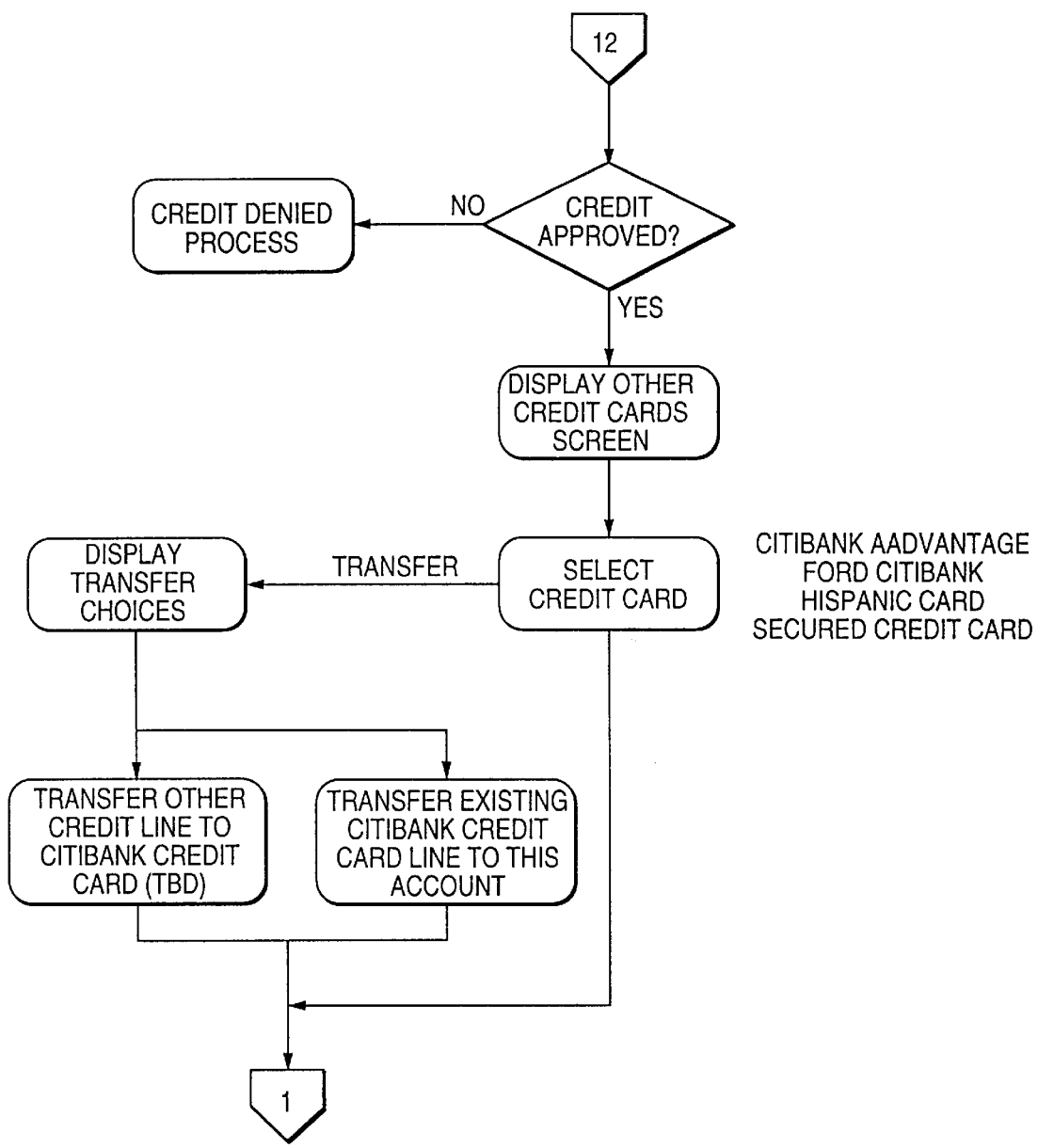

If the user elects one of the credit card options the system follows the flow shown in FIGS. 13K–13M. The system flow shown in FIGS. 13K and 13L are identical and the differences would depend on the differences between the classic credit card and the gold credit card offered by the particular bank. The basic process involved is an initial determination of whether credit has been approved followed by an informational screen concerning the particular card and then user input of information required for the card including card type, credit line, cardholder, additional cards, names and photocards. A determination of the credit line is then made and the system returns to the statement building screen.

If the user selects another card that is offered by the bank, a similar flow is followed except that when the customer selects a particular type of credit card the customer and user are given the option to either transfer an existing bank credit card line to this account or, conversely, to transfer another credit line to a bank credit card. After this process is complete the system returns to the statement building screen of FIG. 13A.

This part of the process will be used to ensure the customer is familiar with the various services available. Again, a programmed general purpose computer is believed to be the most suitable means for performing this step.

These screens will present another opportunity to review how the customer can use the bank to manage their money and realize the benefits of deepening their relationship with Consumer bank. Screens will need to be a combination of data capture and product/service features to be reviewed with the customer, if appropriate.

A preferred embodiment of a system for performing the account services step is shown in FIGS. 14A–14G.

Figure 14A:
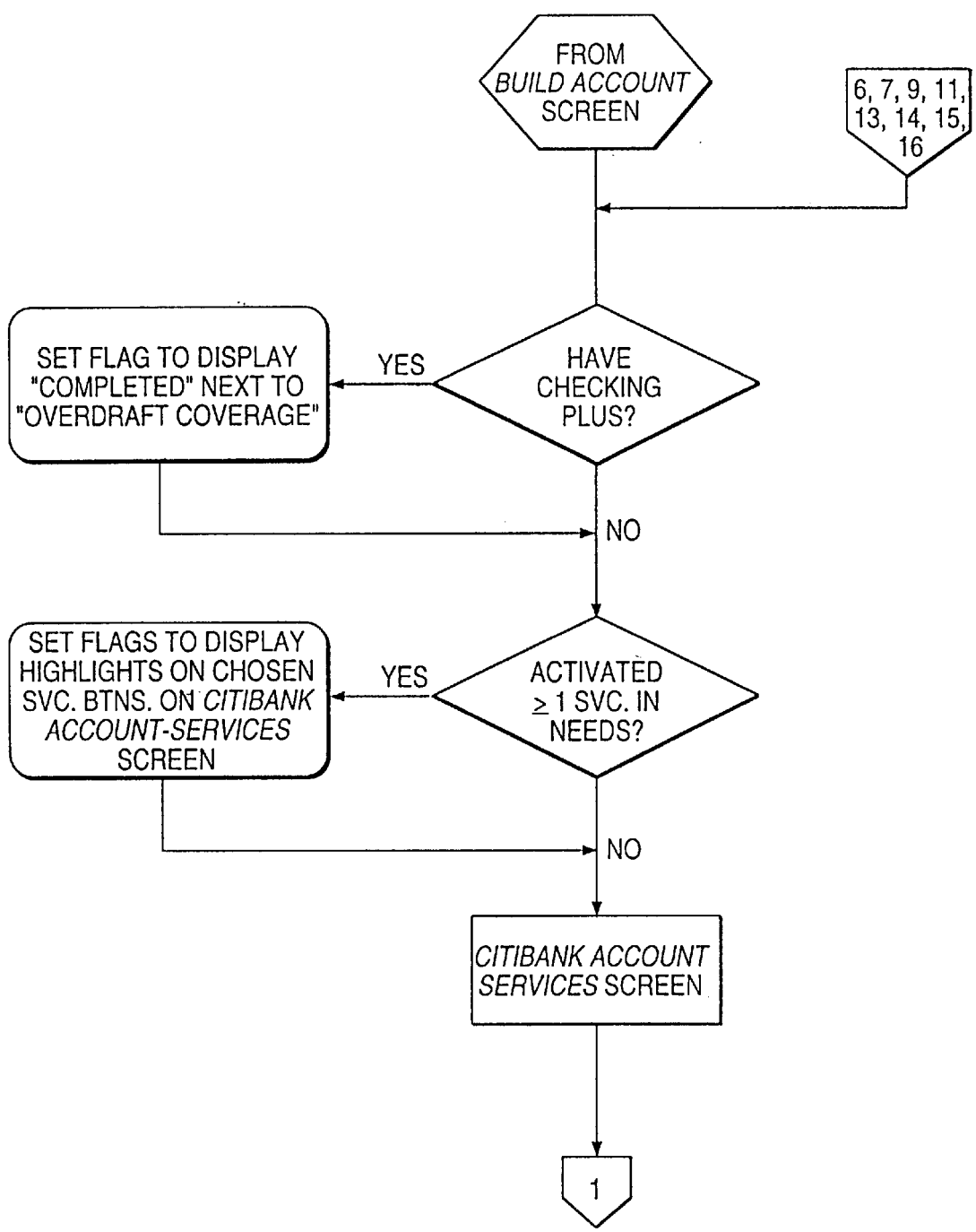
FIGS. 14A–14G are a flow chart showing the process involved in the step of account services in the method of FIG. 10.

As shown in FIG. 14A, the system begins by reviewing the data previously collected to see whether the customer has been enabled for checking plus service, in which case, i.e., overdraft protection. If so, a flag is set and the system proceeds. If not, the system proceeds without setting the flag. Next, the system determines whether or not more than one service has been activated during the account selection needs process. If so, the flags are set to display highlights on the chosen service buttons on the Citibank account services screen and the accounts services screen is displayed. The system then proceeds to the flow shown on FIG. 14B. Whereas the user may elect to set up a service or get information concerning the service. If the user chooses not to set up a service or get information concerning a service, the user is provided the opportunity to note the customer's interest in one or more additional services. If the user indicates interest in one or more additional services, the system notes the need to follow up on that interest and proceeds to printing the enrollment form.

If the user has indicated a desire to set up a service or get information, then the system proceeds to the flow for that particular service. Naturally, banks may provide various services. In the embodiment shown in FIG. 14B, however, the system can provide information or set up automatic transfers, bill payment service, direct deposit, immediate access to deposited funds, automatic dividends deposit, secured lending, overdraft coverage, automatic payments and electronic payments.

Figure 14B:
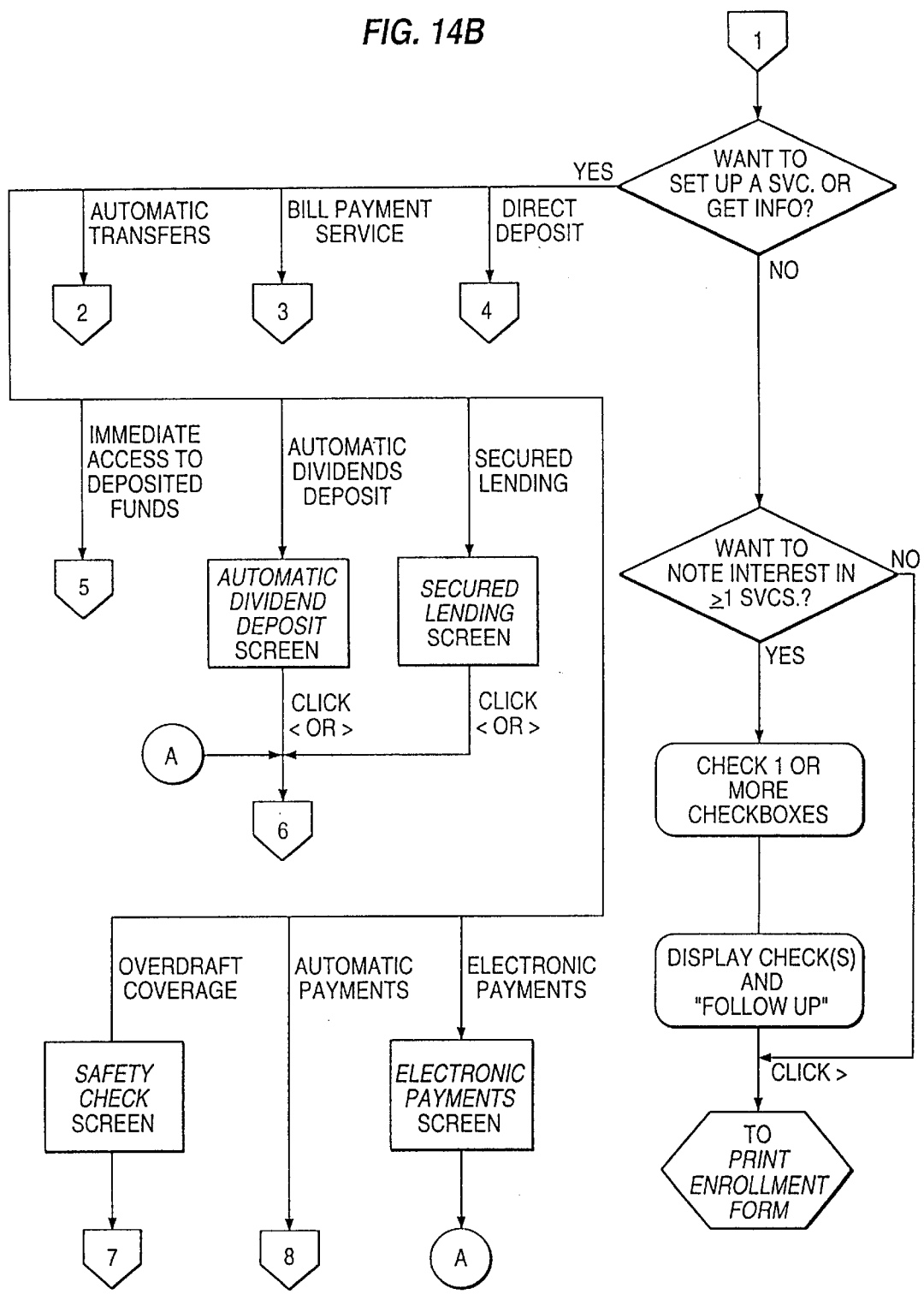
Figure 14C:
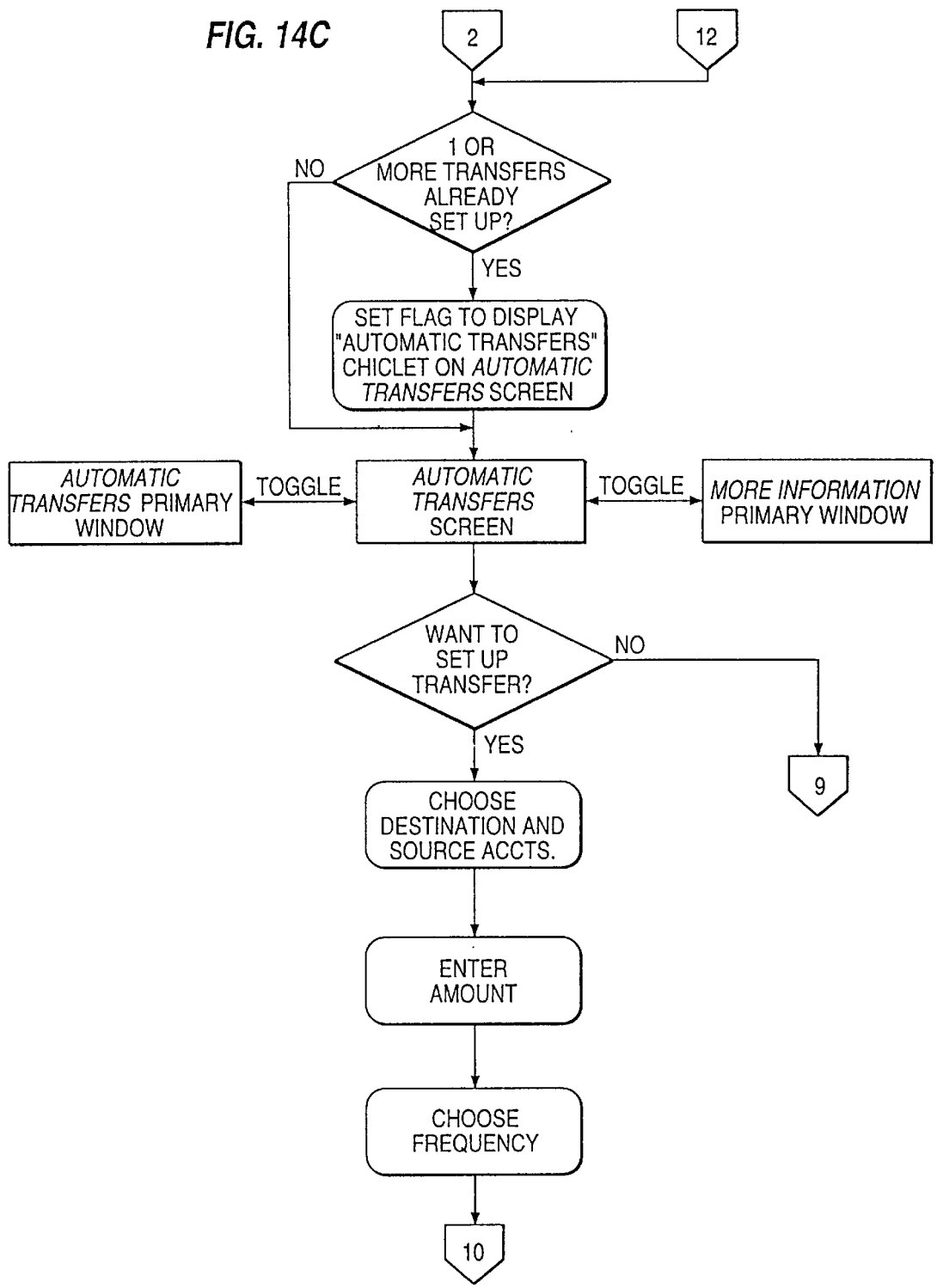
Figure 14D:
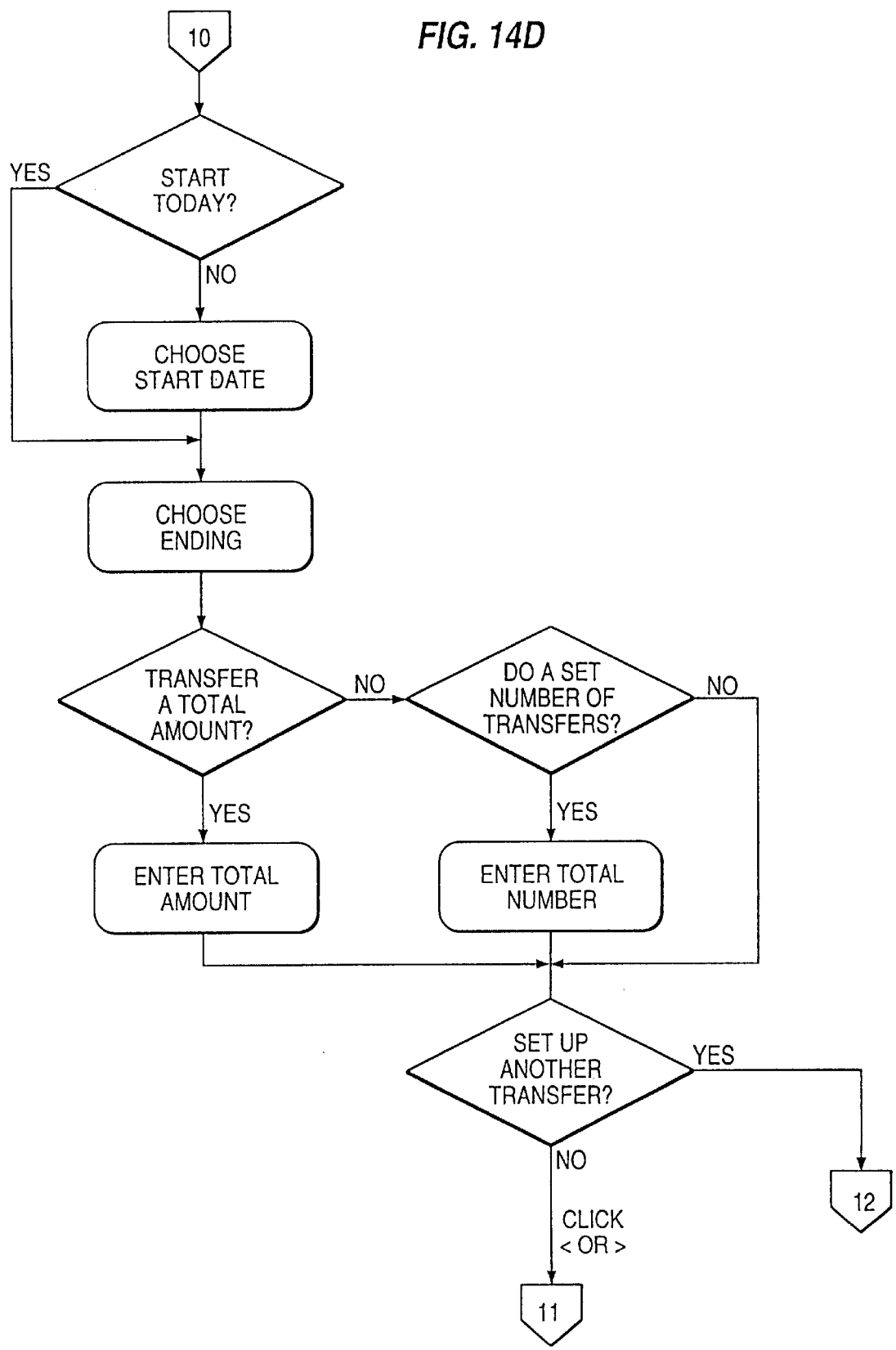

If the user chooses to set up automatic transfers, the system follows the process shown in FIG. 14C and D. In this procedure, the system allows the user to set up automatic transfers and also reoccurring transfers using the procedure shown in FIG. 14D.

Figure 14E:
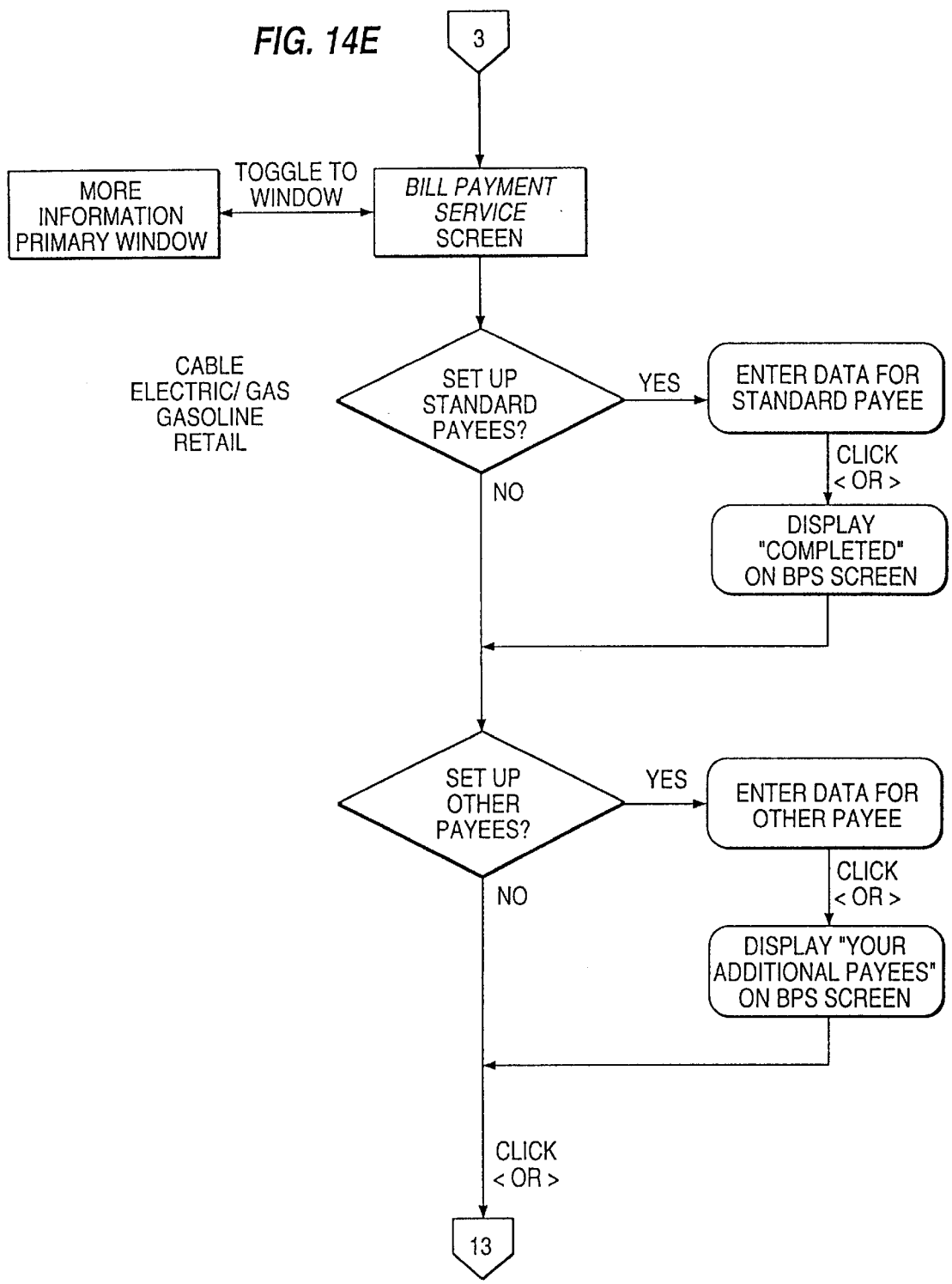
Figure 14F:
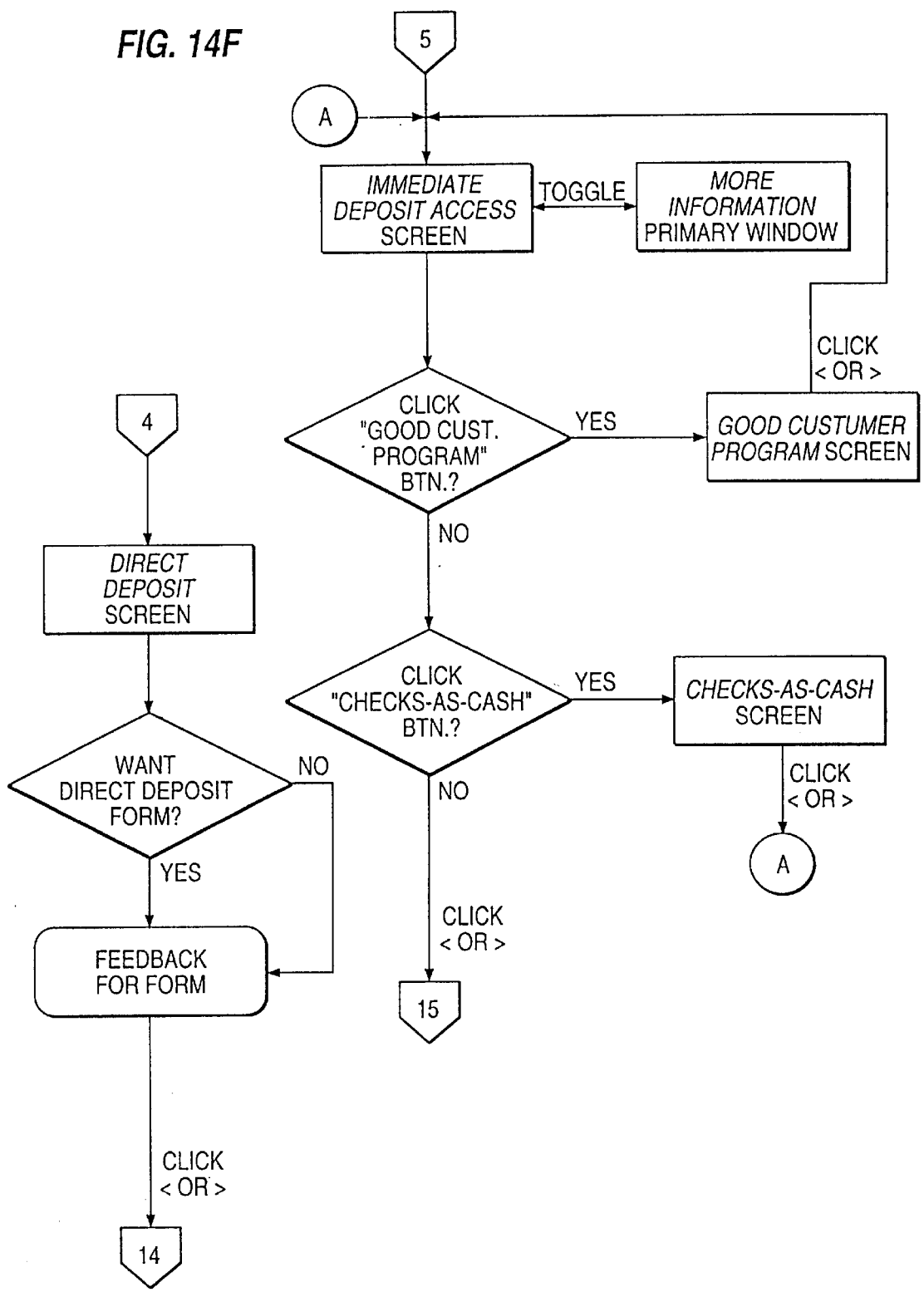
Figure 14G:
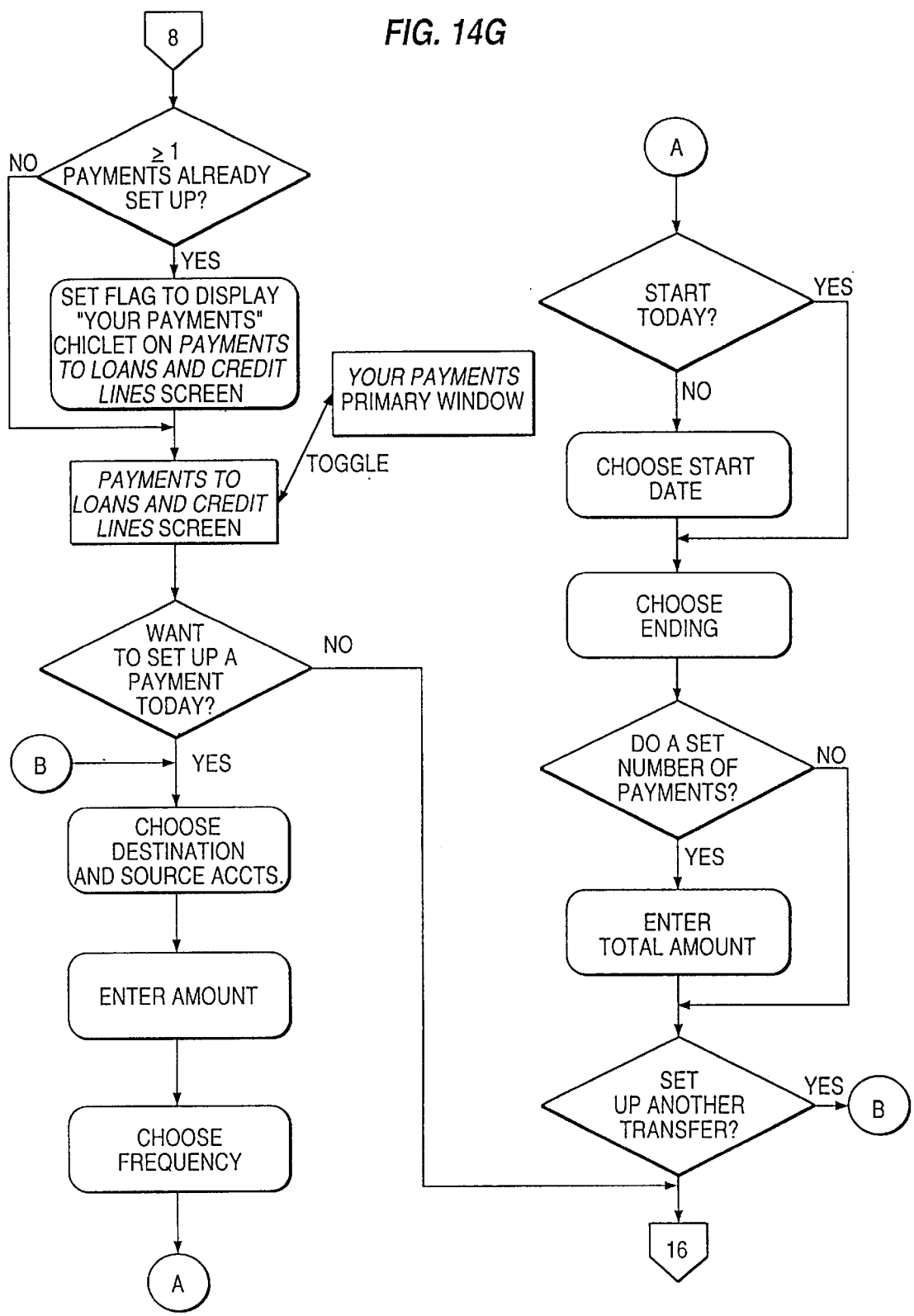

If the user elects to set up or get information concerning bill payment service the system follows the flow shown in FIG. 14E. As shown, the user is allowed to set up standard payees and special payees. If the user elects to set up direct deposit or immediate access to deposited funds the system follows the appropriate flow shown in FIG. 14F. If the user elects to set up automatic payments, the system follows the flow shown in FIG. 14G. As shown therein, the system allows the user to set up multiple payments to loans and credit lines and to select the frequency of such payments.

In every case, after the particular procedure related to any selected service is completed, the system returns to the flow shown in FIG. 14A and 14B. The system then proceeds to the step of access whereby the customer is enabled with regard to the various access points available.

The bankcard personal identification code (PIC) will be selected here. Phone Banking will be discussed and the TPIC (telephone personal identification code) selected. Checks, if applicable, will be ordered.

The system permits the user (personal banker or phone rep.) to enroll the customer in remote access services. A programmed general purpose computer may again be used for this purpose.

The system may provide automatic enrollment in home banking and capture of the customers PC type and diskette size (if needed). Components opened and linked to a bankcard will also be automatically linked for home banking. The system should also permit screen phone use.

Figure 16A:
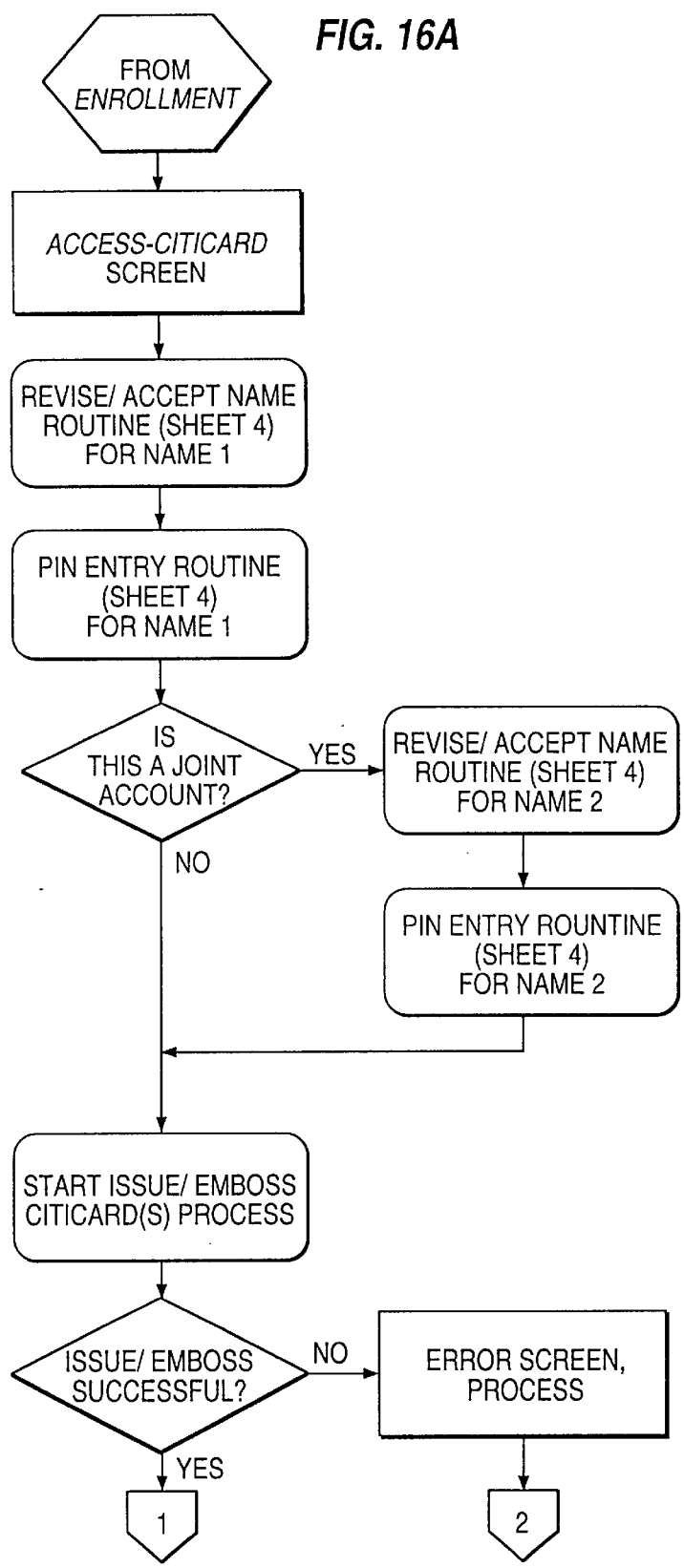
Figure 16B:
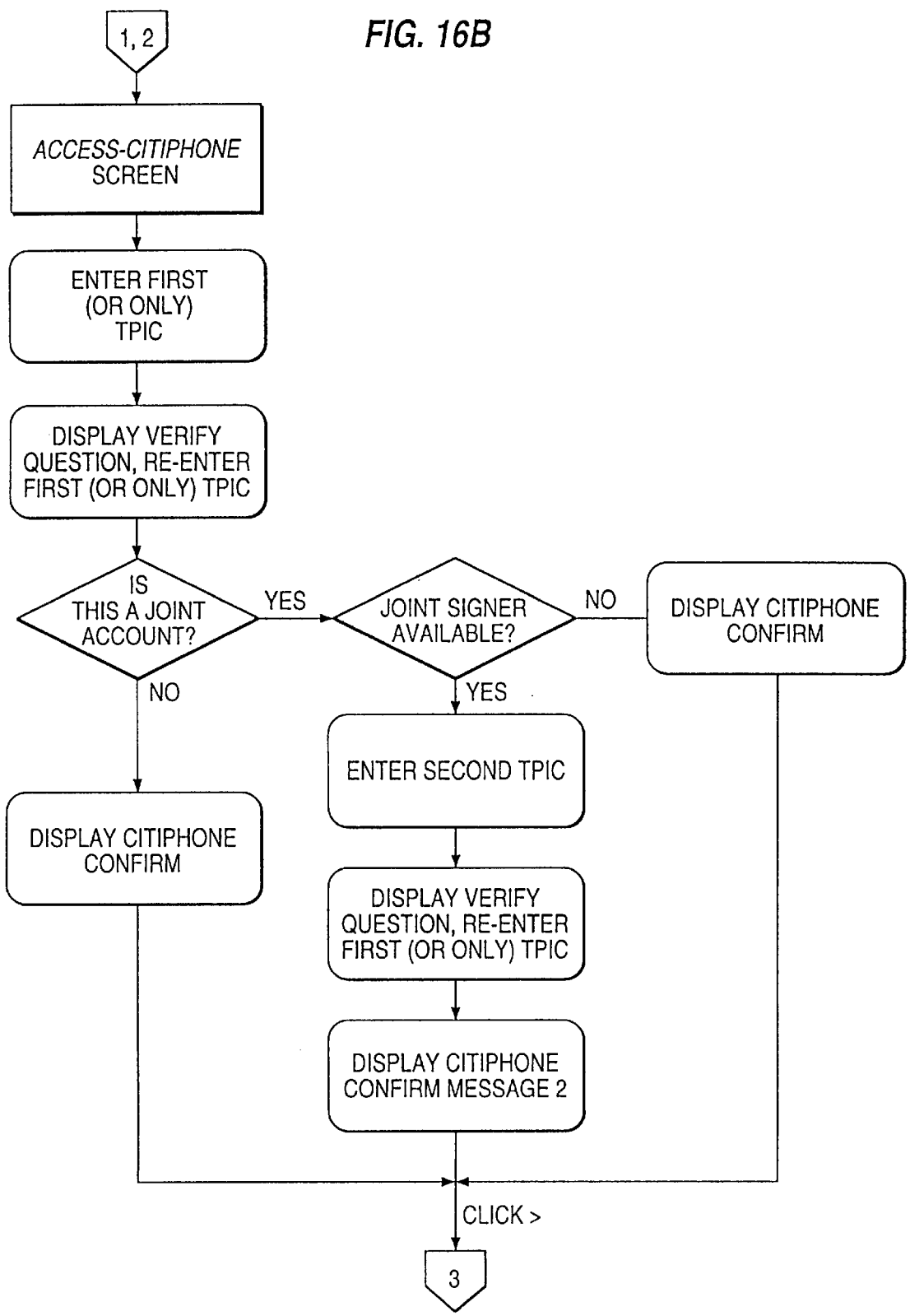
Figure 16D:
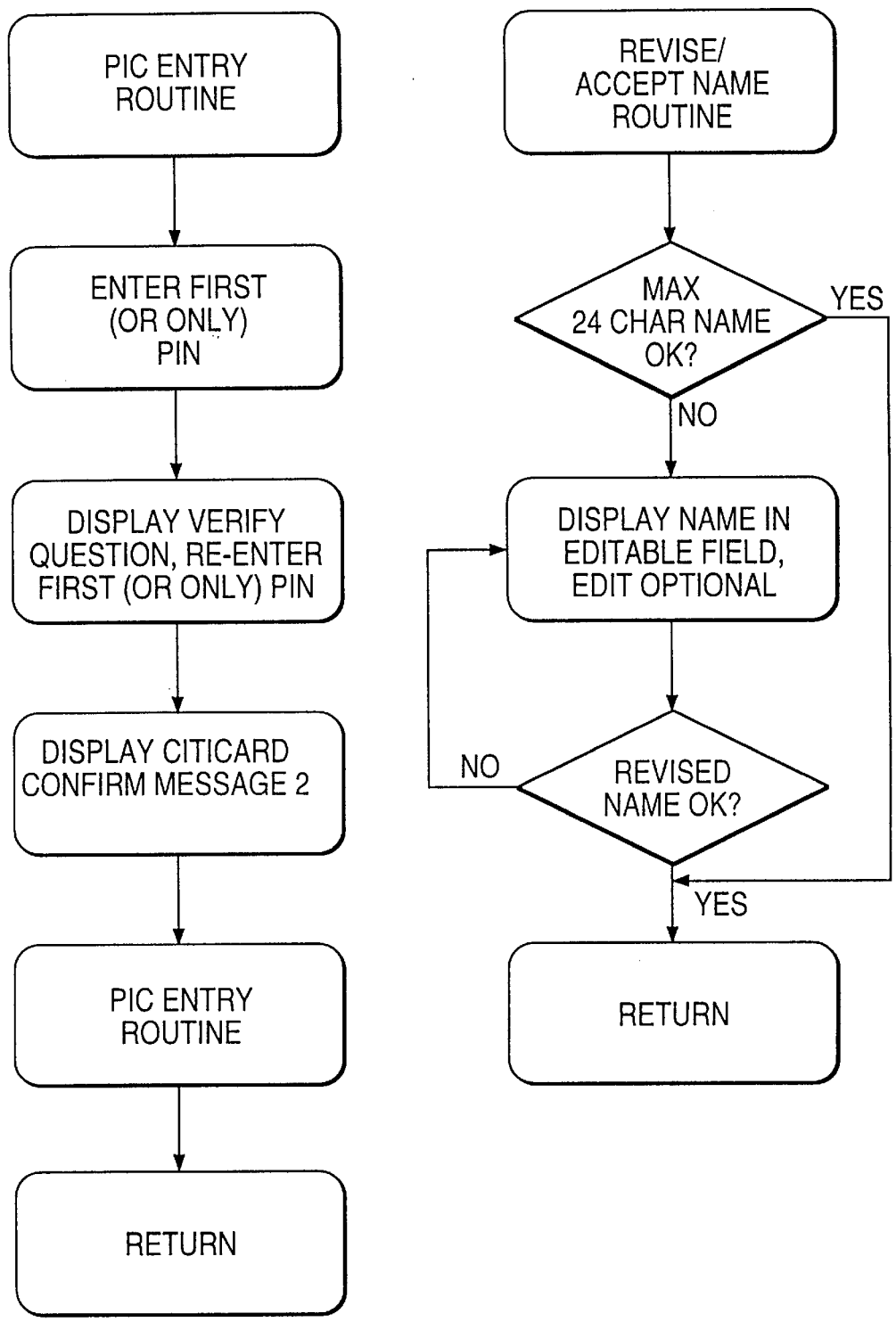

A preferred embodiment of the system for performing the ACCESS step of the present invention is illustrated in FIGS. 16A–16F. As shown in FIG. 16A, the process begins with a display of the access screen. The user is then given the opportunity to revise or accept the account name of record. A sub-routine for this process is shown in FIG. 16D.

The system then enters a personal identification number (PIN) entry routine as shown in FIG. 16D. If the account is a joint account, the name acceptance routine and personal identification entry routine are performed for the second name in the account. The system can then emboss and issue bankcards for the customers. This step may also be deferred. To facilitate embossing, the system preferably includes a conventional embossing machine linked to a general purpose computer. If the embossing is not successful, the system will perform an error screen process, but allow the overall flow to continue.

Figure 16E:
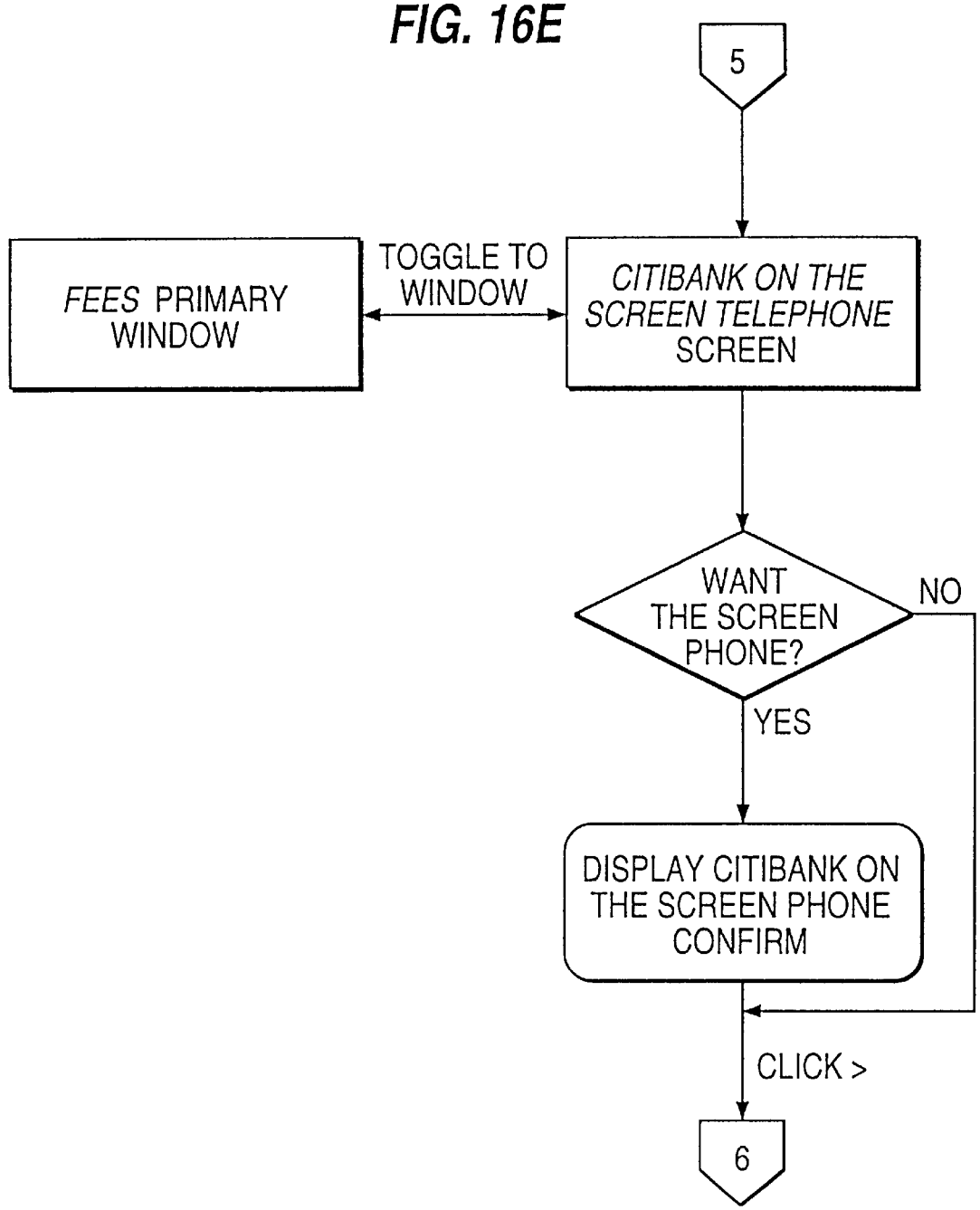

The flow continues as shown in FIG. 16B. Specifically, the system allows selection of a telephone personal identification code that is verified. The process proceeds for any joint signers and then the process continues as shown in FIG. 16C. Here the customer is given the option of remotely accessing the bank by PC. If the user accepts the service, determination is made whether the customer knows all the parameters of his or her computer. If so, the relevant parameters such as type of computer, diskette size, type of modem and modem speed are entered into the system. If the customer does not know one or more of these parameters, a display is made as to the follow ups that will be required and the information is stored for use in the follow up step. The system then proceeds as shown in FIG. 16E. At this point the customer is given the opportunity to access the bank using a screen telephone and the system makes note of the customer's choice then proceeds as shown in FIG. 16F. Here the customer is allowed to order checks. The system begins by displaying a default check order and giving the user the opportunity to change the personalization. This pertains to information such as name, address, billing information and mail address. The user is then given an opportunity to customize the default order and subsequently the user has the opportunity to order checks. The process then proceeds to the special instructions step or the wrap up process shown in FIGS. 17A and B.

SPECIAL INSTRUCTIONS SYSTEM AND STEP (1000)

This step of the process is used to collect any remaining data and deal with any special account situation that had not yet been dealt with in the account opening flow. This would include items such as: best time to call," or "do not contact" flag, "do not share data with other affiliates," "mailing address," "preferred mailing salutation" etc. The system can also attend to closing accounts at other institutions. The system may include a printer and computer that would generate the printing of a collection letter to be sent to the other institution. The system also accommodates naming a Power of Attorney by transmitting the "Power of Attorney" status to the account, eliminating the need for next day file maintenance. The user may also set up an appointment with an Investment Consultant if the user is not licensed or set up an appointment with a Mortgage Consultant. The customer's request for any changes can be accommodated.

Figure 17A:
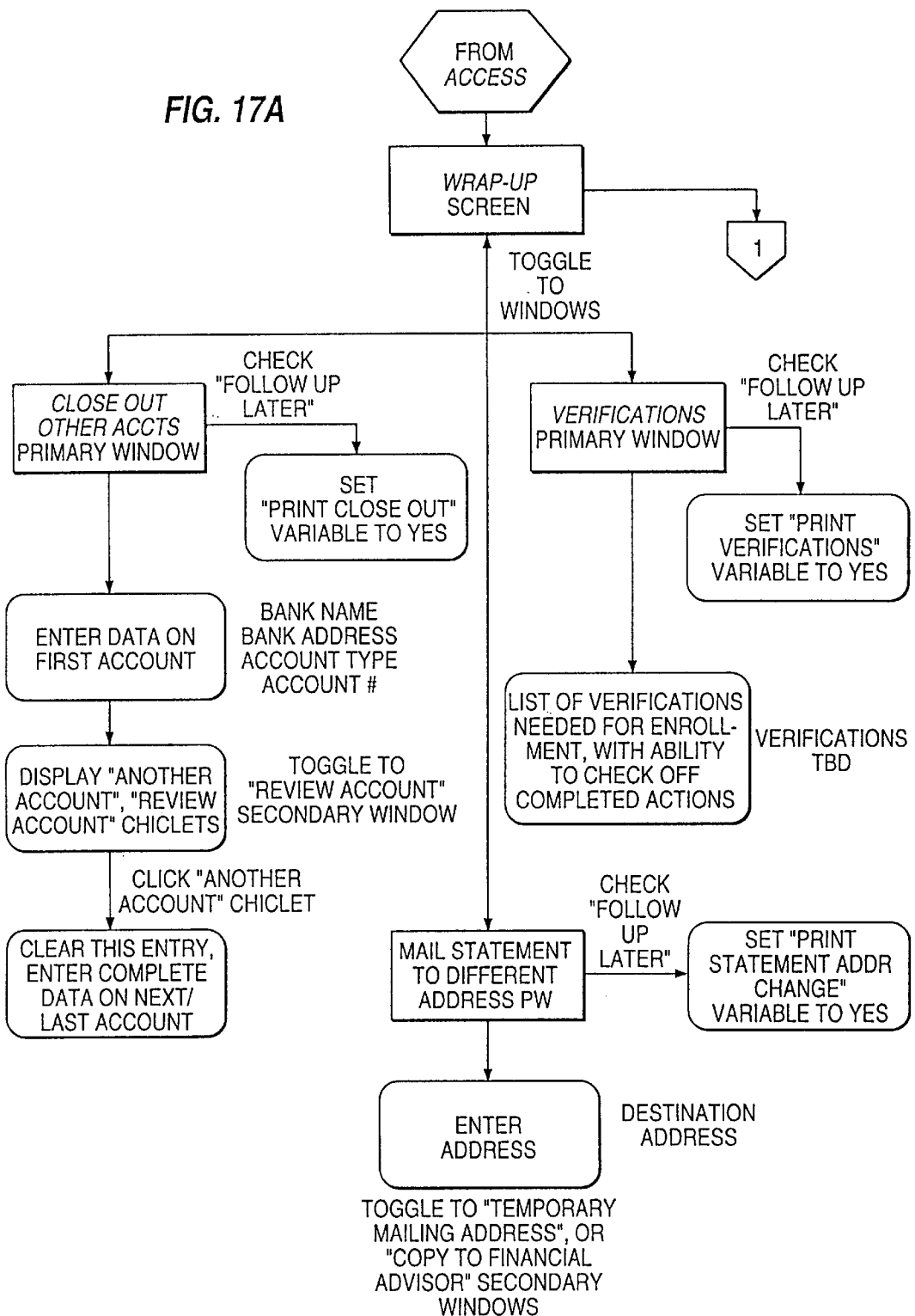
FIGS. 17A–17B are flow charts showing the process of performing the step of follow-ups in the method of FIG. 10.
Figure 17B:
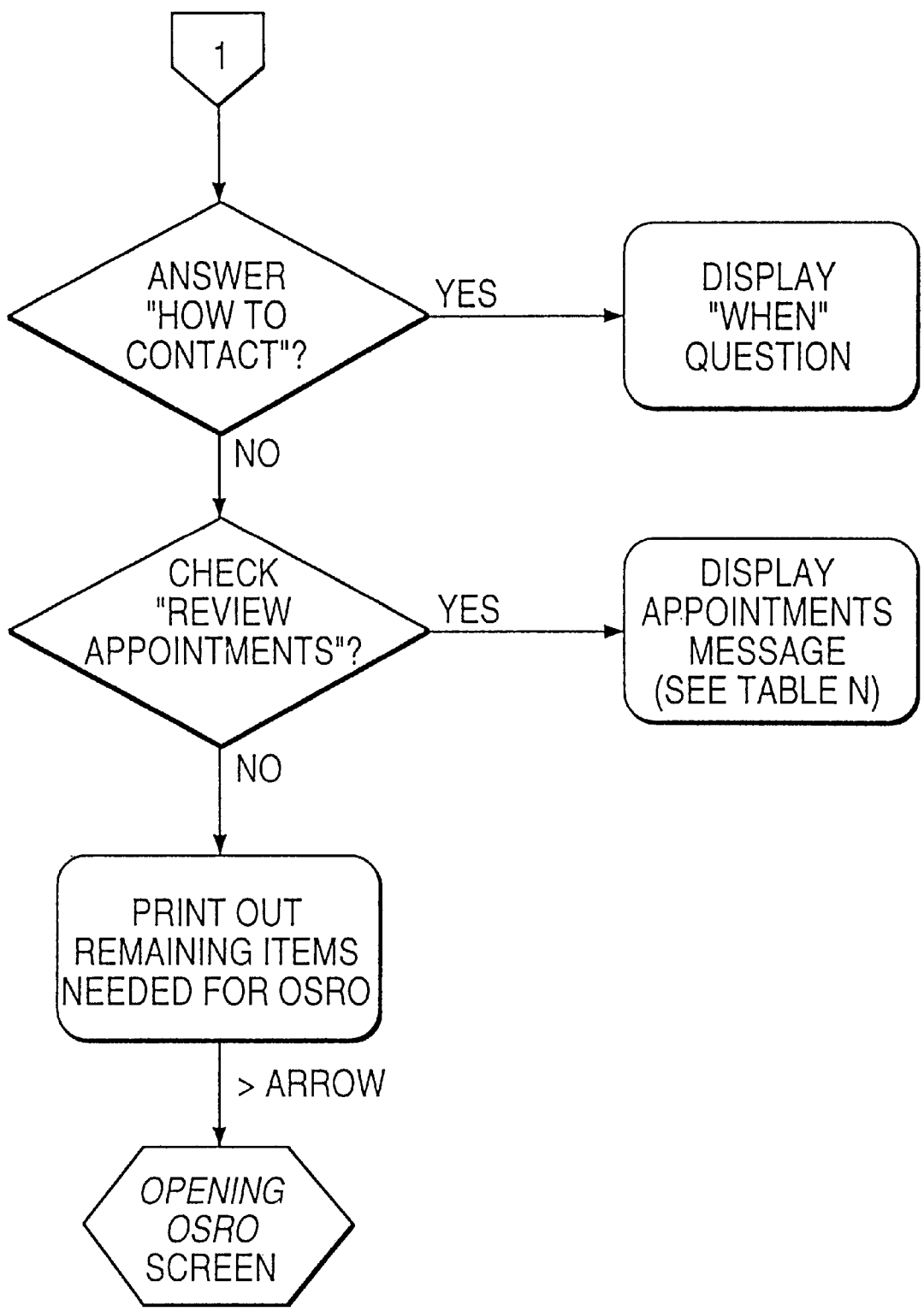

A preferred embodiment of the follow up process is shown in FIGS. 17A–17B. The system begins by displaying information needed to close out and verify various accounts. Again, the system allows both upward and downward flow of data such that only information that has not been previously provided is called for at this step. The system also provides the opportunity to display information concerning how the customer can be contacted and allows the opportunity to display appointments. Finally, the system prints out the remaining items needed to complete the opening of a single fully integrated account.

PRINT/TRANSMIT SYSTEM AND STEP (1100)

After all information has been obtained or the set up is completed, the system proceeds to the step of printing an enrollment package.

The Print function would generate any necessary paperwork that the customer would need to sign as well as any paper that would need to be forwarded to any other units/ individuals not able to communicate with Relationship Banking System electronically. This would include, for example, Mortgages and Landmark referrals, Tax Shelter applications, elite account applications, Brokerage application, Securities Investment Acknowledgements, Collection Letters, signature card, Adverse Action Notice, Ready Credit Disclosures, Insurance forms, and passbooks. To accommodate this step, the system includes a printer linked to a programmed general purpose computer.

The customer will be asked to review all the critical demographic information about themselves such as name, address, employment, telephone numbers, etc. This enrollment statement will display accounts opened in the session with opening day balances. For the consumer bank account, the account numbers, opening deposits, rates, and terms will display in the pertinent section of the statement.

The primary difference between the branch and the consumer bank telephone service center is the customer is not physically present to sign any documents or take away hand outs. This means the consumer bank telephone service center fulfillment area will need to mail documents to the customer.

Figure 15:
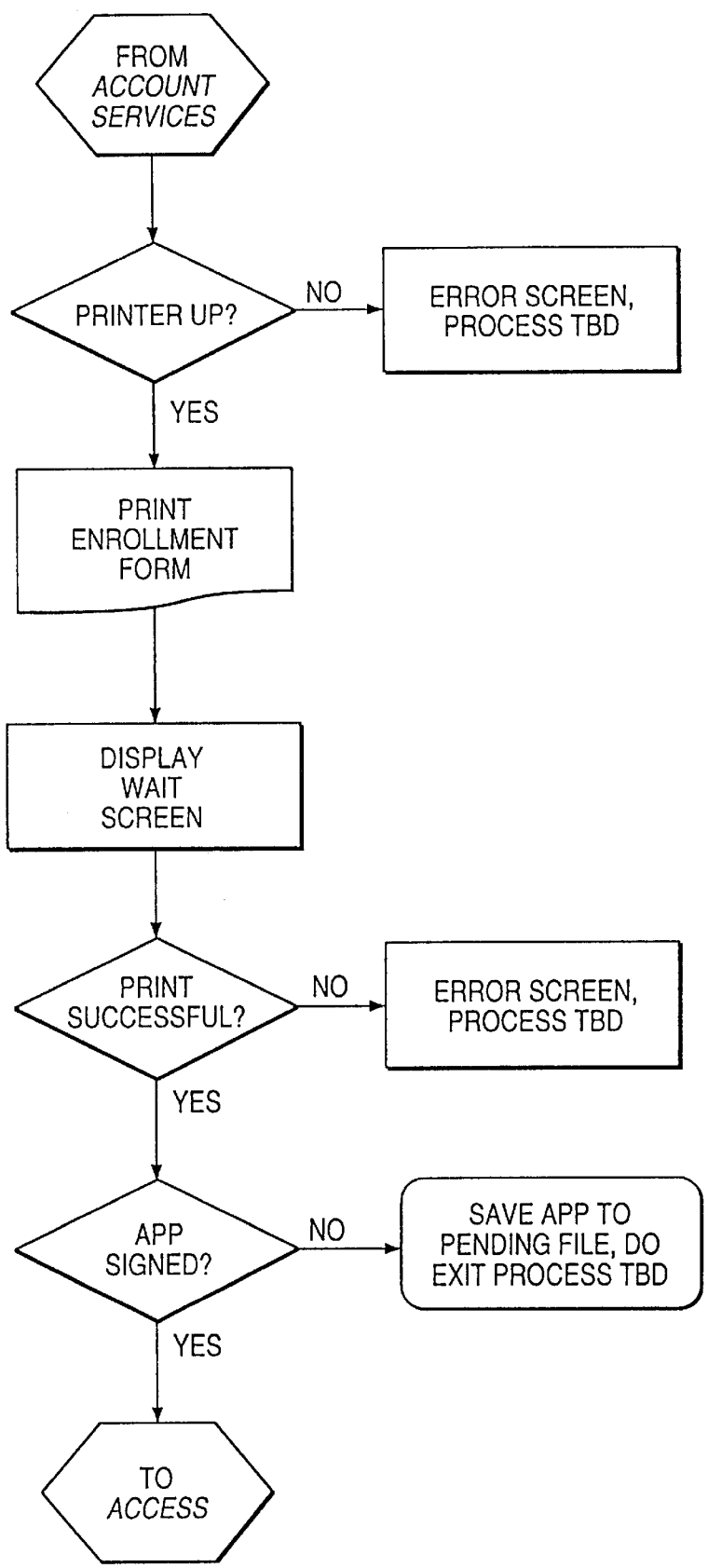
FIG. 15 is a flow chart showing the process of performing the step of printing an enrollment form in the method of FIG. 10.

A preferred embodiment of the process for printing an enrollment form is illustrated in FIG. 15. As shown therein, the system initially confirms that the printer is up. If the printer is not up, the system cannot proceed until the printer is turned on. The, the system commands the printer to print an enrollment form and confirms that the print has been successful. Again, if the print is not successful the process cannot move forward and would ordinarily be repeated if the reason for an unsuccessful print has been identified. After confirming that the enrollment form has been successfully printed the customer is asked to sign the enrollment form. If the customer does not sign the enrollment form at that time, such as when the transaction is performed by telephone, the application is saved to the pending file.

SESSION WRAP (FOLLOW UP) SYSTEM AND STEP (1200)

Finally, the system enters session wrap-up. All appropriate documentation will be signed by the customer. The account opening information will have to be able to be routed to Tax Shelter or a Mortgage Consultant if the situation warrants. The requirement is to perform the referral systematically rather than via a paper copy.

If a follow-up session will be established for the Customer, the user will have the option to print an appointment reminder to give the customer. This handout will include the date and time of the appointment (if available), purpose of the appointment (as input by the user via a free form data entry field) and the name of the Consumer banker the customer will meet with. If a specific appointment date/time cannot be set, an indication that the named Consumer banker will contact the customer. This handout should include the name and mailing address of the customer so it can be placed in a windowed envelope for mailing to a customer if the account opening was handled over the phone.

After the customer leaves, the user or can enter free form notes from the Basic Needs Assessment; retrieve and review the Detailed Needs Assessment answers and update the answers as needed; transmit the Basic and Detailed Needs Assessment information.

PENDING FILE

During the Account Opening flow, the ability to place the session into pending will be available. The main places in the flow where the pending process will most often be invoked is prior to transmission to the Credit Bureau (if SSN is not available) or after the Quality Control check and information needed is flagged as missing. The customer may also need to leave due to a time restraint that could result in a need to pend at any point. A customer may also only get through Needs Assessment and want to return to continue the application process at a later date. The system makes it possible to pend one portion of the session, such as Brokerage, and transmit the remaining components, such as consumer banking.

When an existing customer is profiled in the Greeter function, if there are any sessions pending for that customer, that fact be noted on the profile. If the user (greeter) does not profile the customer, he should still be able to pull up any pending application through a pending items function. The Pending items will have multiple ways to be accessed that include by Customer name, by user ID, by Branch, and by product.

The pending application will be presented to the user in the Account Opening screen flow. The user should also be allowed to perform a Quality Control check to have the system identify items missing that are needed prior to transmission to the host.

The customer will have the option to go into a branch of their choice to complete the account opening. The branch staff would also have access to these pending applications. The workstation screen should also flag the Customer Representative that Pending items are outstanding on the customer when they enter the customer on the "Identify Customer" screen.

Thus, by virtue of the integrated account and account opening system of the present invention, the customer will be offered all components of the Bank Account. The process will be flexible enough to support the customer who wants only one component to those interested in the full offering. Once customer data is entered into the system, the customer will never have to repeat the same information to any bank employee. During the account opening session, information will flow seamlessly between bank employees (users) to improve the customer experience. Data on existing customers can be made readily available at all customer contact points subject to legal restrictions on data sharing that may exist. The capability will be provided to issue a bankcard to all customers, even if the only component activated is a Passbook Savings or a Certificate. The bankcard is used as the customer's identification at the Teller Window or over the phone at the telephone service center and will be available for linking new components when they are activated.

As a result, customers will utilize more of the components of the integrated account. This should generate an increase in revenue and improved customer satisfaction, maximize the available selling time for the branch staff and provide the telephone service center with identical functionality to the branch.

By linking the account opening system to the central database, information in the database can be used to facilitate account opening and information gathered during the account opening process can be fed to the central database of the present invention monthly files that are used for Household, Customer & Account level information. Thus, the present invention allows users to query the central database of the present invention for the various information at the customer level that would otherwise not be available. This information includes: service enrollments that the customer signed up for during the account opening process (direct access, bill payment, ATM, etc.) and the sales tools used for each customer with type of tool and date used. In this context, the type of sales tools that might be used include borrowing power assessment; needs assessment and needs assessment sub components. Other information gathered can include; detailed data elements, gathered during borrowing power assessment or needs assessment; the source of customer, the source of funds used at account opening and fee waiver information to include type, fee waiver reason, date, personnel ID or rep doing waiver.

As noted above, the workstations of the present invention utilize the central database of the present invention to provide information for on-line viewing and report generation through selection of customers or accounts matching given criteria and producing listings of matches with selected data elements. It follows that, by linking the account opening system to the central database, the additional data is made available on workstations. The particular the following data elements, among others are made available on workstations of the present invention for usage in selection and appearing on listing of selected accounts or customers: borrowing power assessment; needs assessment; detailed data elements, gathered during borrowing power assessment or needs assessment; service enrollments that the customer signed up for during the account opening process (direct access, bill payment, ATM, etc.); the source of customer defined from a picklist at account opening; and the source of funds defined from the picklist at account opening.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. An integrated sales process support system, comprising:

a central database;

means for inputting data into the central database from a plurality of sources;

means for searching the database in response to structured queries and identifying records that match said queries and compiling a list of leads, which includes identifying information about particular customers as well as information pertaining to the customers' interactions with the owner of the central database, wherein the list of leads are associated with the identified records;

at least one micromarketing center having a plurality of user workstations;

means for building said structured queries of said database in response to a user's selection of criteria from a graphic user interface of a user workstation;

a plurality of geographically separated branch systems, each branch system including at least one branch workstation linked for electronic communication in real time to the central database;

a central customer information system, the central customer information system being geographically separated from, but linked for electronic communication to, the workstations at the branch systems so as to distribute the list of leads to the workstations at the branch systems.

2. The system of claim 1, wherein the system includes an account opening system comprising means for assembling a personal profile that includes means for collecting salient data and means for allowing data collected at any step of the process to flow to all other points where the data is required so that data need not be entered more than once.

3. The system of claim 1, wherein the system further comprises means for tracking customer arrivals at branch offices; and wherein the system further comprises means for tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

4. The system of claim 1, further comprising a graphical user interface that allows the micromarketing center to generate a file containing mailing addresses and transferring the file to geographically separated branch systems.

5. An electronic sales and service support system for a financial institution, comprising:

a central database containing information about households, customers, and accounts of a financial institution;

a micromarketing center having at least one user workstation in electronic communication with said central database, said user workstation having an input device for entering selection criteria for defining a selected group of customers to target for a marketing campaign;

a central customer information system having a plurality of branch workstations in electronic communication with said micromarketing center and said central database, said branch workstations each having a display device for selectively displaying a profile of a customer including the customer's relationship with the financial institution;

means for communicating a sales promotion concept to the micromarketing center;

means located at the micromarketing center for generating at least one lead comprised of a first piece of data that identifies a customer and a second piece of data that indicates the customer's interactions with the financial institution wherein the at least one lead is based on the sales promotion concept;

means for providing the at least one lead to at least one branch workstation overnight; and at least one electronic communication link for providing real time communications between the at least one branch workstation and the central database.

6. The electronic sales and service support system of claim 5, wherein said central database comprises:

a data storage element;

means for inputting data into the data storage element from a plurality of sources; and means for standardizing and householding input data in the data storage element in a plurality of organizational levels including household, customer, and account levels.

7. The electronic sales and service support system of claim 6, further comprising means for searching the database in response to structured queries and identifying records that match said queries; and means for building said structured queries in response to a user's selection of criteria from a graphic user interface of the user workstation at said micromarketing center.

8. The system of claim 5, wherein the system includes an account opening system comprising means for assembling a personal profile that includes means for collecting salient data and means for allowing data collected at any step of the process to flow to all other points where the data is required so that data need not be entered more than once.

9. The system of claim 5, wherein the system further comprises means for tracking customer arrivals at branch offices; and wherein the system further comprises means for tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

10. An integrated sales process support system, comprising:

a central database;

means or inputting data into the central database from a plurality of sources;

means for standardizing input data in the central database in a plurality of organizational levels;

a plurality of user workstations that are geographically remote from the central database, each of the user workstations including database and display means, the workstations including means for generating a graphic user interface for allowing a user to select search criteria blocks to graphically build a graphically constructed search query, said graphic user interface including pull-down windows, icons, and drag-and-drop operation;

a central customer information system, the central customer information system being geographically separated from, but linked for electronic communication to the branch workstations;

means for converting the graphically constructed search query into a text query that includes necessary codes and syntax required to insure that the query will run;

means for allowing data communication between the user workstations and the central database;

means for searching the database in response to structured queries received form one of the user workstations and identifying records that match said queries;

means for downloading data concerning the records that match said queries to the user workstation; and a plurality of branch workstations connected to each user workstation by telecommunication means, and means for transmitting data records comprising customer identification data and customer summary information in real time from the user workstation to the plurality of branch workstations, wherein the plurality of branch workstations are also connected to the central database for real time communication.

11. The system of claim 10, wherein the central customer information system contains a plurality of customer profiles, each customer profile including demographic information and customer financial information including credit information and financial goals; means for performing a needs analysis based on information contained in the central customer information system, recommending an account based on the needs analysis and presenting information concerning the component of the selected account to the customer; and means for allowing data communication between the central customer information system and the central database.

12. The system of claim 10, wherein the central customer information system is geographically remote from the central database.

13. The system of claim 10, wherein the system further comprises means for tracking customer arrivals at branch offices; and wherein the system further comprises means for tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

14. A process of identifying sales targets, distributing sales leads, and enhancing sales tools for a marketing campaign, for use in connection with a system that includes a central database; means for inputting data into the central database from a plurality of sources; means for searching the database in response to structured queries and identifying records that match said queries; at least one micromarketing center having a plurality of user workstations in electronic communications with said central database; a plurality of geographically separated branch systems, each branch system including at least one branch workstation; and a central customer information system, the central customer information system being geographically separated from, but linked for electronic communication to, the workstations at the branch systems, the process comprising the steps of:

inputting data into the central database from a plurality of sources;

standardizing and householding said input data into a plurality of organizational levels within said central database;

communicating a sales campaign concept to the micromarketing center;

generating leads comprised of customer identification data and data representative of the customer's interactions with an institution, wherein the generated leads are based on the sales campaign concept by entering criteria into a user interface of said user workstation for defining a list of leads associated with customers to target during the sales campaign, building structured queries in response to the selected criteria and searching the central database using said structured queries, identifying records in said central database that match said selected criteria, and generating said list of leads associated with customers to target during the sales campaign;

electronically distributing said list of leads associated with customers to said branch workstations; and communicating data, in real time, to the branch workstations from the central database.

15. The process of claim 14, further comprising the step of displaying a profile containing information about a customer from said list of customers on said branch workstation during a sales session with said customer during the sales campaign.

16. The process of claim 14, further comprising the step of using a graphical user interface that allows the micromarketing center to generate a file containing mailing addresses and transferring the file to geographically separated branch systems.

17. The process of claim 14, further comprising the steps of tracking customer arrivals at branch offices and tracking and reporting information pertaining to the arrival in the branch for new and existing customers going through the sales process, which includes the following information: type of arrival; wait time; sales session time; average session time; usage of sale tools; product type; dollars per product type; customer name and address; product type; purpose of visit and sales rep ID.

* * * * *